United States Patent [19]
Asamura et al.

[11] Patent Number: 6,021,017
[45] Date of Patent: Feb. 1, 2000

[54] MAGNETIC RECORDING AND PLAYBACK DEVICE WHICH PROCESSES ERROR SIGNALS TO OBTAIN A SERVO CORRECTION SIGNAL

[75] Inventors: Masako Asamura; Tomohiro Ueda; Taketoshi Hibi; Tatsuo Yamasaki; Ken Onishi, all of Nagaokakyo, Japan

[73] Assignee: Mitsubishi Denki Kabushiki Kaisha, Tokyo, Japan

[21] Appl. No.: 08/924,889

[22] Filed: Sep. 5, 1997

Related U.S. Application Data

[63] Continuation of application No. 08/497,752, Jul. 3, 1995, abandoned.

[30] Foreign Application Priority Data

| Jul. 4, 1994 | [JP] | Japan | 6-152187 |
| Sep. 26, 1994 | [JP] | Japan | 6-230063 |
| Jan. 23, 1995 | [JP] | Japan | 7-008192 |
| Aug. 22, 1995 | [JP] | Japan | 6-196848 |

[51] Int. Cl.$^7$ .................................................. G11B 5/584
[52] U.S. Cl. ........................................ 360/77.14; 386/79
[58] Field of Search ........................ 360/77.15, 10.2, 360/76, 10.1, 9.1, 10.3, 77.13, 77.14; 358/312; 386/6, 68, 78, 79, 81, 109, 112

[56] References Cited

U.S. PATENT DOCUMENTS

| 4,651,239 | 3/1987 | Omori et al. | 360/27 |
| 4,663,673 | 5/1987 | Doutsubo | 360/9.1 |
| 4,679,099 | 7/1987 | Edakubo | 360/10.2 |

(List continued on next page.)

FOREIGN PATENT DOCUMENTS

| 0505985 A2 | 9/1992 | European Pat. Off. . |
| 0505985A2 | 9/1992 | European Pat. Off. . |
| 0546691 | 11/1992 | European Pat. Off. . |

(List continued on next page.)

OTHER PUBLICATIONS

HDTV '93, International Workshop on HDTV '93, Proceedings, vol. II, Oct. 26–28, 1993, "A Recording Method of ATV Data on a Consumer Digital VCR," Yanagihara, et al.

"A Study on Variable–Speed Reproduction of the Digital VTR," Hirano et al., SMPTE Journal, Jun. 1983, pp. 636–641.

"Discrete–Time Signal Processing," Oppenheim et al. Prentice Hall, Englewood Cliffs, New Jersey 07632, 1989, pp. 101–112.

Yanagihara et al., "A Recording Method of A TV Data on a Consumer Digital VCR"; HDTV'93 Proceedings, vol. II, Oct. 26–28, 1993; Ottawa, Canada.

"A Study on Variable–Speed Reproduction of the Digital VTR" by Y. Hirano, S. Mita, A. Kohgami, Y. Eto, K. Takeshita, and N. Fujimura; SMPTE Journal, Jun. 1983, pp. 636–641.

"Discrete–Time Signal Processing" by A. Oppenheim and R. Schafer; Prentice Hall, Englewood Cliffs, NJ 07632; 1989; pp. 101–112.

Anderson, Charles E.; Diermann, Joachim; Digitale Fernsehaufzeichnung—Fragen jenseits der Durchführbarkeit; In; Fernseh–und Kino–Technik, 1980, No. 4, pp. 119 to 123.

Siakkou, Manfred; Digitale Bild–und Tonspeicherung; 1st edition, Berlin, VEB Verlag Technik, 1985, pp. 246 to 255, ISBN 3–211–95816–9.

*Primary Examiner*—Alan Faber

[57] ABSTRACT

A tracking error signal is detected using an error detector, from cross-talk components at a point in each of the regions of several duplication areas from which reproduction is possible, and tracking control is performed using a servo circuit, based on the average value of the error signals or the average of the maximum and minimum of the peak values of the error signals from the respective areas during one scan. Even when a large amount of fast playback data is recorded, and track non-linearity is present, the fast playback can be reproduced without fail, and signals in fast playback data regions at a plurality of locations can be obtained without fail.

23 Claims, 67 Drawing Sheets

U.S. PATENT DOCUMENTS

| | | | |
|---|---|---|---|
| 4,719,525 | 1/1988 | Hasegawa | 360/10.2 |
| 4,748,520 | 5/1988 | Odaka | 360/21 |
| 4,942,487 | 7/1990 | Noguchi et al. | 360/70 |
| 5,126,852 | 6/1992 | Nishino et al. . | |
| 5,136,391 | 8/1992 | Minami | 360/32 |
| 5,148,331 | 9/1992 | Kashida | 360/77.15 |
| 5,182,681 | 1/1993 | Yamazaki | 310/70 |
| 5,229,862 | 7/1993 | Takahashi et al. . | |
| 5,253,122 | 10/1993 | Chiba et al. . | |
| 5,434,677 | 7/1995 | Oikawa | 360/10.1 |
| 5,440,345 | 8/1995 | Shimoda . | |
| 5,510,899 | 4/1996 | Kim . | |
| 5,532,835 | 7/1996 | Nakagaki | 360/10.2 |
| 5,537,215 | 7/1996 | Niimura et al. . | |
| 5,543,932 | 8/1996 | Chang et al. . | |

FOREIGN PATENT DOCUMENTS

| | | | |
|---|---|---|---|
| 0551672 | 12/1992 | European Pat. Off. . | |
| 0546691 A2 | 6/1993 | European Pat. Off. . | |
| 0551672 A2 | 7/1993 | European Pat. Off. . | |
| 0600690 | 11/1993 | European Pat. Off. . | |
| 0606857 | 1/1994 | European Pat. Off. . | |
| 0627855 | 5/1994 | European Pat. Off. . | |
| 0600690 A2 | 6/1994 | European Pat. Off. . | |
| 0606857 A2 | 7/1994 | European Pat. Off. . | |
| 0627855 A2 | 12/1994 | European Pat. Off. . | |
| 0675649 A2 | 10/1995 | European Pat. Off. . | |
| 289950 | 12/1987 | Japan | 360/77.15 |
| 62856 | 3/1989 | Japan | 360/77.15 |
| 184651 | 7/1989 | Japan | 360/77.15 |
| 684285 | 3/1994 | Japan . | |
| WO 9417631 | 8/1994 | WIPO . | |
| WO9417631 | 8/1994 | WIPO . | |
| 9527978 | 10/1995 | WIPO . | |
| WO 9527978 | 10/1995 | WIPO . | |

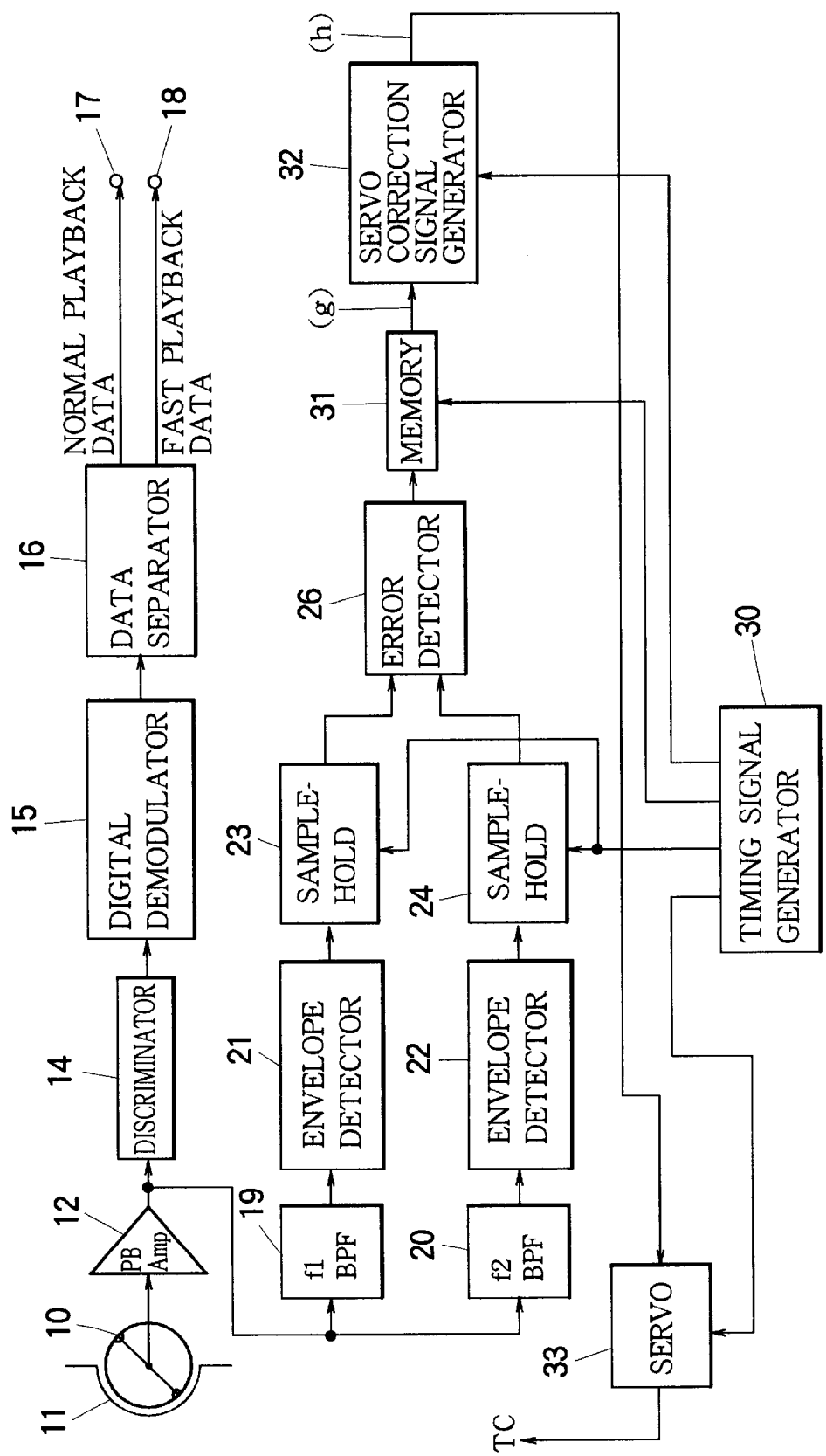

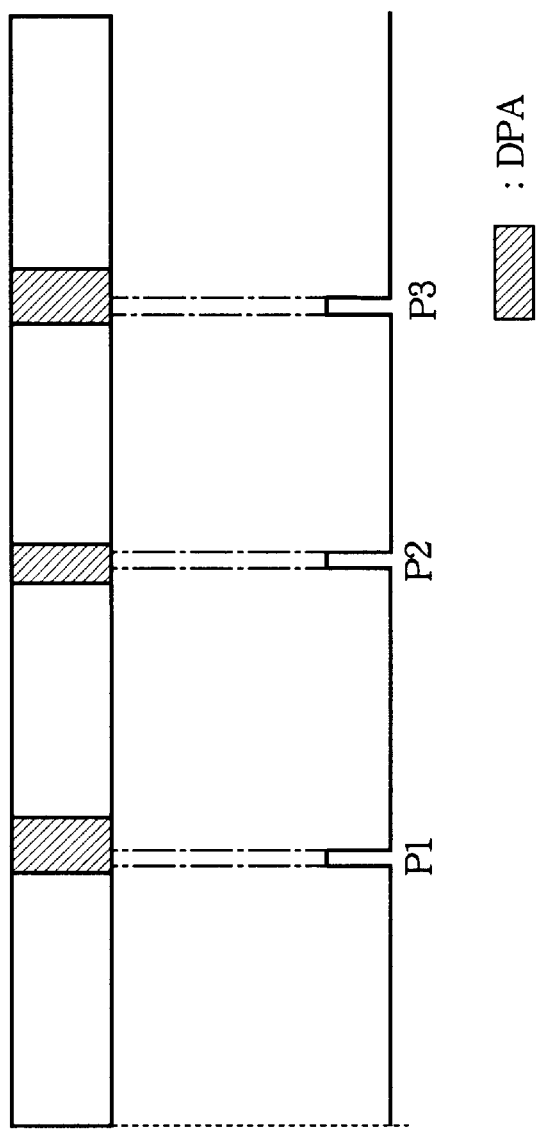

FIG.13
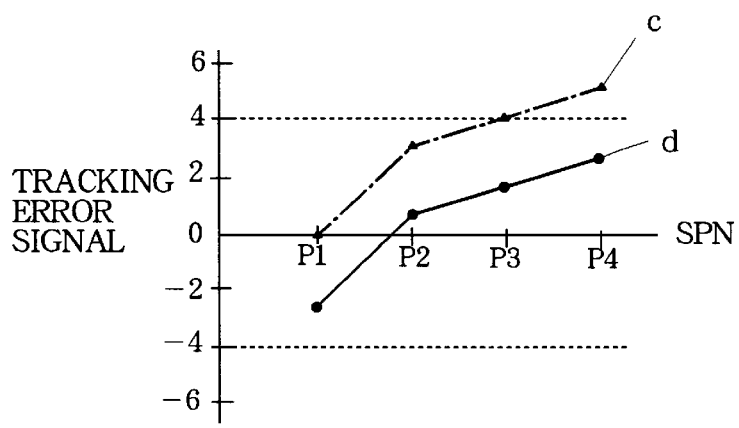
FIG.14A HEAD 1 SCAN
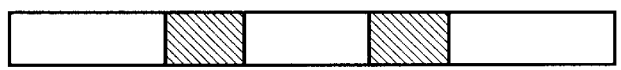
FIG.14B SAMPLING PULSE

FIG. 15A
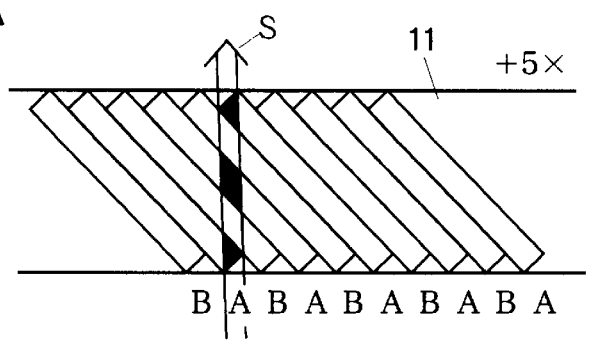
FIG. 15B
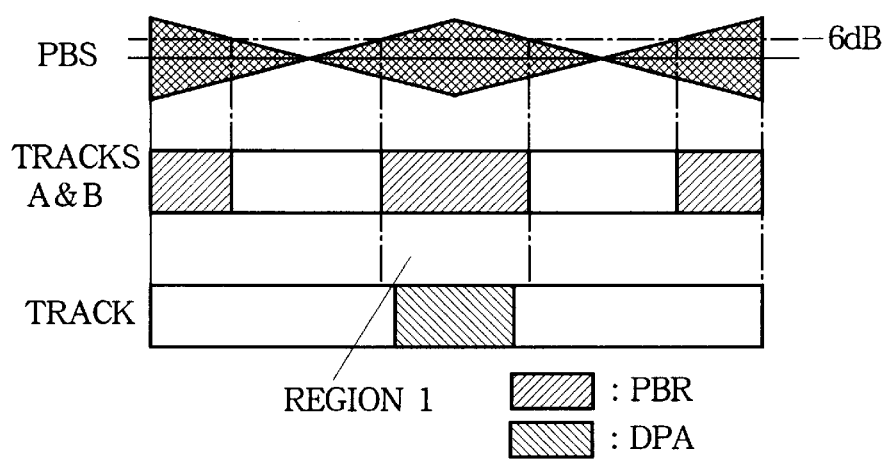
FIG. 16A   HEAD 1 SCAN
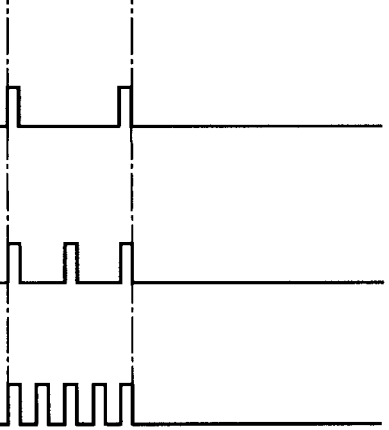
FIG. 16B   SAMPLING PULSE 1
FIG. 16C   SAMPLING PULSE 2
FIG. 16D   SAMPLING PULSE 3

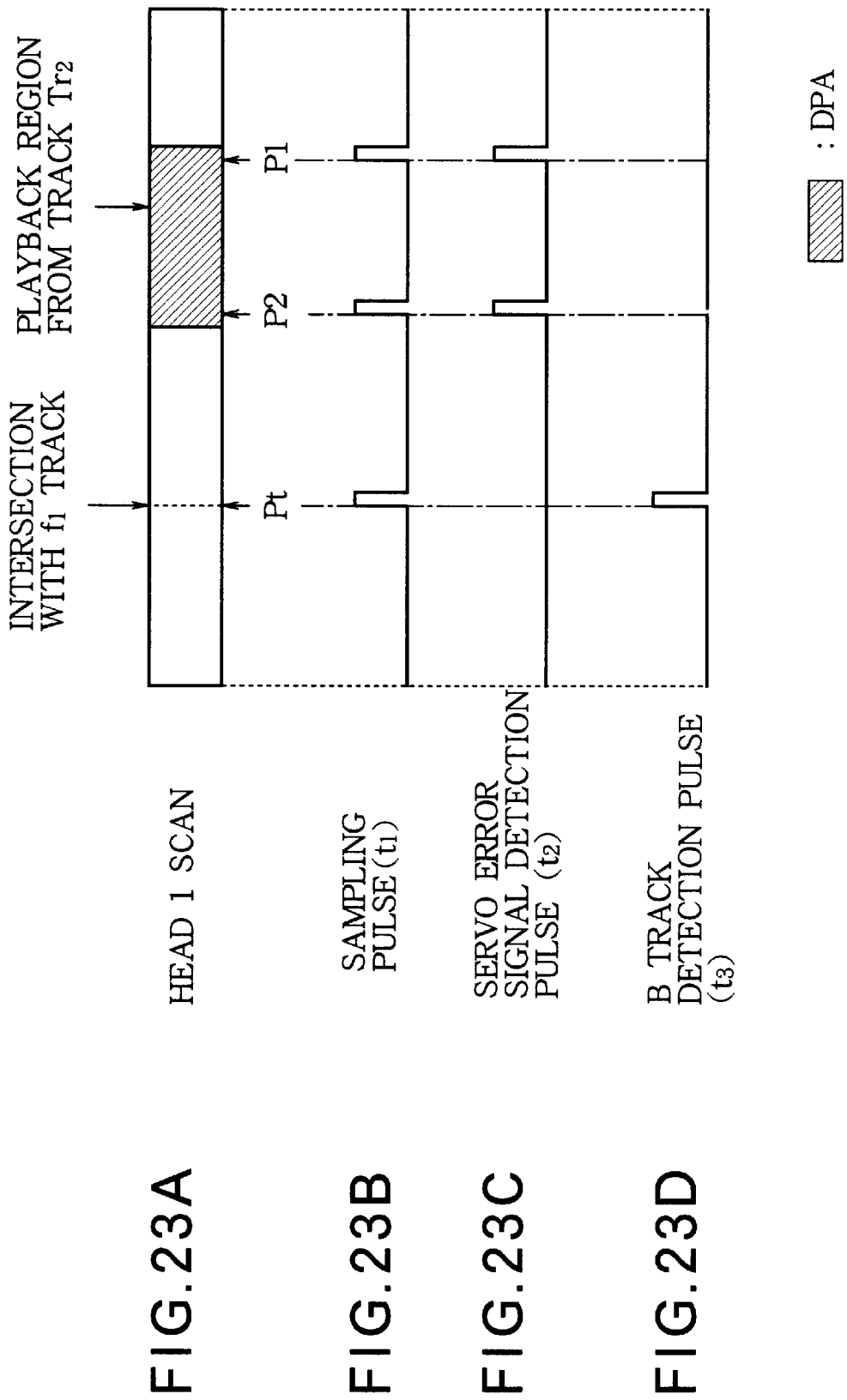

FIG. 30
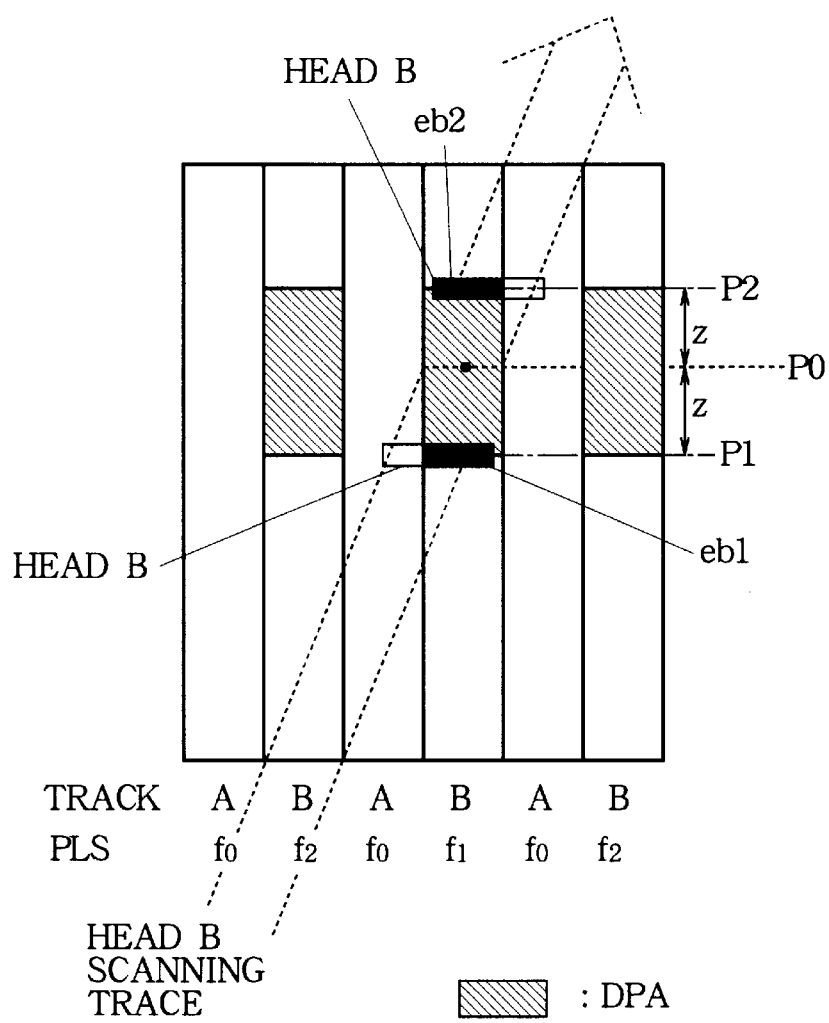
FIG. 31A
FIG. 31B
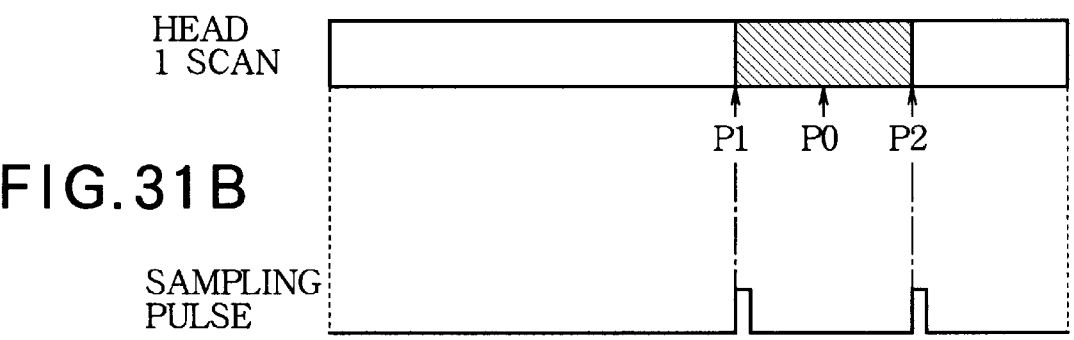

: DPA

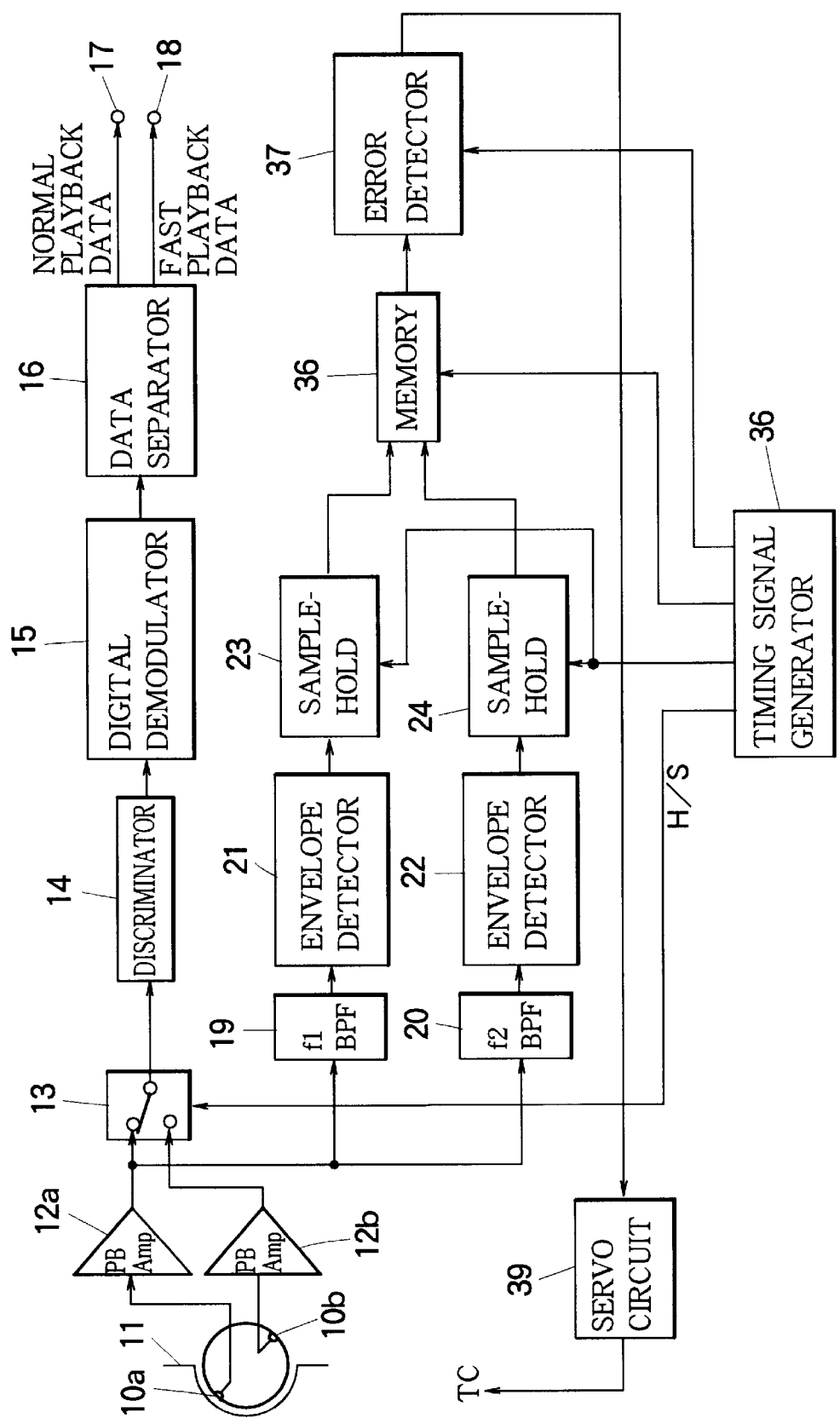

FIG.59
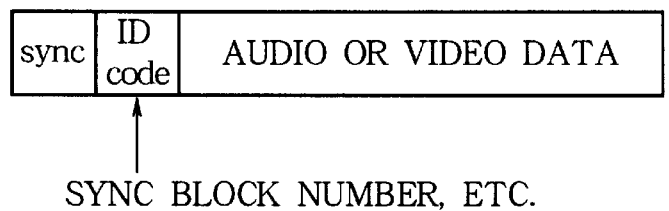
SYNC BLOCK NUMBER, ETC.
FIG.60A
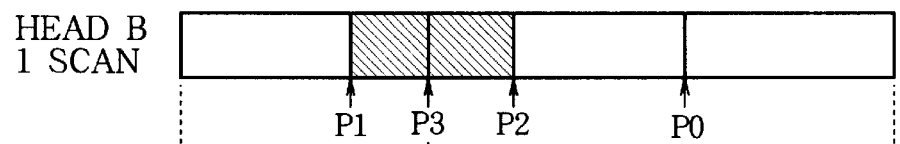
FIG.60B
FLAG GENERATOR
OUTPUT FLAG
SIGNAL
FIG.60C
SAMPLING
PULSE
▨ : DPA

FIG.72A
PRIOR ART
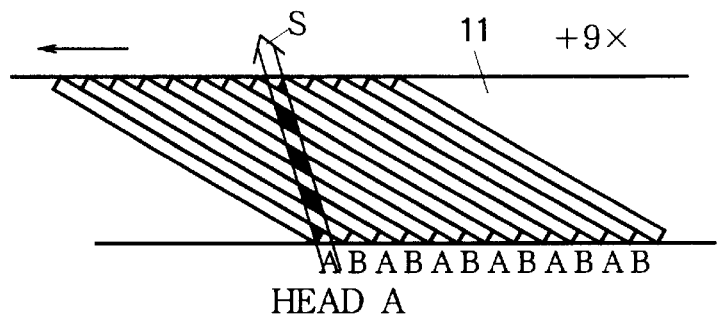
FIG.72B
PRIOR ART
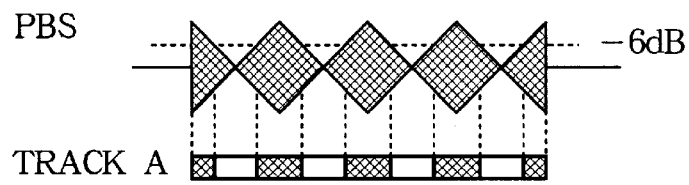
FIG.73
PRIOR ART
<4×>
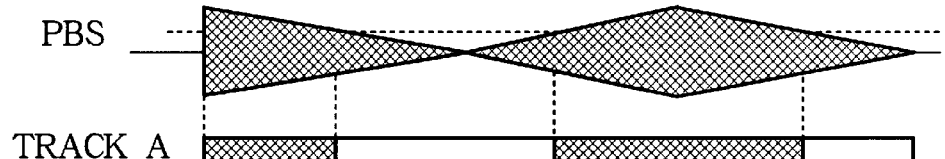
<9×>
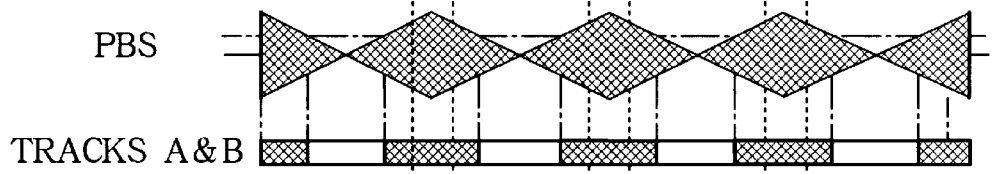
<17×>
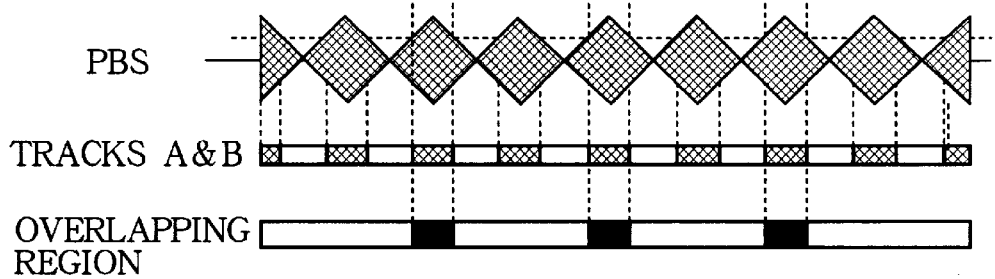

MAGNETIC RECORDING AND PLAYBACK DEVICE WHICH PROCESSES ERROR SIGNALS TO OBTAIN A SERVO CORRECTION SIGNAL

This application is a continuation, of application Ser. No. 08/497,752 filed on Jul. 3, 1995, now abandoned.

BACKGROUND OF THE INVENTION

The present invention relates a digital video tape recorder (hereinafter referred to as digital VTR) for recording digital video and audio signals on respective predefined areas on oblique tracks, and in particular to a magnetic recording and playback device into which the digital video signal and audio signal are input in the form of a bitstream, and recorded, and played back.

FIG. 64 shows tracks in a conventional consumer digital VTR. As illustrated, a magnetic tape 11 is provided with a plurality of oblique tracks in the head scanning direction inclined with respect to the tape transport direction, and digital video and audio signals are recorded on the tracks. Each oblique track is divided into a video area for recording digital video signals and an audio area for recording digital audio signals.

There are two methods for recording video and audio signals on the video tape of such a consumer digital VTR. In one method, analog video and audio signals are input, and a high-efficiency encodes is used to record the video and audio signal. The other method is a transparent recording method in which the digitally transmitted bitstream is recorded.

For recording ATV (advanced television) signals being discussed in the United States, the latter transparent recording method is considered suitable. The reason is that the ATV signal is a digital compressed signal, and does not require a high-efficiency encoder and decoder, and there is no degradation in the picture quality as the data is recorded as it is. A drawback of the transparent recording is the poor picture quality during special playback, such as fast playback, still playback and slow playback. In particular, if the bitstream is recorded on the oblique tracks as it is, almost no picture is reproduced during fast playback.

An improvement of the picture quality in the digital VTR for recording the ATV signal is proposed in an International Workshop on HDTV '93 concerning the HDTV held in Ottawa, Canada, on Oct. 26 to 28, 1993, in an article "A Recording Method of ATV data on a Consumer Digital VCR." The contents of this proposal will be described next.

As a basic specification for the prototype consumer digital VTR, the recording rate is set to be 25 Mbps and the field frequency is 60 Hz in the SD (standard definition) mode, one frame of image is recorded over 10 tracks. If the ATV signal data rate is 17 to 18 Mbps, transparent recording of the ATV signal in the SD mode is possible.

FIG. 65A and FIG. 65B show tracks formed on a magnetic tape in a digital VTR. FIG. 65A shows the scanning traces of the rotary head during normal playback, while FIG. 65B shows a scanning trace of the rotary head during fast playback. It is assumed that the rotary heads are provided in opposition, 180° apart, on a rotary drum, and the magnetic tape is wrapped around the drum over 180°. In the drawing, the tracks A and tracks B are scanned by rotary heads having different azimuth angles, and are formed alternately. During normal playback, the tape transport speed is the same as in recording. The rotary heads therefore trace along the recorded oblique tracks as indicated by arrows in FIG. 65A. During fast playback, however, the tape speed is different from that for recording, so that the rotary heads cross several tracks on the magnetic tape 11 during tracing, and signals are reproduced only from fractions of the tracks of identical azimuth. FIG. 65B indicates the region from which the signals are reproduced during five-time speed playback by an arrow having a width corresponding to the track width. That is, only fractions of digital data can be reproduced from the three regions which are marked with dots.

With the bitstream in accordance with the MPEG2 (Moving Pictures Expert Group 2) standard, only the intra-encoded blocks are decoded independently, i.e., without referring to other frames. If the MPEG2 bitstream were recorded on each track in the order corresponding to the order of frames and the position on the display screen, the picture would have to be reconstructed from the intra-codes obtained from the burst (part of the signal from the head having a sufficient amplitude) of the playback data during fast playback. The areas on the screen that would be reproduced would not be continuous, and fractions of blocks would be scattered on the screen. Moreover, since the bitstream is variable-length encoded, there is no guarantee that the entire screen is periodically updated, and the playback data for a part of image area may be left un-updated for a considerable time. As a result, the picture quality during fast playback is not satisfactory, and is not acceptable for a consumer digital VTR.

FIG. 66 is a block diagram showing the configuration of the recording section of the bitstream recording and playback device capable of fast playback. Reference numeral 1 denotes an input terminal, 2 denotes a variable-length decoder, 3 denotes counter, 4 denotes a data extractor, 5 denotes an EOB (end of block) appending circuit, 6 denotes a timing signal generator for generating sync signal and timing signals including a signal indicating the track on which recording is to be made, and 7 denotes a format circuit. The format circuit 7 constructs sync blocks of the recording signals, on the basis of the timing signal from the timing signal generator 6, and forms recording signals so as to record the duplication area data from the EOB appending circuit 5 on predefined track positions. Reference numeral 8 denotes a digital modulator, which performs digital modulation on the basis of the timing signal from the timing signal generator 6, appending the pilot signals for use in tracking during playback, to the recording signals for each track. Reference numeral 9 denotes a recording amplifier, 10a and 10b denote heads A and B having different azimuths A and B, and 11 denotes a tape.

The image area on each track is divided into main areas for recording bitstreams of all the ATV signal, and duplication areas for recording important parts (HP data) of the bitstream used for reconstruction of pictures during fast playback. During fast playback, only the intra-encoded blocks are effective, so that only the intra-encoded blocks are recorded as HP data in the duplication areas. But, for reducing the amount of data further, low-frequency parts of the intra-encoded blocks are extracted and recorded as HP data.

The recording operation of the bitstream recording and playback device of the above configuration will next be described. The MPEG2 bitstream is input via the input terminal 1 directly to the format circuit 7, where it is constructed into a recording signal in accordance with the timing signals from the timing signal generator 6. The recording signal is then supplied to the digital modulator 8, which performs digital-modulation of the recording signal in accordance with the 24–25 modulation system for consumer digital VTRs. The pilot signals for use in tracking are also appended at the time of the digital modulation. The pilot signals include signals having frequencies different between adjacent tracks.

FIG. 67 shows an example of a pattern of tracking pilot signals in a consumer digital VTR. As the pilot signals for tracking, pilot signals of frequencies f1 and f2 are alternately recorded in B azimuth tracks recorded by the head 10b, while no pilot signal is appended to A azimuth tracks, (which are called f0 tracks). The regions y1 and y2 are parts of the trace by the head A exceeding the width of the recording track (track pitch) on the magnetic tape 11. The areas of these regions represent the magnitudes of the cross-talk components read as f1 and f2 pilot signals from the tracks adjacent to, and to the left and right of the f0 track. The frequency spectra of the playback signals from the A and B tracks are as shown in FIG. 68. The recording signal to which the pilot signals are appended is amplified at the recording amplifier 9, and then sequentially recorded by the heads 10a and 10b in the main areas on the respective tracks on the tape 11.

The bitstream via the input terminal 1 is also input to the variable-length decoder 2, where the syntax of the MPEG2 bitstream is analyzed, and intra-encoded blocks are thereby detected. The counter 3 generates a timing signal from this intra-picture, and the data extractor 4 extracts the low-frequency components of all the blocks, and the EOB appending circuit 5 appends EOBs. The output of the EOB appending circuit 5 is supplied to the format circuit 7, which forms HP data. In the same way as the recording data for the main areas, the format circuit 7 forms recording signal for recording in the predefined positions on the recording tracks in accordance with the timing signals from the timing signal generator 6, and this recording signal is supplied to the digital modulator 8. The digital modulator performs digital-modulation of the recording signal, and the recording amplifier 9 amplifies the recording signal, and the amplified recording signal is then recorded by the heads 10a and 10b in the duplication areas on the respective tracks on the tape 11.

FIG. 69 is a block diagram showing the configuration of the playback section of the conventional bitstream recording and playback device. In the drawing, 10a and 10b denote heads, 11 denotes a tape, 12a and 12b denote playback amplifiers, and 13 denotes a switch for switching between the outputs from the A azimuth tracks (f0 tracks in FIG. 67) and B azimuth track (f1 and f2 tracks in FIG. 67) in accordance with the head selection signal indicating the head which is reading the signal. Reference numeral 14 denotes a discriminator for discriminating the signal, i.e., finding whether the signal read by the head represents "1" or "0". Reference numeral 15 denotes a digital demodulator, 16 denotes a data separator, 17 and 18 denote output terminals, 19 denotes a bandpass filter for extracting pilot signal component of frequency f1 in the playback signal, 20 denotes a bandpass filter for extracting pilot signal component of frequency f2 in the playback signal, and 21 and 22 denote envelope detectors for envelope-detect the outputs of the bandpass filters 19 and 20. Reference numerals 23 and 24 denote sample-hold circuits, 25 denotes a timing signal generator, 26 denotes an error detector which detects the difference between the cross-talk components of the pilot signals of frequencies f1 and f2 in the playback signal, and thereby detects the tracking error, and 27 denotes a servo circuit for performing tracking control and the like.

During normal playback, the heads 10a and 10b read the playback signal from the tracks on the tape 11, and the playback amplifiers 12a and 12b amplify the signals, and supply them to the switch 13, which alternately selects the signals from the heads in accordance with the head selection signal from the timing signal generator 25. The discriminator 14 discriminates the playback signal, and the digital demodulator 15 performs digital demodulation to restore the original bitstream, which is then supplied to the data separator 16. The data separator 16 separates the bitstream into the bitstream recorded in the main areas and the HP data in the duplication areas, and supplies the bitstream as normal playback data via the output terminal 17, and the data of the duplication areas as the fast playback data via the output terminal 18, to the MPEG2 decoder provided outside the playback system of the digital VTR.

During normal playback, the HP data is discarded. The output of the playback amplifier 12a, which is the playback signal read by the head 10a from the A azimuth tracks is also input to the bandpass filters 19 and 20, which extract the f1 and f2 components in the playback signal. The respective frequency components from the bandpass filters 19 and 20 are envelope-detected at the envelope detectors 21 and 22, and then supplied to the sample-hold circuits 23 and 24.

The sample-hold circuits 23 and 24 sample and hold the f1 and f2 components having been envelope-detected at the envelope detectors 21 and 22 in accordance with the sampling pulses from the timing signal generator 25, and supply the values at the sampling points to the error detector 26. The error detector 26 detects the difference of the f1 and f2 pilot signal components, to thereby detect the tracking error, and supplies the result of detection to the servo circuit 27. The servo circuit 27 effects tracking control in accordance with the result of error detection.

FIG. 70A shows the recording format used by the conventional bitstream recording and playback device, and FIG. 70B shows the sampling pulse used for tracking error detection. The sampling pulse supplied from the timing signal generator 25 to the sample-hold circuits 23 and 24 is positioned at the lower end of the track, and has a sampling point in an ITI area to which a pilot signal of a constant amplitude is appended. Then, a tracking control signal is formed from the result of error detection at the above-mentioned sampling point.

FIG. 71A and FIG. 71B explain the relationship between the tracking error signal (TC) and the servo control. FIG. 71A shows the state in which the tracking error is zero, while FIG. 71B shows the state in which there is some tracking error. When the head A is correctly tracking the A azimuth track, the head A reads the playback signal from the f0 track, while following the scanning trace S0, and the f1 and f2 components y10 and y20 of the pilot signals (PLS) which are the cross-talk components from the left and right, adjacent tracks are of the same magnitude. When there is a tracking error x as shown in FIG. 71B, and the scanning trace is S1, the difference between y11 and y21 is no-zero, and its sign depends on the direction of the error.

Accordingly, the pilot signal frequency f1 and f2 components y1 and y2 contained in the playback signal from the head A during playback are extracted at the sampling point (SPN), and the correction is made such that the magnitudes of these components are equal. That is, the error detector 26 detects the difference (y1–y2) between y1 and y2, and tracking control is made such that (y1–y2) equals zero. In this way the tracking error x is reduced to zero.

During fast playback, the tracking control is performed at the ITI area on the track, in the same way as in normal playback described above, and the playback signals (PBS) from the heads 10a and 10b are amplified at the playback amplifiers 12a and 12b. The switch 13 selects the playback signals and supplies them to the discriminator 14. The discriminator 14 discriminates the playback signal supplied via the switch 13, and the digital demodulator 15 performs digital demodulation to restore the bitstream playback signal, which is then supplied to the data separator 16. The HP data from the duplication areas separated at the data separator 16 and output to the output terminal 18 is collected, and supplied to the decoder, while the bitstream from the main areas is discarded.

The disposition of the main areas and the duplication areas on the track will be described next.

FIG. 72A and FIG. 72B explain the fast playback. FIG. 72A shows the scanning trace of the head, and FIG. 72B shows the tracking regions from which reproduction is possible. If the tape speed is an integer multiple speed, and phase-locked control is achieved, the head scanning is in synchronism with identical azimuth tracks. Of the tracks alternately recorded by two recording heads A and B, the data recording positions from which reproduction (to any degree) by the head A is possible are fixed at the portions painted with solid black, within the region of arrow S. The width of the arrow S represents the width of the head. If the effective reproduction is possible from such a part where the output level of the playback signal (PBS) is larger than −6 dB, the data effectively reproduced by one head from the tracks A are those recorded in the regions meshed in FIG. 72B.

FIG. 72A and FIG. 72B show the case of 9-time speed playback, and at 9-time speed playback, the reading of signals from the meshed regions is ensured. However, at other speeds, signal reading is not ensured. To form a configuration which enables reading at various tape speed, the regions in which the HP data is recorded need to be selected properly.

FIG. 73 shows overlapping regions of duplication areas for three tape speeds at which the head is in synchronism with identical azimuth tracks. The scanning regions from which reading by the head is possible include overlapping regions for different tape speeds. By selecting the duplication areas from the overlapping regions, reading of HP data is ensured. The drawing shows the example where the fast playback is at 4-time, 9-time and 17-time speeds. However, the illustrated scanning regions are identical to those for -2-time, -7-time and -15-time fast playback speed (reverse playback).

The fact that there are overlapping regions for various tape speeds does not mean that it is possible to determine the recording pattern such that the same regions are always traced by the head. This is because the number of tracks crossed by the head differs depending on the tape speed. Moreover, it is necessary that the tracing by the head can be started at any identical azimuth track. A solution to this problem is to repeatedly record identical HP data on a plurality of tracks.

FIG. 74 shows an example of head traces at different tape speeds. In the illustrated example, regions 1, 2 and 3 are selected from the overlapping regions for five-time and nine-time speeds. In this way, by repeatedly recording the HP data with a period of 9 tracks, the HP data can be reproduced at either of the five-time speed and nine-time speed.

FIG. 75A and FIG. 75B show an example of a head trace at five-time speed. As will be seen from this drawing, by repeatedly recording identical HP data on the same number of tracks as the number of the multiplier of the playback speed (the ratio of the fast playback speed to the normal playback speed), the HP data can be read by the head A or head B in synchronism with the identical azimuth tracks. By providing the duplication areas on the same number of tracks as the multiplier of the maximum playback speed, and repeatedly recording HP data, the HP data can be read at various speeds, and in either the forward or reverse direction.

FIG. 76 shows the recording format on the tracks in a conventional digital VTR. Main areas (MNA) and duplication areas (DPA) are disposed on one track. In a consumer digital VTR, the video area in each track is formed of 135 sync blocks. In the illustrated example, the main areas are formed of 97 sync blocks, and the duplication areas are formed of 32 sync blocks The duplication areas are the overlapping regions for the 4-time, 9-time and 17-time speeds. The data rate of the main areas is about 17.46 Mbps. Identical data are recorded 17 times in the duplication areas, so that their data rate is about 338.8 kbps.

Because the conventional bitstream recording and playback device is configured as described above, the duplication areas for recording fast playback data (HP data) are limited to the regions from which the reproduction is commonly possible at a plurality of fast playback speeds. Moreover, recording track non-linearity may occur during recording due to the head, the drum transport mechanism, or the mounting position of the head on the drum, or when the head trace during playback is non-linear, then there occurs deviation from the servo tracking point. When the track non-linearity or the like occurs, some of the fast playback data cannot be reproduced, even if the duplication areas are disposed at a plurality of locations on the head traces.

In particular, when the fast playback data is reproduced from the duplication areas disposed at locations distant from the servo tracking control point, the effects of the track non-linearity on the magnetic tape is considerable.

A second problem is that when the fast playback data is recorded on limited regions only, taking account of the track non-linearity, the amount of data that can be recorded is reduced. This is because the duplication areas for recording fast playback data are limited by the head traces during the highest-speed fast playback.

A third problem is that it is necessary to identify the position of the playback track during fast playback. Depending on the setting of the playback speed, the duplication areas may be disposed in which the fast playback data are repeatedly recorded for a predetermined number of tracks. In such a case, the frequency pattern of the pilot signals is identified from the tracks adjacent to the track in which the duplication area is disposed, the recording signals are configured in a predefined recording format, and the positions of the playback tracks are identified on the basis of the pilot signals during fast playback.

The tracking control during fast playback is achieved by the head A of the same azimuth as the head used to record f0 tracks. As a result, the fast playback data recording regions are limited by the fast playback traces of the head having recorded the f0 tracks. Accordingly, tracking control cannot be made using the head B of the different azimuth from the head having recorded the f0 tracks.

A fourth problem is that because the fast playback data recording regions are limited and the amount of data that can be recorded is limited, it is not possible to reproduce the data without fail by the conventional tracking control.

A fifth problem is that bandpass filters for extracting the pilot signal components for the tracking control have respective delay times, and the delay times differ depending on the pilot signals. If the delay times differ, it is not possible to accurately detect the error signals from the pilot signal components, and to achieve accurate tracking control.

SUMMARY OF THE INVENTION

The present invention has been made to solve the problems described above, and its object is to provide a magnetic recording and playback device which can record fast playback data in a largest amount for each of the fast playback speeds, and is capable of reproducing the fast playback data, without fail, even when track non-linearity occurs.

Another object of the invention is to provide a magnetic recording and playback device capable of reproducing the fast playback data, by identifying the repetition pattern of the playback tracks.

Another object of the invention is to provide a magnetic recording and playback device which can perform tracking control during fast playback by extracting pilot signals using a head having an azimuth identical to that of the track on which the fast playback data is recorded, while the head is on a track having a different azimuth from the head A further object is to provide a magnetic recording and playback device which records the fast playback data in the largest amount for each of the fast playback speeds and which can perform tracking control such that the recorded fast playback data can be reproduced without fail, without regard to the delay time of the device extracting the pilot signals.

According to one aspect of the invention, there is provided a magnetic recording and playback device in which duplication areas for recording fast playback signals are disposed on a magnetic tape on which tracking pilot signals appended to oblique tracks at k locations (k being a positive integer) from which reproduction is possible during one head trace at a predetermined fast playback speed, comprising:

error detection means (26, 41) for detecting a tracking error by extracting, from kj (kj being a positive integer) points for each of the duplication areas traced by the head, pilot signal components; and tracking control means (32, 35, 43, 44, 45) for performing tracking control on the basis of the errors detected at (k×kj) points by said error detecting means.

With the above arrangement, even if a magnetic tape in which the largest amount of fast playback data is recorded in a plurality of duplication areas is associated with a track non-linearity, the fast playback data can be reproduced without fail. Moreover, the tracking control can be performed in such a manner as to ensure reproduction of the fast playback data obtained without fail from the duplication areas at a plurality of locations.

According to another aspect of the invention, there is provided a magnetic recording and playback device in which duplication areas for recording fast playback signals are disposed on a magnetic on which tracking pilot signals are appended to oblique tracks at k locations (k being a positive integer) from which reproduction is possible during one head trace at a predetermined fast playback speed, comprising:

error detection means (41) for detecting a tracking error by extracting, from n (kj=n, being a positive integer not smaller than 2) points for each of the duplication areas traced by the head, pilot signal components sequentially recorded at ri (ri being a positive integer, and i=1, 2, . . . , s, Σri=k×n) points; and tracking control means (35) for performing tracking control on the basis of the (k×n) error signals detected at all the points for every s scans.

With the above arrangement, even if a magnetic tape in which the largest amount of fast playback data is recorded in a plurality of duplication areas is associated with a track non-linearity, the fast playback data can be reproduced without fail. Moreover, the tracking control can be performed in such a manner as to ensure reproduction of the fast playback data obtained without fail from the duplication areas at a plurality of locations.

In addition, the time for processing in the memory, peak detector, servo correction signal generator, and the like can be shortened, and the amount of hardware can be reduced.

According to another aspect of the invention, there is provided a magnetic recording and playback device in which duplication areas in which fast playback signal is recorded at t (t being a positive integer not smaller than 2) track interval are disposed, on a magnetic tape having oblique tracks with tracking pilot signals appended thereto, at k (k being a positive integer) locations from which reproduction is possible by a head by one trace at a predetermined fast playback speed, said device comprising:

error detecting means (26) extracting, from Kj (kj being a positive integer) points for each of the duplication areas traced by said head, the pilot signal appended thereto, to detect the tracking error;

track pattern detecting means (52) extracting the pilot signal component in the vicinity of an intersection of the center of at least one track adjacent a track on which the fast playback signal is recorded, with the center of the head, to thereby detect the repetition pattern of the pilot signal; and tracking control means (32) performing tracking control on the basis of the error detected by the error detecting means at (k×kj) points on t-tracks, and the repetition pattern of the pilot signals detected by said track pattern detecting means.

With the above arrangement, by identifying the repetition pattern of pilot signals of the playback tracks, even if a track non-linearity occurs in a magnetic tape in which the largest amount of fast playback data is recorded in a plurality of duplication areas, tracking control is performed such that the fast playback data is obtained without fail.

The tracking control means (32, 35, 45) may comprise calculating means for calculating the average value of the errors detected by said error detecting means at a plurality of points.

The tracking control means (32, 35, 45) may comprise alternatively comprise calculating means for calculating the average value of the maximum and minimum values of the errors detected by said error detecting means at a plurality of points.

The tracking control means (32, 35, 43, 44, 45) may still alternatively comprise calculating means (43, 44, 45) for calculating $$j3 = \alpha \times j1 + (1-\alpha) \times j2 (0 \leq \alpha \leq 1),$$

from the average j1 of the errors detected by said error detecting means at a plurality of points, and the average j2 of the maximum and minimum values of said errors.

With the above arrangement, even if a track non-linearity occurs in a magnetic tape in which the largest amount of fast playback data is recorded in a plurality of duplication areas, fast playback data is reproduced without fail. Moreover, the tracking can be controlled so that the fast playback data can be obtained without fail from duplication areas at a plurality of locations.

According to another aspect of the invention, there is provided a magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace at a predetermined fast playback speed, said device comprising:

signal extracting means (23, 24) for extracting pilot signal components of the same frequency recorded on a track, at two points positioned on the track, opposite to each other with reference to an intersection of the center of said track with the center of the head, in the duplication area, and at a distance z shorter than the playback burst length by said head, from said intersection, error detecting means (29) for comparing the levels of the pilot signals extracted by said extracting means to detect the tracking error; and tracking control means (33) for performing tracking control on the basis of the error detected by said error detecting means.

With the above arrangement, even where the largest amount of fast playback data is recorded and a track non-linearity occurs, fast playback data is reproduced without fail. Moreover, the tracking can be controlled so that the fast playback signals can be obtained without fail from duplication areas. Furthermore, since the control is made through comparison of pilot signals of the same frequency, the difference in the level of the reproduced pilot signal due to the characteristics of the heads and tape is eliminated, so that the components can be compared more accurately, and the tracking control is performed such that the fast playback signals can be obtained without fail.

According to another aspect of the invention, there is provided a magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace at a predetermined fast playback speed, said device comprising:

signal extracting means (23, 24) for extracting first and second pilot signal components by cross-talk from tracks adjacent to a track, at two points positioned on the track, opposite to each other with reference to an intersection of the center of said track with the center of the head, in the duplication area, and at a distance z shorter than the playback burst length by said head, from said intersection, error detecting (37) means for comparing the level of the first pilot signal reproduced mainly at one of the two points, and the level of the second pilot signal reproduced mainly at the other of the two points; and tracking control means (39) for performing tracking control on the basis of the error detected by said error detecting means.

With the above arrangement, even where the largest amount of fast playback data is recorded and a track non-linearity occurs, fast playback data is reproduced without fail. Moreover, the tracking control is performed such that the signals in the fast playback regions can be obtained without fail.

The two points at said signal extracting means may be at both ends of the duplication area.

With the above arrangement, even where the largest amount of fast playback data is recorded and a track non-linearity occurs, fast playback data is reproduced without fail. Moreover, the tracking control is performed such that the signals in the fast playback regions can be obtained without fail.

According to another aspect of the invention, there is provided a magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

signal extracting means (23, 24) for extracting pilot signal components recorded on tracks of a first azimuth (B) adjacent to a track of a second azimuth (A) on which recording was made by a head of the second azimuth, taking as a reference an intersection of the center of a head of said first azimuth of the same azimuth as the track in which the duplication area is disposed, with the center of the track recorded by the head of said second azimuth, said first and second azimuths being different from each other;

error detecting means (26) for comparing the levels of the pilot signals extracted by said extracting means to detect the tracking error; and tracking control means (33) for performing tracking control on the basis of the error detected by said error detecting means.

With the above arrangement, the tracking control during fast playback can be achieved by extracting pilot signals by a head on a track of an azimuth different from the azimuth of the head. Moreover, the fast playback signals can be obtained without fail from a magnetic tape on which the largest amount of fast playback data is recorded in the duplication areas.

It may be so arranged that the center of said head of the first azimuth intersect, during one trace of the head, the center of the track recorded by said head of said second azimuth at a plurality of points, and the pilot signal components are extracted, taking each of said points of intersection as a reference, and tracking control is performed on basis of the errors at the plurality of intersections.

With the above arrangement, the tracking control during fast playback can be achieved by extracting pilot signals by a head on a track of recorded by a head of a different azimuth. Moreover, the fast playback signals can be obtained without fail from a magnetic tape on which the largest amount of fast playback data is recorded in the duplication areas. Furthermore, tracking control is performed on the basis of the error signal at a plurality of intersections in one trace by a head during fast playback, so that fast playback data can be obtained more reliably.

According to another aspect of the invention, there is provided a magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

position detecting means (40) for detecting that the head is scanning the predetermined position of the duplication area;

flag generating means (49) for generating a flag signal indicating the point at which the center of a head of a first azimuth and the center of the track recorded by a head of a second azimuth different from said first azimuth intersect, taking the position detected by said position detecting means as a reference;

signal extracting means (23, 24) for extracting pilot signal components recorded on adjacent tracks at a point where the flag signal is generated;

error detecting means (26) for comparing the levels of the pilot signals extracted by said extracting means to detect the tracking error; and tracking control means (33) for performing tracking control on the basis of the error detected by said error detecting means.

With the above arrangement, the fast playback data can be obtained without fail from the magnetic tape on which the largest amount of fast playback data is recorded in the duplication areas. The points at which the pilot signals are extracted are determined with reference to the positions detected the pilot signals reproduced by the tracing head, so that the pilot signals can be extracted at more accurate points, and the tracking control is performed more reliably.

According to another aspect of the invention, there is provided a magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

signal extracting means (23, 24) for extracting pilot signal components recorded on a track from the playback signal from a tracing head;

delay compensation means (51) for compensating for the delay time at the signal extracting means;

flag generating means for generating a flag signal indicating a point where the center of a head of a first azimuth and a center of the track recorded by a head of a second azimuth different from said first azimuth, and correcting the flag signal on the basis of the delay time compensated for by said delay compensating means;

error detecting means (26) for comparing the levels of the pilot signal components corrected by said correcting means, at a point obtained by correcting the intersection of the center of the head with the center of the track, and detecting the tracking error; and tracking control means (33) for performing tracking control on the basis of the error detected by said error detecting means.

With the above arrangement, the recorded fast playback data can be reproduced without fail, without regard to the delay time of the pilot signal extracting means.

BRIEF DESCRIPTION OF THE DRAWINGS

In the drawings:

FIG. 1 is a block diagram showing the configuration of the playback section of the bitstream recording and playback device in Embodiment 1 of the invention;

FIG. 3A and FIG. 3B show sampling points for tracking error signal detection during fast playback;

FIG. 13 shows track non-linearity and tracking error correction;

FIG. 14A and FIG. 14B show sampling points for tracking error signal detection during fast playback in Embodiment 5;

FIG. 15A is a diagram showing the head trace position on a track during five-time playback;

FIG. 15B is a diagram showing an example of playback regions;

FIG. 16A to FIG. 16D show other examples of sampling points for tracking error signal detection during fast playback;

FIG. 23A to FIG. 23D shows an example of sampling points for tracking error signal detection during fast playback;

FIG. 30 shows the disposition of the duplication areas for four-time and eight-time speed fast playback, head trace positions, and sampling points;

FIG. 31A and FIG. 31B show an example of sampling points for tracking error signal detection during fast playback in the embodiment of the invention;

FIG. 40 is a block diagram showing the configuration of the playback section of the bitstream recording and playback device in Embodiment 10;

FIG. 59 shows an example of data configuration of one sync block in a digital VTR;

FIG. 60A to FIG. 60C show sampling pulses for tracking error detection during fast playback;

FIG. 72A and FIG. 72B are diagrams for explaining fast playback, with FIG. 72A showing the head scanning trace, and FIG. 72B showing the tracking regions from which reproduction is possible;

FIG. 73 shows overlapping regions of duplication areas for three different tape speeds at which the head is in synchronism with the identical azimuth tracks;

DETAILED DESCRIPTION OF THE PREFERRED EMBODIMENTS

Embodiments of the invention will now be described with reference to the drawings.

Embodiment 1

Figure 69:
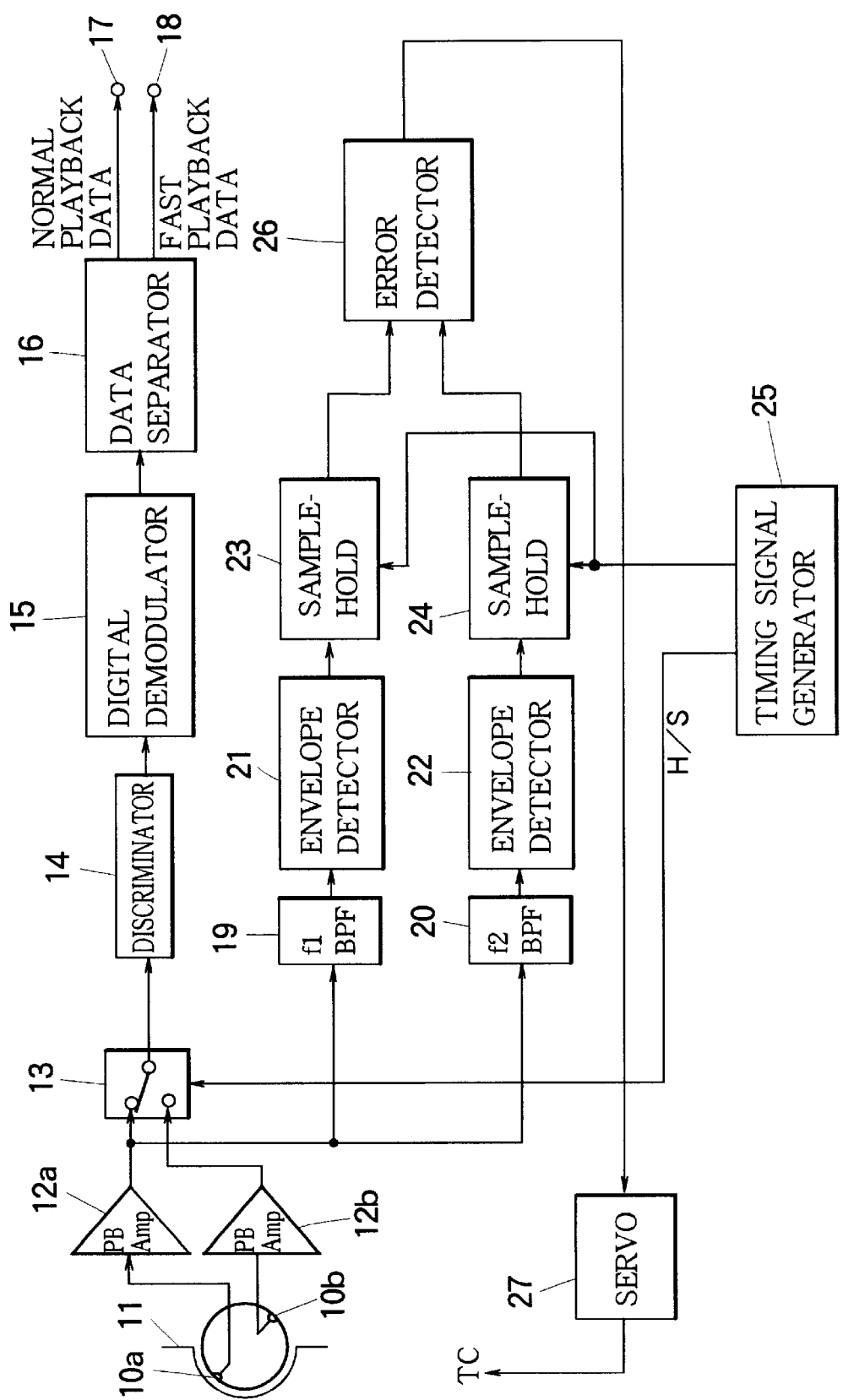
FIG. 69 is a block diagram showing the configuration of the playback section of the conventional bitstream recording and playback device.

FIG. 1 is a block diagram showing the configuration of a playback section of a bitstream recording and playback device in Embodiment 1. In the drawing, reference numerals 10 to 12, 14 to 24, and 26 denote members identical to those with the same reference numerals in the conventional bitstream recording and playback device shown in FIG. 69.

In the drawing, only one system of the playback amplifier 12 is shown. The switch 13 for switching between the playback signal outputs read from the tape 11 by the heads 10 is omitted. Reference numeral 30 denotes a timing signal generator which generates a signal determining the sampling points for the error signal detection for tracking control, timing signals for servo control, and other timing signals. Reference numeral 31 denotes a memory for storing the tracking error, and 32 denotes servo correction signal generator connected to the memory 31. The servo correction signal generator 32 generates servo correction signal (h) for controlling the tracking of the servo on the basis of the error signal (g), and supplies it to the servo circuit 33. The servo circuit 33 performs servo control such as tracking control on the basis of the timing signals and the servo correction signal from the servo correction signal generator 32.

The playback operation in the bitstream recording and playback device will next be described. First, the operation during normal playback will be described. During normal playback, the playback signal is read from the track on the tape 11 using the head 10, and the signal is amplified by the playback amplifier 12, and sent to the discriminator 14. The discriminator 14 discriminates the playback signal, and the digital demodulator 15 performs digital demodulation to restore the original bitstream, which is then input to the data separator 16. The data separator 16 separates the input bitstream into the bitstream recorded in the main area and the HP data in the duplication area, and supplies the data from the main area as normal playback data to the output terminal 17, and the HP data from the duplication area as fast playback data to the output terminal 18. The respective playback data are supplied to the MPEG2 decoder provided outside the digital VTR. However, during normal playback, the HP data is discarded. The playback signal from the playback amplifier 12 is also input to the bandpass filters 19 and 20, and frequency f1 and f2 components in the playback signal are extracted, and are detected at the envelope detectors 21 and 22, and supplied to the sample hold circuits 23 and 24.

The sample-hold circuits 23 and 24 sample and hold the f1 and f2 components detected by the envelope detectors 21 and 22 in accordance with the sampling pulses from the timing signal generator 30, and the values at the sampling points are supplied to the error detector 26. The error detector 26 detects the tracking error by detecting the difference between the cross-talk components of the pilot signals of the frequencies f1 and f2 in the playback signal, and stores the result of the detection in the memory 31. The error signal (g) stored in the memory 31 is thereafter supplied to the servo correction signal generator 32, which, on the basis thereof, generates the servo correction signal (h), and supplies it to the servo circuit 33. The servo circuit 33 generates a tracking control signal (TC) on the basis of the servo correction signal (h) and the timing signal from the timing signal generator 30, to effect tracking control.

Figures 70A, 70B:
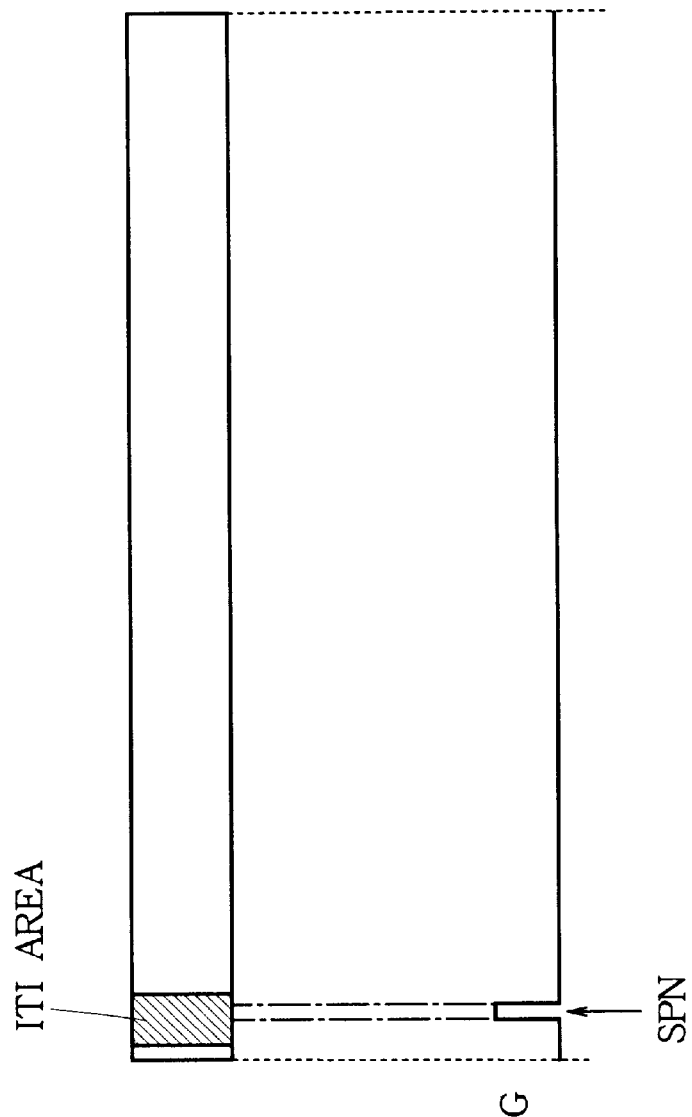
FIG. 70A shows the recording format in the conventional bitstream recording and playback device.
FIG. 70B shows the sampling pulse for tracking error signal detection.
Figure 71A:
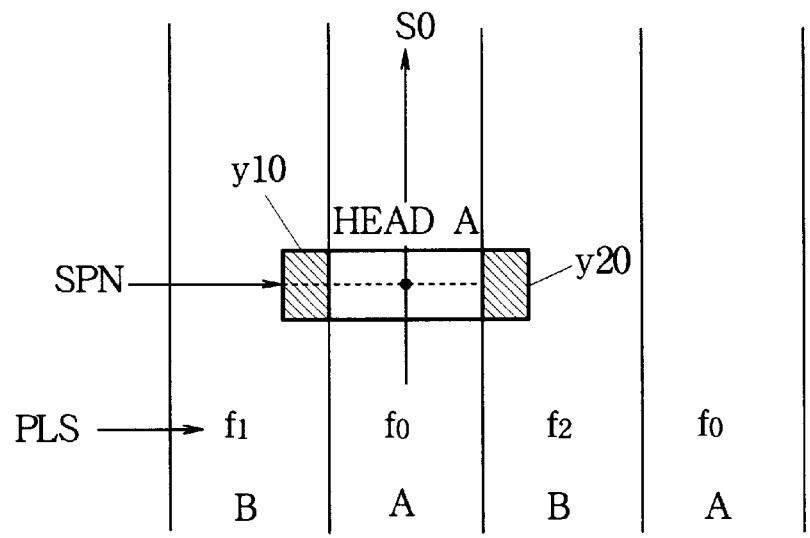
FIG. 71A and FIG. 71B are diagrams for explaining the relationship between the error signal and servo control during the tracking, with FIG. 71A showing the tracking control in a correct state, and FIG. 71B showing the tracking control with a position deviation.
Figure 71B:
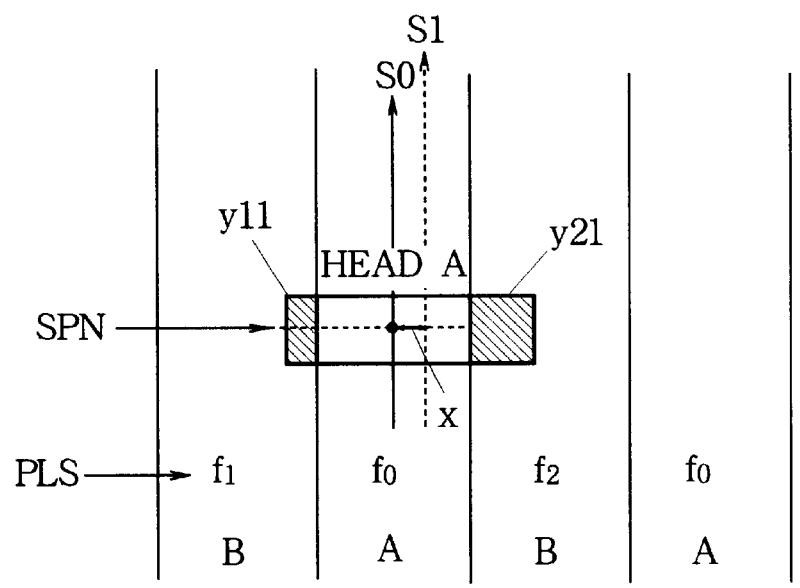
Figure 74:
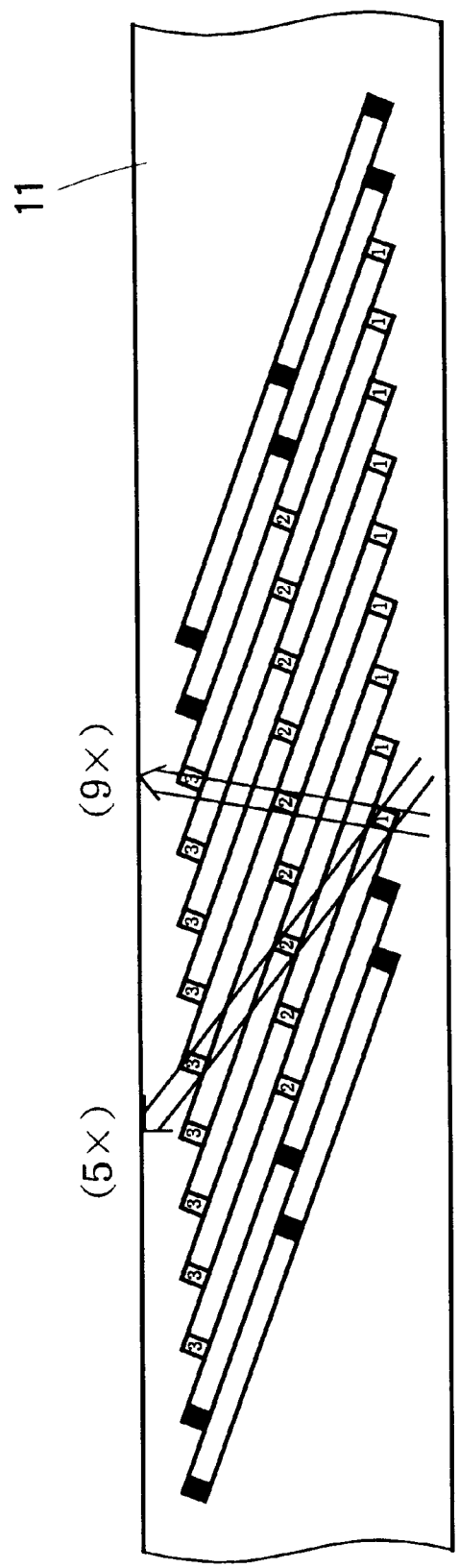
FIG. 74 shows an example of scanning traces of the rotary head at different tape speeds.
Figure 75A:
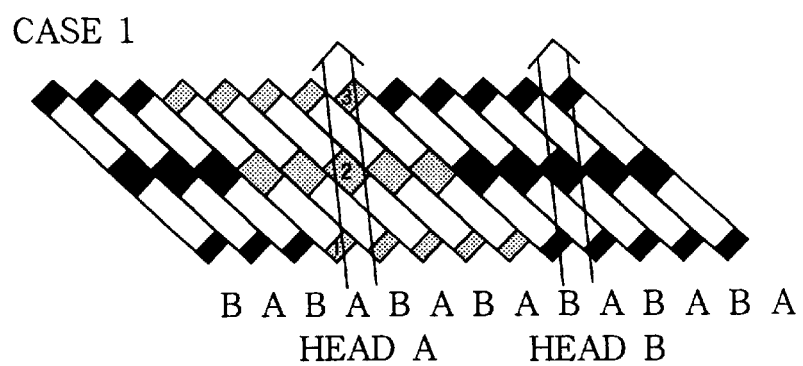
FIG. 75A and FIG. 75B show scanning traces at five-time speed playback.
Figure 75B:
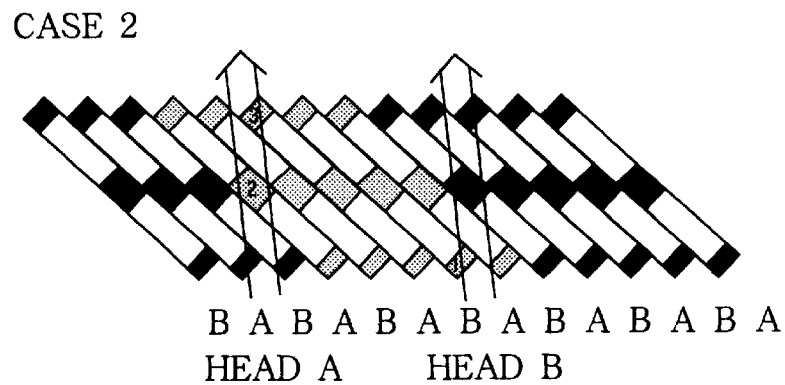

During normal playback, the sampling pulses are generated so that the sampling points are at the ITI area at the lower end of the track, like the prior art example, as shown in FIG. 70. f1 and f2 pilot signal frequency components, which are contained in the playback signal from the head tracing a f0 track, and which are cross-talk components from adjacent tracks at the sampling points are sampled, and the error of the extracted components of f1 and f2 with respect to a reference value which would be obtained when there is no tracking error, and the correction signal for correcting the error is generated at the servo correction signal generator 32, to perform the tracking control.

Figure 76:
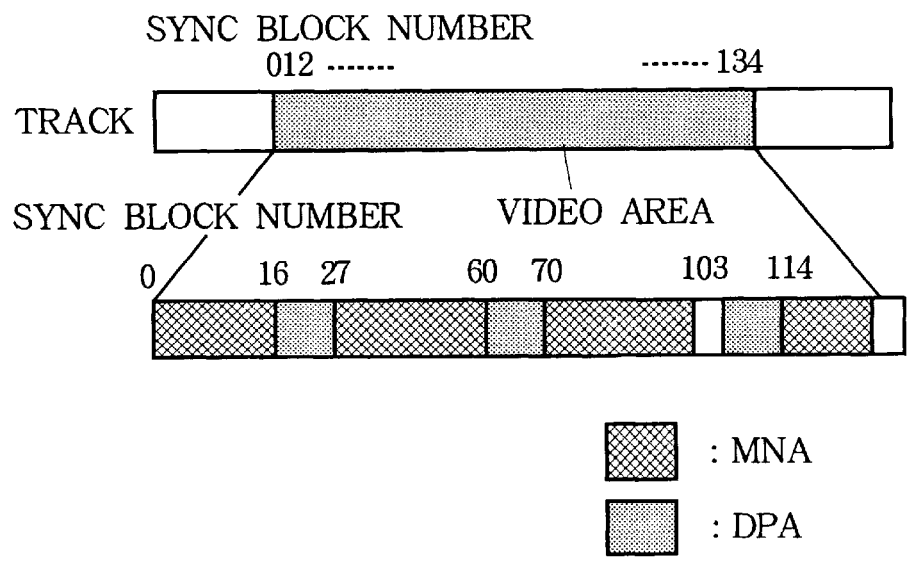
FIG. 76 shows recording format on a track in a conventional digital VTR.

The operation during fast playback will next be described. The recording format on the track on the tape 11 is assumed to be as shown in FIG. 76, in which the duplication areas for recording the HP data for fast playback are disposed at three locations in the video area on the track.

Figure 2A:
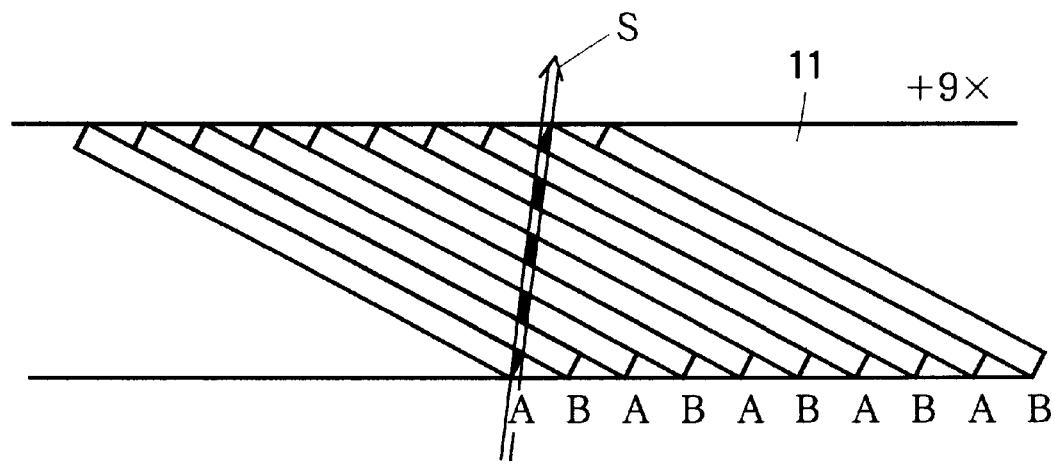
FIG. 2A is a diagram showing the head trace position on a track during nine-time playback.
Figure 2B:
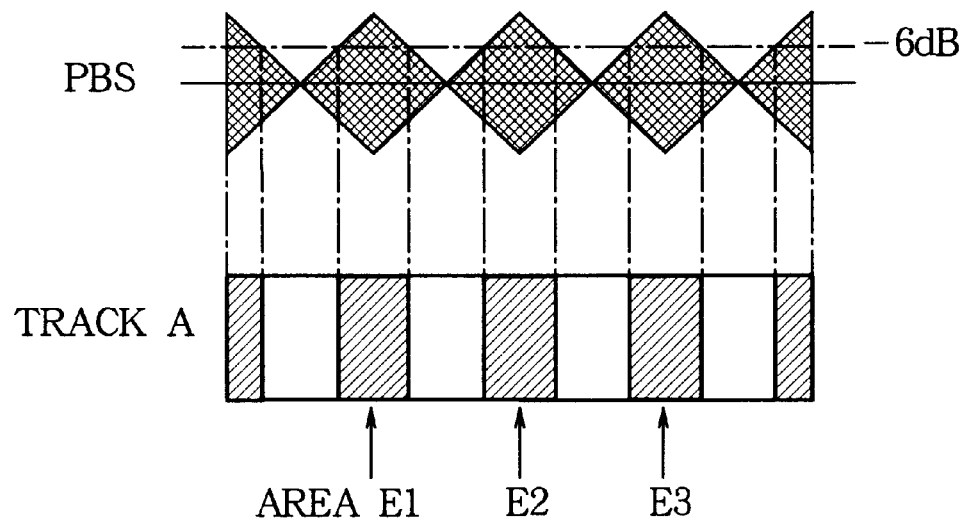
FIG. 2B is a diagram showing an example of playback regions.

FIG. 2A and FIG. 2B show the relationship between the head trace against tracks on the tape 11 and the playback region (PBR), i.e., regions from which signals are reproduced during 9-time speed playback. When the 9-time (+9 x) fast playback is performed, the head trace is as shown in FIG. 2A in which the region indicated by arrow S is scanned, and the duplication areas are disposed at the playback signal areas E1, E2 and E3, and signals are reproduced from such areas during fast playback.

During fast playback, the playback signal from the head 10 is amplified at the playback amplifier 12, and discriminated by the discriminator 14, and digital demodulation is performed at the digital demodulator 15. The output of the signal demodulator 15 is supplied to the data separator 16. Only the HP data from the duplication areas separated at the separator 16 and supplied to the output terminal 18 is sent to the MPEG2 decoder, while the bitstream from the main areas is discarded. The playback signal from the playback amplifier 12 is also supplied to the bandpass filters 19 and 20, where frequency f1 and f2 components in the playback signal are extracted, and supplied to the envelope detectors 21 and 22, and then to the sample-hold circuits 23 and 24, as in the normal operation.

FIG. 3 shows sampling points for detecting a tracking error signal (TC) during fast playback. The sample-hold circuits 23 and 24 sample and hold the f1 and f2 components having been detected by the envelope detectors 21 and 22, responsive to the sampling pulses, and outputs the values at the sampling points to the error detector 26.

The sampling pulses supplied from the timing signal generator 30 to the sample-hold circuits 23 and 24 are pulses having sampling points P1 to P3 in the three duplication areas from which the signals are reproduced. If the sampling points P1 to P3 are such points where the values of f1 component y1 and f2 component y2 from the adjacent tracks should be the same in the duplication areas, then the reference value is (y2−y1)=0, the error with respect to this reference value is detected at the error detector 26. That is, if there is no head trace deviation due to track non-linearity or the like, the value of the error signal at the sampling point is zero. The error signal detected at the error detector 26 therefore corresponds to the direction and the amount of deviation of the track due to track non-linearity. The error signal is of a negative value when the track non-linearity is convex toward the preceding tracks, and is of a positive value when the track non-linearity is convex toward the succeeding tracks.

The length of the recording region of each duplication area is determined so that it is within a range from which reproduction is possible during fast playback, and taking account of the non-linearity of the track which occurred during recording, the non-linearity of the track due to deformation of the tape during playback and the scanning error at the sampling points forming the reference during playback. As an example, let us assume that the tracking error x of the scanning trace during one scan of the head 10 during playback satisfies |x|=6 or less, and the tracking error after the servo control at the reference sampling points in the duplication areas is within a target range of x=+4. The absolute value of the difference between the maximum and minimum values of the error x at the respective sampling points is not more than 6. Here, the values of errors are expressed by an arbitrary unit (simply indicating the relative magnitude).

The error signals at the sampling points P1 to P3 detected by the error detector 26 are supplied to and stored in the memory 31, and the error signals (g) at the three points during one scan are supplied to the servo correction signal generator 32, which calculates the average value (P1 +P2+ P3)/3 of the error signals from the respective sampling points, and supplies this value (h) as the tracking correction signal to the servo circuit 33. The servo circuit 33 performs the tracking control on the basis of the servo correction signal (h) and the timing signal from the timing signal generator 30.

The servo correction signal generated from the error signals at the three sampling points will next be described with reference to Table 1 and Table 2.

Figure 4:
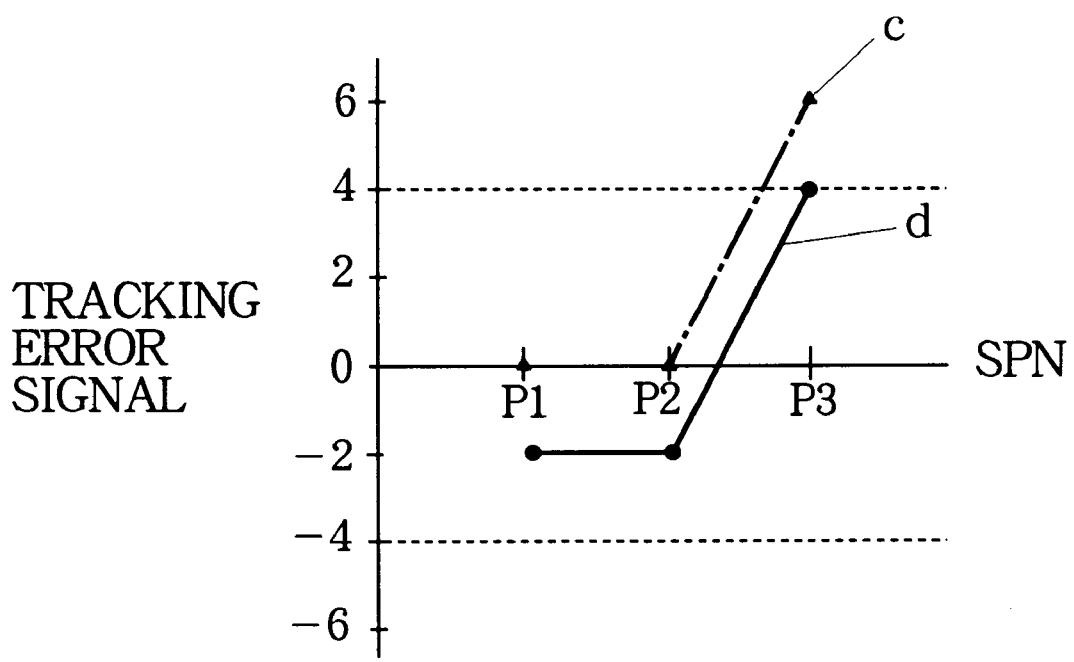
FIG. 4 shows correction of tracking error due to track non-linearity.

FIG. 4 shows the correction of tracking error due to the track non-linearity. As shown in Table 1, the servo correction signal is calculated from the error signals at the three sampling points (SPN).

TABLE 1

| Sampling Point | P1 | P2 | P3 |
|---|---|---|---|
| Memory 31 Output Error signal (g) | 0 | 0 | 6 |
| Servo Correction Signal (h) Calculate (P1 + P2 + P3)/3 | | 2 | |
| After Servo Correction Pj − h | −2 | −2 | 4 |

As shown in Table 1, when the error signals (g) at the sampling points P1 to P3 are:

(P1, P2, P3)=(0, 0, 6)

the calculation at the servo correction signal generator 32 finds the average by:

$(P1+P2+P3)/3=2$

This average value is output as the servo correction signal (h). The tracking error signals corrected on the basis of this servo correction signal (h) is supplied to the servo circuit 33, to perform the tracking control. The errors at the respective points after the correction are:

(P1-h, P2-h, P3-h)=(−2, −2, 4)

That is, the tracking errors taking account of the tracking error signals are within ±4, and the fast playback data in the duplication areas are reproduced without fail. Even if the tracking error signals c before the correction has a non-linearity as shown in FIG. 4, the tracking error signal by the tracking control after the correction is as indicated by d, and is within the range of ±4 at any points.

TABLE 2

| Sampling Point | P1 | P2 | P3 |
|---|---|---|---|
| Memory 31 Output Error signal (g) | 0 | 2 | 4 |
| Servo Correction Signal (h) Calculate (P1 + P2 + P3)/3 | | 2 | |
| After Servo Correction Pj − h | −2 | 0 | 2 |

Table 2 shows the case in which the error signals (g) at the sampling points P1 to P3 are:

(P1, P2, P3)=(0, 2, 4)

The average value of the errors is:

$(P1+P2+P3)/3=2$

Accordingly, h=2 is output as the servo correction signal (h). When the tracking control is performed by the servo circuit 33 on the basis of this servo correction signal (h), the errors at the respective points are:

$(P1-h, P2-h, P3-h)=(-2, 0, 2)$

They are thus not only within the permissible range of ±4, but also within ±2 as the errors are averaged. Accordingly, the fast playback data in the duplication areas is reproduced without fail.

Figure 5:
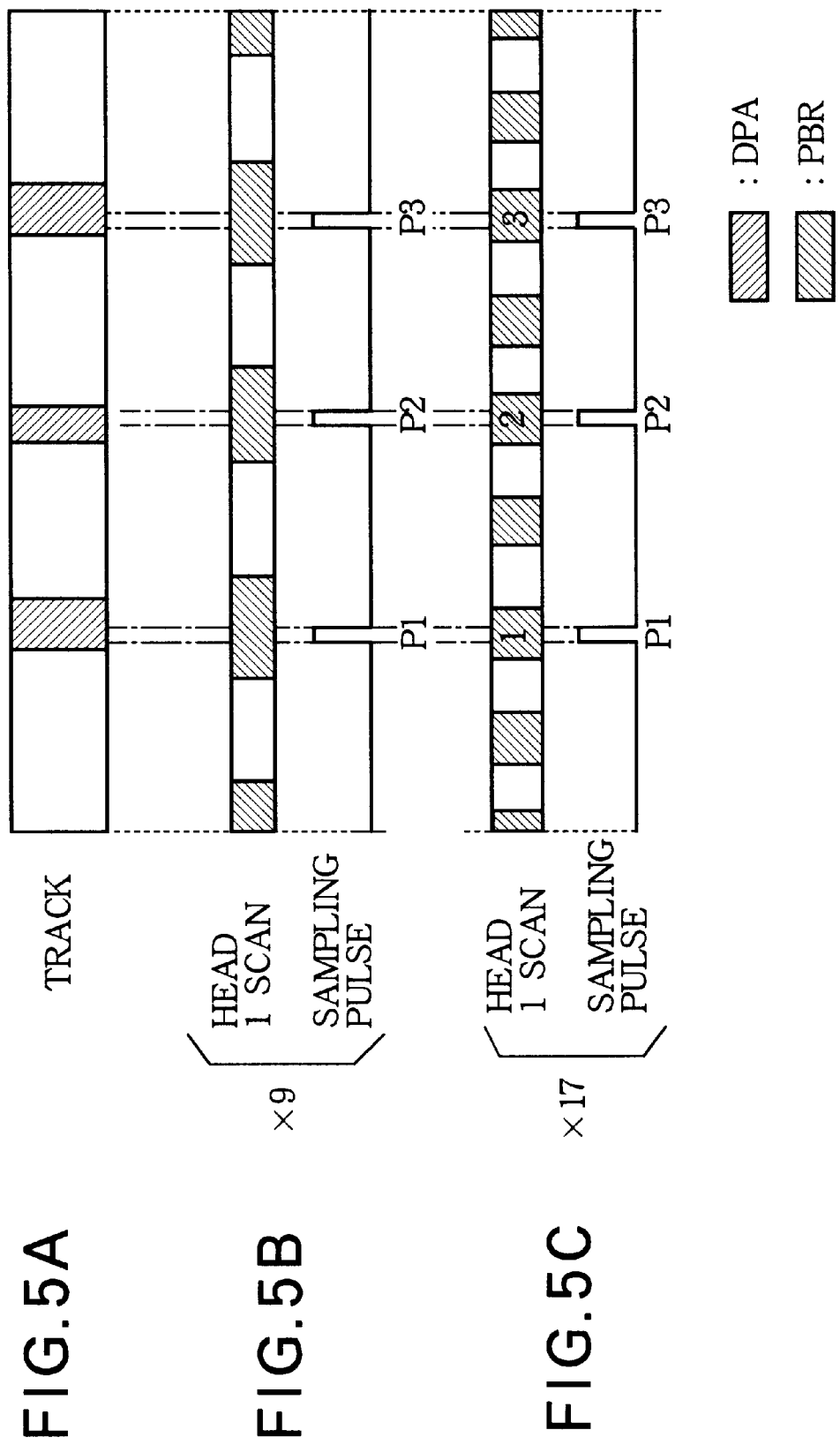
FIG. 5A to FIG. 5C show positions of sampling pulses during nine-time speed playback and 17-time speed playback.

FIG. 5 shows the positions of sampling pulses during 9-time and 17-time speed playback. When the duplication areas are disposed in the regions from which signals are reproduced at various playback speeds, the configuration may be such that the sampling points P1 to P3 occur in the respective duplication areas at each of the playback speeds. That is, for performing fast playback at 9-time speed and 17-time speed, the duplication areas are disposed taking account of the track non-linearity, and the sampling pulses are generated at different timings for each playback speed. The manner of tracking control method is like that described above. That is, the average value of the tracking error signals at the respective points are determined for each playback speed, and used for tracking control.

When the fast playback from the magnetic tape is performed in the manner described above, the pilot signal components are extracted from kj (kj being a positive integer) points of each duplication area traced by the head, to detect the tracking error, and the tracking control is performed on the basis of the average value of the errors at a plurality points. Accordingly, even when there is a track non-linearity in a magnetic tape on which the largest amount of fast playback data is recorded in the duplication areas, the fast playback data is reproduced without fail. Moreover, it is possible to control tracking in such a manner the fast playback data is reproduced without fail from a plurality of duplication areas.

Embodiment 2

In Embodiment 1, the tracking control is performed on the basis of an average value of the error signals at respective sampling points. In Embodiment 2, the maximum and minimum peak values of the error signals at sampling points during one scan are detected, and the tracking control is performed in accordance with the average value of the maximum and minimum values.

Figure 6:
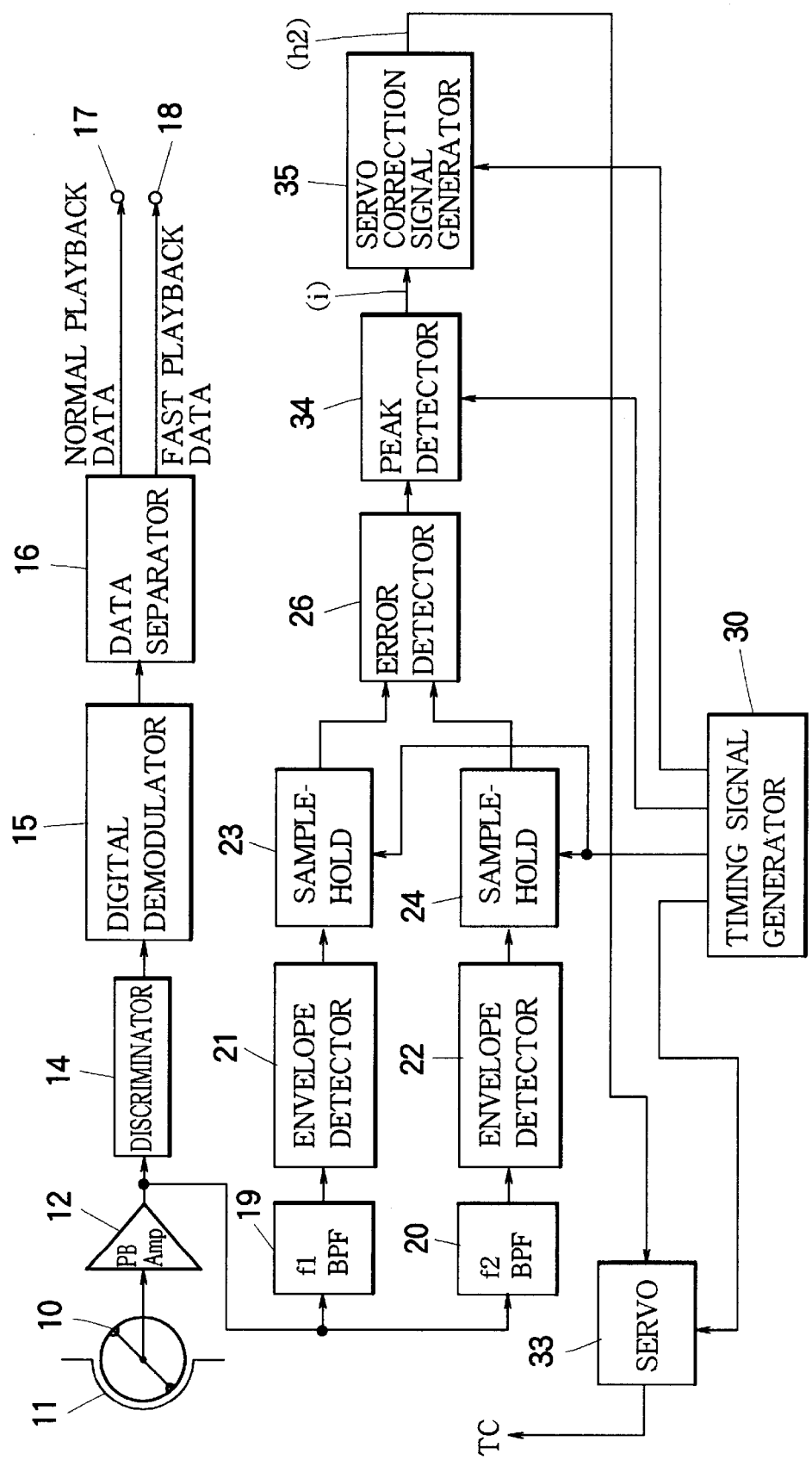
FIG. 6 is a block diagram showing the configuration of the playback section of the bitstream recording and playback device in Embodiment 2.

FIG. 6 is a block diagram showing the playback section of the bitstream recording and playback device in Embodiment 2. In the drawing, reference numerals 10 to 12, 14 to 24, 26, 30 and 33 denote members identical to those of the bitstream recording and playback device in Embodiment 1 (FIG. 1). Reference numeral 34 denotes a peak detector for detecting maximum and minimum peak values of the error signals. Reference numeral 35 denotes a servo correction signal generator connected with the peak detector 35, and responsive to the peak value for generating servo correction signal (h2) for controlling the tracking of the servo, and providing it to the servo circuit 33.

The playback operation in the bitstream recording and playback device will next be described.

First, the operation during normal playback will be described. During normal playback, the playback signal is read from the track on the tape 11 by means of the head 10, and the signal is amplified by the playback amplifier 12, and sent to the discriminator 14. The signal discriminator 14 discriminates the playback signal, and the digital demodulator 15 performs digital demodulation to restore the original bitstream, which is then input to the data separator 16. The data separator 16 separates the input bitstream into the bitstream recorded in the main area and the HP data in the duplication area, and supplies the data from the main area as normal playback data to the output terminal 17, and the HP data from the duplication area as fast playback data to the output terminal 18. The respective playback data are supplied to the MPEG2 decoder provided outside the digital VTR. However, during normal playback, the HP data is discarded. The playback signal from the playback amplifier 12 is also input to the bandpass filters 19 and 20, and frequency f1 and f2 components in the playback signal are extracted, and are detected at the envelope detectors 21 and 22, and supplied to the sample hold circuits 23 and 24.

The sample-hold circuits 23 and 24 sample and hold the f1 and f2 components detected by the envelope detectors 21 and 22 in accordance with the sampling pulses from the timing signal generator 30, and the values at the sampling points are supplied to the error detector 26. The error detector 26 detects the tracking error by detecting the difference between the cross-talk components of the pilot signals of the frequencies f1 and f2 in the playback signal, and supplies the result of the detection to the peak detector 34. The peak detector 34 supplies the peak values (i) to servo correction signal generator 35, where servo tracking correction signal is generated, and supplied to the servo circuit 33. The servo circuit 33 generates a tracking control signal (TC) on the basis of the servo correction signal (h2) and the timing signal from the timing signal generator 30, to effect tracking control.

The sampling pulses have sampling points in the ITI area at the lower end of the track, like Embodiment 1, and tracking control similar to that described above is performed.

The operation during fast playback will next be described. It is assumed that the 9-time speed playback is performed, the duplication areas are disposed in the same regions as in Embodiment 1 (FIG. 3), and sampling are performed at similar sampling points. The operation up to the error detector 26 is similar to that described in connection with Embodiment 1, so its description is omitted. The error signals at the sampling points P1 to P3 detected at the error detector 26 are supplied to the peak detector 34, where the maximum value Pmax and minimum value Pmin of the peak values of the error signals of the three points during one scan of P1 to P3 are detected. The peak values (i) are supplied to the servo correction signal generator 35, where, the average of the Pmax and Pmin of the peak values (i), $$h2 = (Pmax + Pmin)/2$$

is determined, and this value is supplied, as the servo tracking correction signal (h2) to the servo circuit 33. The servo circuit 33 performs tracking control on the basis of the servo correction signal (h2) and the timing signal from the timing signal generator 30.

Figure 7:
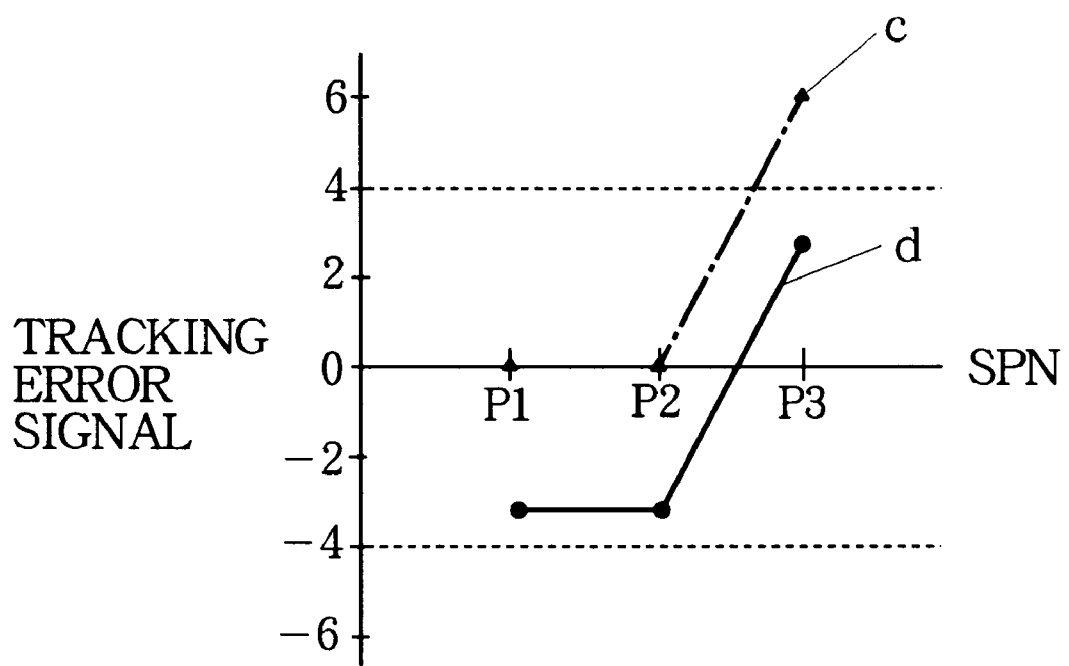
FIG. 7 shows correction of tracking error due to track non-linearity.

FIG. 7 shows the correction of tracking error due to the track non-linearity. Tables 3 and 4 show servo correction signals generated from the error signals at three sampling points (SPN).

TABLE 3

| Sampling Point | P1 | P2 | P3 |
| --- | --- | --- | --- |
| Error Signal | 0 | 0 | 6 |
| Peak Detector 34 Output (i) | | Pmax = 6 | |
| Pmax, Pmin | | Pmin = 0 | |
| Servo Correction Signal (h2) | | 3 | |
| Calculate (Pmax + Pmin)/2 | | | |
| After Servo Correction Pj − h2 | −3 | −3 | 3 |

As shown in Table 3, when the error signals at the sampling points P1 to P3 are:

$$(P1, P2, P3) = (0, 0, 6)$$

the result (i) of the detection at the peak detector 34 is:

$$(Pmax, Pmin) = (6, 0)$$

The servo correction signal generator 35 performs the calculation to find the average value of the maximum and the minimum by:

$$(Pmax + Pmin)/2 = 3$$

This average value is output as the servo correction signal (h2), which is used for tracking control at the servo circuit 33. The errors at the respective points after the correction are:

$$(P1-h2, P2-h2, P3-h2) = (-3, -3, 3)$$

That is, the tracking errors for the situation under consideration are within ±4. Moreover, the errors at the respective points are within ±3 as the errors are averaged. Accordingly, the fast playback data in the duplication areas is reproduced without fail. That is, even if there is a non-linearity before correction as indicated by c in FIG. 7, the tracking error signal used for tracking control after the correction is as indicated d, and the tracking error signals are within a predefined range at any point.

TABLE 4

| Sampling Point | P1 | P2 | P3 |
|---|---|---|---|
| Error Signal | 0 | 2 | 4 |
| Peak Detector 34 Output (i) Pmax, Pmin | | Pmax = 4 Pmin = 0 | |
| Servo Correction Signal (h2) Calculate (Pmax + Pmin)/2 | | 2 | |
| After Servo Correction Pj – h2 | –2 | –0 | 2 |

In the case of Table 4, the error signals at the sampling points P1 to P3 are:

(P1, P2, P3)=(0, 2, 4)

The average value of the peak values of the errors are:

H2=(Pmax+Pmin)/2=2

Accordingly, h2=2 is output as the servo correction signal. When the tracking control is performed by the servo circuit 33 on the basis of this servo correction signal (h2), the errors at the respective points are:

(P1–h2, P2–h2, P3–h2)=(–2, 0, 2)

They are thus not only within the permissible range of ±4, but also within ±2 as the errors are averaged. Accordingly, the fast playback data in the duplication areas is reproduced without fail.

When the fast playback from the magnetic tape is performed in the manner described above, the pilot signal components are extracted from kJ (kj being a positive integer) points of each duplication area traced by the head, to detect the tracking error, and on the basis of the average value of the maximum and minimum values of the errors at a plurality points, the tracking control is performed. Accordingly, even when there is a track non-linearity in a magnetic tape on which the largest amount of fast playback data is recorded in the duplication areas, the fast playback data is reproduced without fail. Moreover, it is possible to control tracking in such a manner the fast playback data is reproduced without fail from a plurality of duplication areas.

Embodiment 3

Description is now made on the sampling points for detecting tracking error signals during fast playback, in a bitstream recording and playback device.

Figure 8:
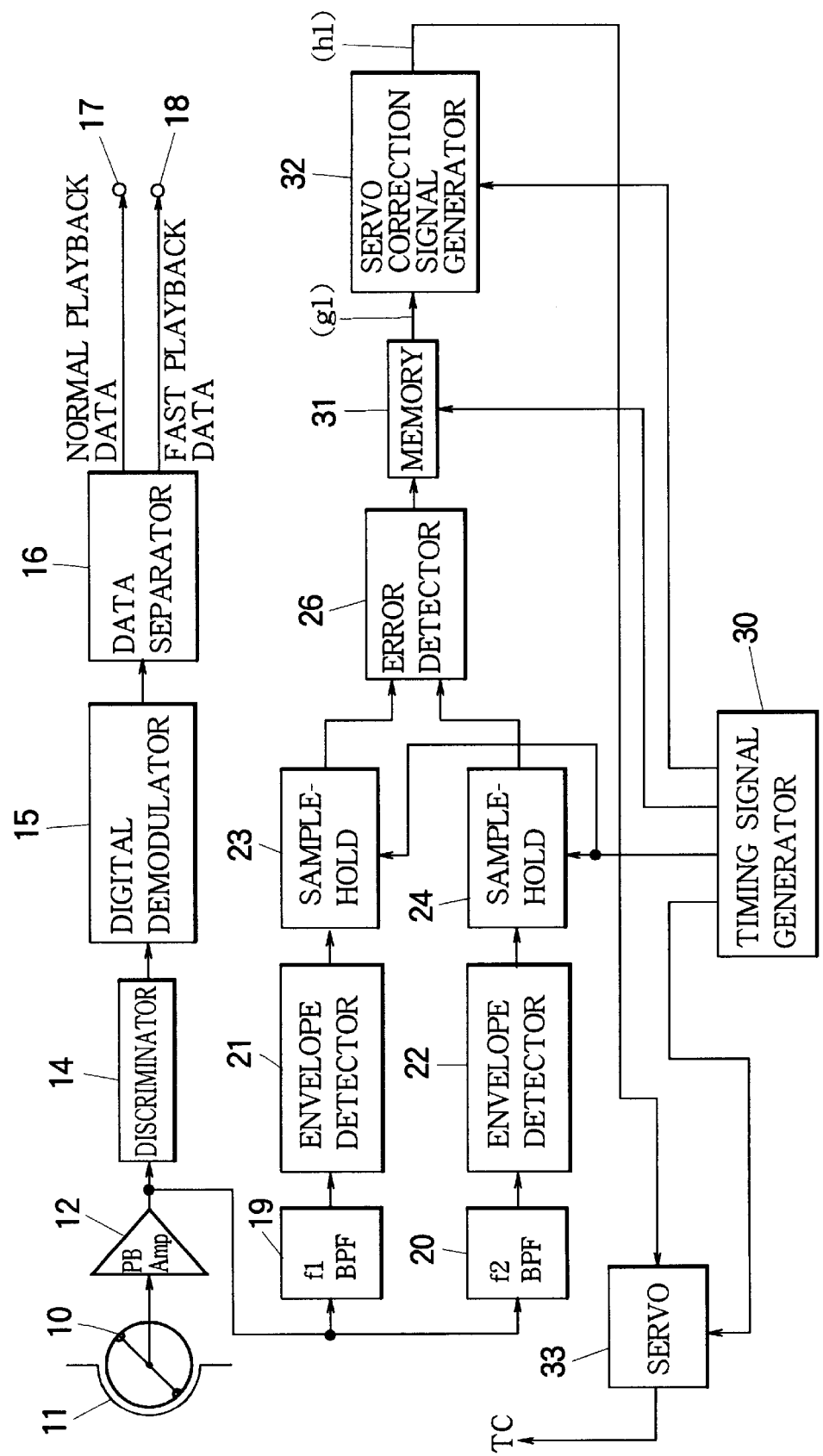
FIG. 8 is a block diagram showing the configuration of the playback section of the bitstream recording and playback device in Embodiment 3.

FIG. 8 is a block diagram showing the playback section of the bitstream recording and playback device in Embodiment 3. In the drawing, reference numerals 10 to 12, 14 to 24, 30 and 33 denote members identical to those of the bitstream recording and playback device in Embodiment 1 (FIG. 1). Reference numeral 41 denotes an error detector for comparing the results of the sampling with a reference value, which is zero at the sampling points, and detecting an error signal.

Figure 9A:
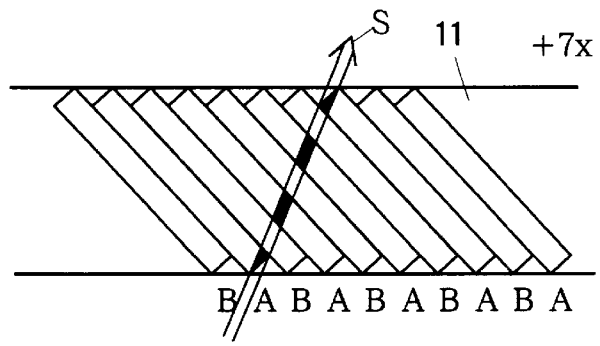
FIG. 9A is a diagram showing the head trace position on a track during seven-time playback.
Figure 9B:
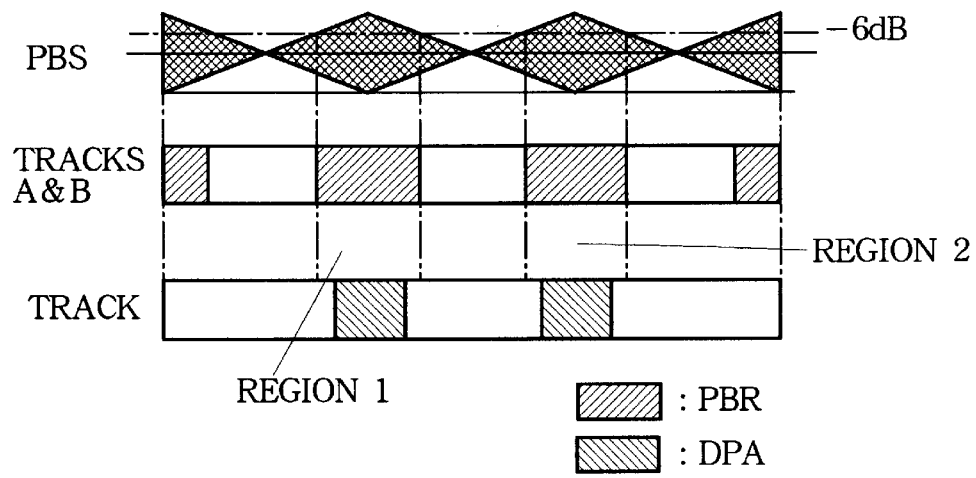
FIG. 9B is a diagram showing an example of playback regions.

FIG. 9A and FIG. 9B show an example of head trace position and playback regions (PBR) on tracks on a tape during 7-time speed playback. The operation during normal playback and the operation during fast playback up to the sample-hold circuits 23 and 24 are identical to those of Embodiment 1, so their description is omitted. During 7-time (+7 x) speed playback, the head trace covers the regions indicated by arrow S in FIG. 9A. Accordingly, if the duplication areas (DPA) for recording fast playback HP data are disposed in two playback regions on tracks A and B, the duplication areas at the regions 1 and 2 are reproduced sequentially during fast playback.

The sample-hold circuits 23 and 24 sample and hold the f1 and f2 components detected by the envelope detectors 21 and 22 in accordance with the sampling pulses from the timing signal generator 30, and the values at the sampling points are supplied to the error detector 41.

Figure 10A:
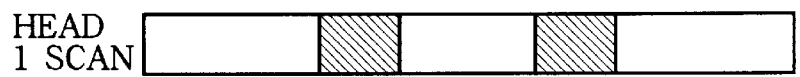
FIG. 10A and FIG. 10B show sampling points for tracking error signal detection during fast playback.
Figure 10B:
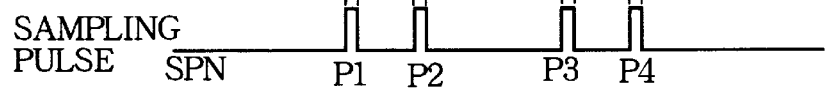

FIG. 10A and FIG. 10B show an example of sampling points for tracking error signal detection during fast playback. The sampling pulses supplied from the timing signal generator 30 to the sample-hold circuits 23 and 24 have sampling points P1 to P4, two points at the leading and trailing ends of each of two duplication areas from which reproduction is possible, as shown in FIG. 10B. The error detector 41 compares the deviations of the f1 and f2 components y1 and y2 at each of the respective points with a reference value, and detects the errors from the results of the comparison, and supplies the error signals to the memory 31. If there is no deviation in the head trace due to track non-linearity or the like, the difference from the reference value at each sampling point is zero, and the value of the error signal is zero. The error signal corresponding to the direction and the amount of deviation due to track non-linearity is therefore detected at the error detector 41.

Like Embodiment 2, the length of the data region recorded in each duplication area is limited so that it is within the region from which signals can be reproduced during fast playback. The length of the recording region is determined taking account the non-linearity of the track which occurred during recording, the non-linearity of the track due to deformation of the tape during playback and the scanning error at the sampling points forming the reference during playback. As an example, the tracking error x of the scanning trace during one scan of the head 10 during playback satisfies |x|=6 or less, and the tracking error after the servo control at the reference sampling points in the duplication areas is within a target range of x=±4. Here, the values of errors are expressed by an arbitrary unit (simply indicating the relative magnitude).

The error signals at the sampling points detected by the error detector 41 are stored in the memory 31, and the error signals (g1) at four points during one scan are supplied to the servo correction signal generator 32. The servo correction signal generator 32 calculates the average value (P1+P2+P3+P4)/4 of the error signals from the respective sampling points, and outputs this value (hi) to the servo circuit 33 as the servo tracking correction signal. The servo circuit 33 performs tracking control on the basis of the servo correction signal (hi) and the timing signal from the timing signal generator 30.

Figure 11:
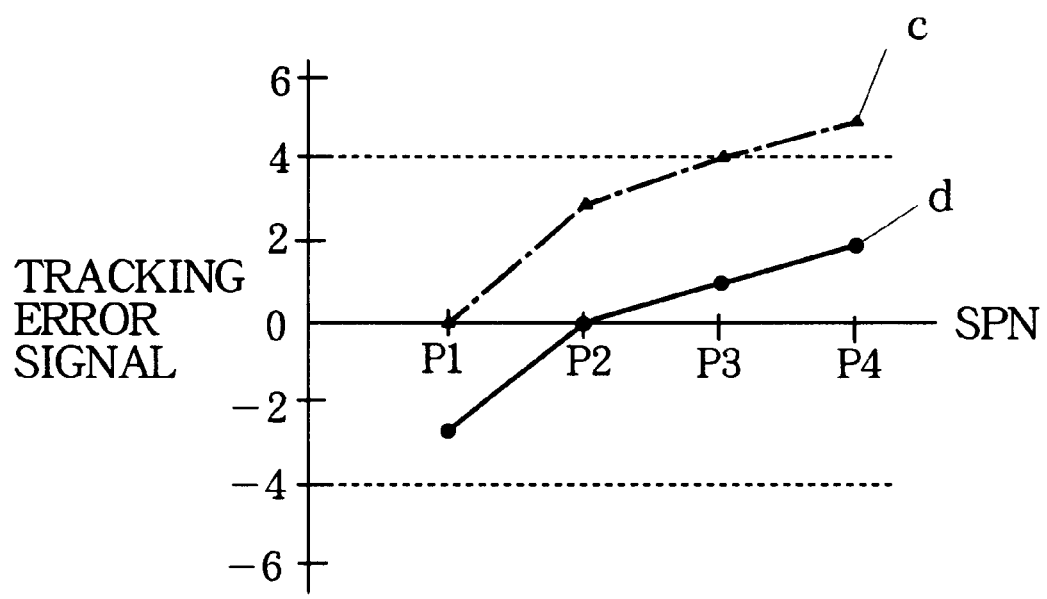
FIG. 11 shows track non-linearity and tracking error correction.

Table 5 shows the servo correction signals generated from the error signals at the four sampling points. FIG. 11 shows the correction of tracking errors due to track non-linearity.

TABLE 5

| Sampling Point | P1 | P2 | P3 | P4 |
|---|---|---|---|---|
| Memory 31 Output Error Signal (g1) | 0 | 3 | 4 | 5 |
| Servo Correction Signal (h1) (P1 + P2 + P3 + P4)/4 | | 3 | | |
| After Servo Correction Pj – h1 | –3 | 0 | 1 | 2 |

Referring to Table 5, when the error signals (g1) at the sampling points P1 to P4 are (P1, P2, P3, P4)=(0, 3, 4, 5)

the servo correction signal generator 32 calculates the average value of the errors:

(P1+P2+P3+P4)/4=3 and outputs this value as the servo correction signal (h1). If the servo circuit 33 performs tracking control in accordance with this servo correction signal (h1), the errors after the correction at the respective points are:

(Pj-h1)=(-3, 0, 1, 2)

That is, the tracking error signals are within the permissible range of ±4, and the fast playback data in the duplication areas can be reproduced without fail. Even if the tracking error signals c before the correction are non-linear as shown in FIG. 11, the tracking error signals after the correction are as indicated by d, and the tracking error signals are within the range of ±4 at any sampling point.

In this way, at the time of fast playback from a magnetic tape, the pilot signal components are extracted from two points at both ends of each of the duplication areas traced by the head, and the tracking errors are detected, and tracking control is performed on the basis of errors at 2 k points, so that even if there is a track non-linearity on a magnetic tape on which the largest amount of fast playback data is recorded in a plurality of duplication areas, the fast playback data can be reproduced without fail. The tracking can be so controlled that the fast playback data can be obtained without fail from the duplication areas at a plurality of locations.

Embodiment 4

In Embodiment 3, the tracking error signals are detected at both ends of each of the regions in the duplication areas that are reproduced, and tracking control is performed on the basis of an average value of the error signals at the respective points during one scan. Described next is an embodiment in which maximum and minimum peak values of the error signals at sampling points during one scan are detected and tracking control is performed on the basis of an average of the maximum and minimum peak values.

Figure 12:
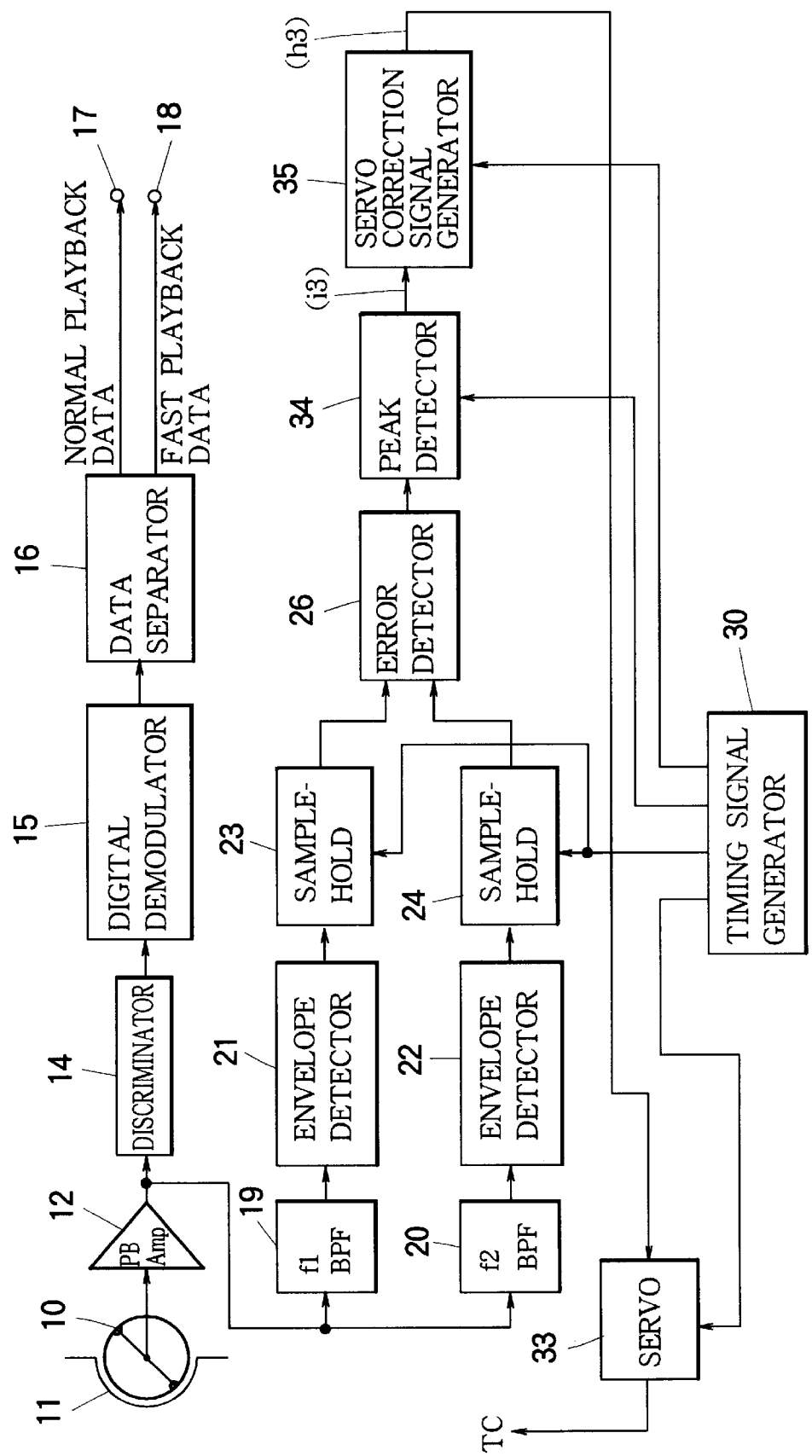
FIG. 12 is a block diagram showing the configuration of the playback section of the bitstream recording and playback device in Embodiment 4.

FIG. 12 shows the configuration of the playback section of the bitstream recording and playback device in Embodiment 4. In the drawing, reference numerals 10 to 12, 14 to 24, 26, 30 and 33 denote members identical to those of the bitstream recording and playback device in Embodiment 1 (FIG. 1). The peak detector 34 and the servo correction signal generator 35 are identical to those in Embodiment 2 (FIG. 6) and the error detector 41 is identical to that in Embodiment 3 (FIG. 8).

The operation during normal playback, and the operation during fast playback, up to the error detector 41, are identical to those in Embodiment 3 (FIG. 8), so their description is omitted. The error signals at the sampling points P1 to P4 detected by the error detector 41 are supplied to the peak detector 34, where the maximum value Pmax and the minimum value Pmin of the peak values of the error signals at P1 to P4 during one scan are detected. The peak values (i3) are supplied to the servo correction signal generator 35, where the average value (Pmax+Pmin)/2 is calculated from the input Pmax and Pmin. The resultant value (h3) is supplied to the servo circuit 33 as the servo tracking correction signal. The servo circuit 33 performs tracking control on the basis of the servo correction signal (h3) and the timing signal from the timing signal generator 30.

Table 6 shows the servo correction signal generated from the error signals at the four sampling points. FIG. 13 shows the correction of the tracking error due to track non-linearity.

TABLE 6

| Sampling Point | P1 | P2 | P3 | P4 |
|---|---|---|---|---|
| Error Signal | 0 | 3 | 4 | 5 |
| Peak Detector 34 Output (i3) | | Pmax = 5 | | |
| Pmax, Pmin | | Pmin = 0 | | |
| Servo Correction Signal (h3) (P1max + Pmin)/2 | | 2.5 | | |
| After Servo Correction Pj − h1 | -2.5 | 0.5 | 1.5 | 2.5 |

In Table 6, when the error signals at the sampling points P1 to P4 are:

(P1, P2, P3, P4)=(0, 3, 4, 5)

the result of detection at the peak detector 34 (i3) is:

(Pmax, Pmin)=(5, 0)

and the servo correction signal generator 35 calculates the average value of the maximum and minimum:

(Pmax+Pmin)/2 =2.5 and outputs this value as the servo correction signal (h3). If the servo circuit 33 performs tracking control on the basis of the servo correction signal (h3) the errors at the respective points are:

(-2.5, 0.5, 1.5, 2.5)

and are within the permissible range of errors ±4, and the errors at the respective points are averaged to be within ±2.5, so that the fast playback data in the duplication regions are reproduced without fail. Even if the tracking control errors c before the correction have a non-linearity as shown in FIG. 13, the tracking error signals d after the correction are within the predefined range of (±4) at any point.

In this way, at the time of fast playback from a magnetic tape having duplication areas at two or more locations (k≧2), the tracking errors are detected at both ends of the regions in the duplication areas which are reproduced, and the tracking control is performed in accordance with the average value of the maximum and minimum peak values of the error signals from the respective areas during one scan, so that even is there is a track non-linearity on a magnetic tape on which the largest amount of fast playback data is recorded in the plurality of duplication areas, fast playback data can be reproduced without fail. Moreover, the tracking can be controlled such that fast playback data can be reproduced without fail from the duplication areas at a plurality of locations.

Embodiment 5

In Embodiment 3 and Embodiment 4, the sampling points for tracking error detection during fast playback are at both ends of each of the regions.

FIG. 14A and FIG. 14B show an example of sampling points for tracking error signals during fast playback in Embodiment 5. The sampling pulses supplied to the sample-hold circuits 23 and 24 have sampling points P1 to P6 at three points at the leading part, the middle part and the trailing parts at each of the regions at two duplication areas that are reproduced, as shown in FIG. 14B. The error detector 41 compares the deviations of the f1 and f2 components y1 and y2 at each of the respective points with a reference value, and detects the errors from the results of the comparison, and supplies the error signals to the memory 31. If there is no deviation in the head trace due to the track non-linearity or the like, the difference from the reference value at each sampling point is zero, and the value of the error signal is zero. The error signals corresponding to the direction and the amount of deviation due to track non-linearity are detected by the error detector 41.

FIG. 15A shows the head trace on the tracks on the tape during five-time speed playback. FIG. 15B shows an example of regions from which signals are reproduced. When a duplication area is disposed in a long region at one location, as illustrated, the tracking sampling points are set at several locations at the ends or inside of the duplication area, as shown in FIG. 16A to FIG. 16D, and the tracking control is performed using the average value of the tracking error signals at the respective points, like Embodiment 3, or the average value of the maximum and minimum peak values, like Embodiment 2.

In this way, even when the the largest amount of fast playback data is recorded in the region from which reproduction is possible, and there is a track non-linearity, the tracking can be so controlled that the recorded fast playback data can be reproduced without fail, and the effects similar to the above embodiments are obtained.

Embodiment 6

Figures 17A, 17B:
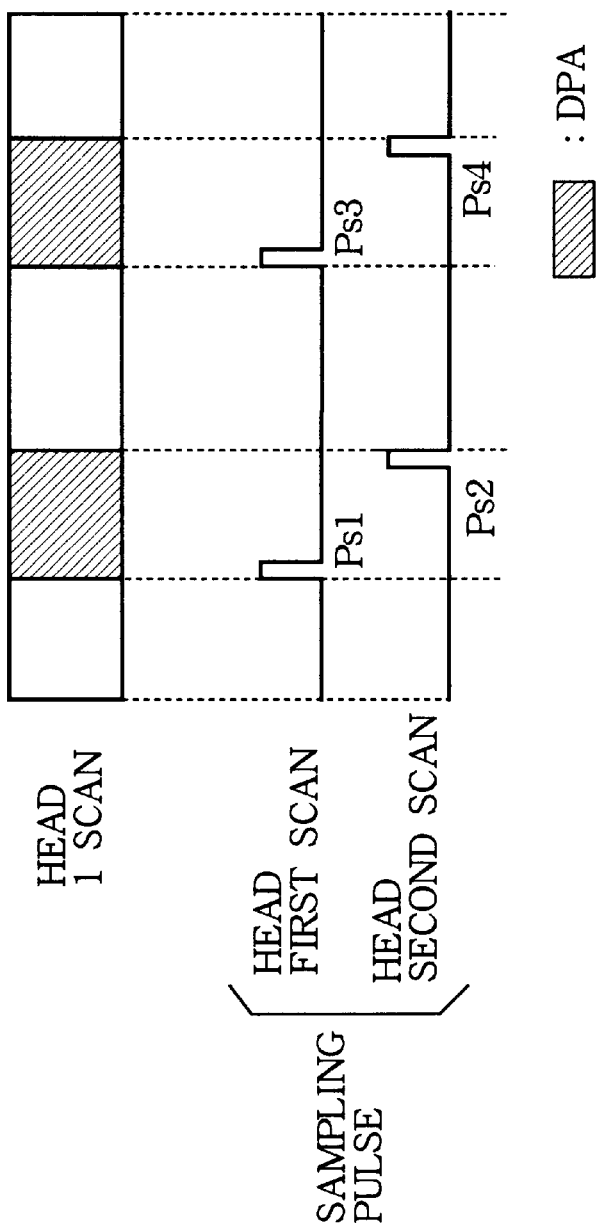
FIG. 17A and FIG. 17B show an example of sampling points for tracking error signal detection during fast playback in Embodiment 6.

Description is next made of another example of positions of sampling points for detecting the tracking error signals during fast playback in a bitstream recording and playback device capable of fast playback. FIG. 17A and FIG. 17B show an example of sampling points for detecting tracking error signal during fast playback in Embodiment 16.

Track non-linearity is generally dependent on the transport mechanism, the head mounting positions and the like, and the tracking control response has a time constant corresponding to several tens of tracks. The sampling pulses for tracking control in the bitstream recording and playback device of Embodiment 3 or Embodiment 4 can be set to be different from one head scan to another. For instance, as shown in FIG. 17A, where duplication areas are disposed at two locations in the playback region during one scan, and fast playback control is performed through sampling at both ends of each duplication area, sampling is effected at the points Ps1 and Ps3 at the front end during a first scan, and at the points Ps2 and Ps4 at the rear end during a second scan. That is, the tracking control is performed by extracting error signals from two sampling points during each of the two scans. Two sampling points per scan are sufficient, and the average value of the error signals or the average of the peak values at the two points during each scan, is determined, and the tracking control is performed on the basis of the average value. (Although in the example under consideration, the average of the peak values of the error signals are identical to the average of the all the error signals as there are only two error signals, the concept of tracking control on the basis of the average of the peak values is explained since such a concept is effective when there are three or more sampling points.)

In this way, the tracking error is detected by extracting pilot signal components sequentially recorded at ri (ri being a positive integer, i=1, 2, . . . , s, Σri=k×n) points from among (k×n) points per scan, from n (kj=n, n being a positive integer not smaller than 2) points for each of the duplication areas traced by the head during fast playback from a magnetic tape, and tracking control is effected on the basis of (k×n) error signals detected from all the points for every s scans, so that fast playback data can be reproduced without fail even when a track non-linearity occurs in a magnetic tape on which the largest amount of fast playback data is recorded in a plurality of duplication areas. Moreover, tracking control can be performed in such a manner that fast playback data is reproduced from the duplication areas at a plurality of locations. Furthermore, the time for signal processing at the memory 31, the peak detector 34, the servo correction signal generator 35 and the like can be shortened, so that the amount of the hardware in the bitstream recording and playback device can be reduced.

Embodiment 7

In the description of Embodiment 1 to Embodiment 6, the tracking control is performed on the basis of the average value of the error signals at the respective sampling points, or the tracking control is performed on the basis of the average value of the maximum and minimum values of the peak values at the respective sampling points.

In Embodiment 7, the average value of the error signals at the sampling points during one scan, and the average value of the maximum value and the minimum value of the peak values are determined, and the tracking control is performed on the basis of the two average values.

Figure 18:
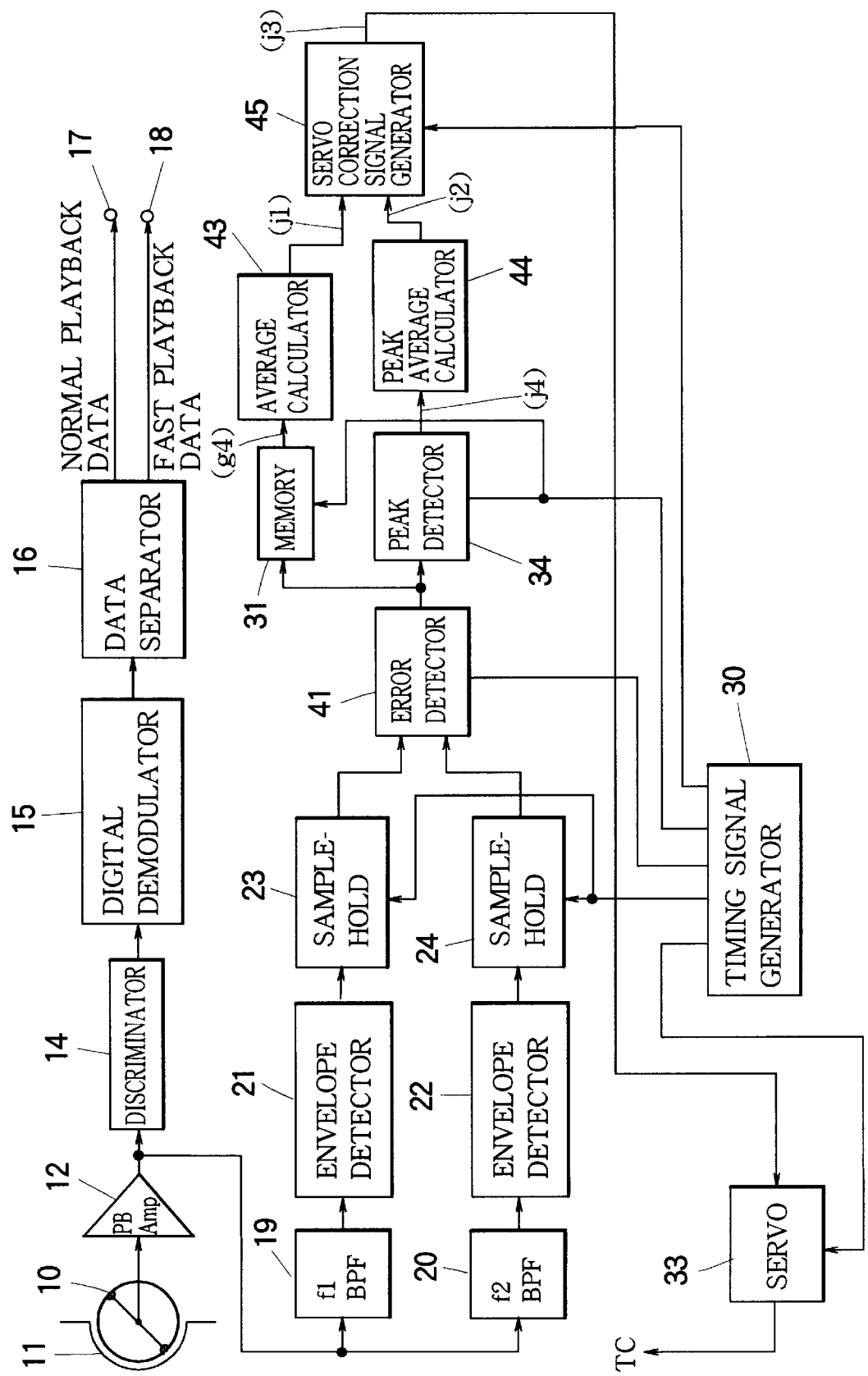
FIG. 18 is a block diagram showing the configuration of the playback section of the bitstream recording and playback device in Embodiment 7.

FIG. 18 is a block diagram showing the configuration of the playback section of the bitstream recording and playback device in Embodiment 7. In the drawing, the reference numerals 10 to 12, 14 to 24, 30, 31, 33, 34 and 41 denote members identical to those in the bitstream recording and playback device of Embodiment 3 (FIG. 8), and the bitstream recording and playback device of Embodiment 4 (FIG. 12). Reference numeral 43 denotes an average calculator for calculating the average value of the error signals at the respective sampling points, and 44 denotes a peak average calculator for calculating the average value of the maximum and minimum values of the error signals at the respective sampling points during one scan, from the peak detector 34. Reference numeral 45 denotes a servo correction signal generator which generates a serve correction signal from the output of the average calculator 43 and the output of the peak average calculator 44.

The sampling points at the duplication areas during the fast playback are at four locations as explained with reference to FIG. 10 in connection with Embodiment 3, and the fast playback operation up to the error detector 41 is the same as in Embodiment 3, so its description is omitted. The error signals at the sampling points P1 to P4 detected by the error detector 41 are supplied to the memory 31 and the peak detector 34. The memory 31 stores the error signals at the respective points, and supplies the error signals (g4) at the four points to the average calculator 43, where the average value for all the points is calculated, and the result (j1) is supplied to the servo correction signal generator 45. The peak detector 34 detects the maximum and minimum values of the peaks of the error signals at the respective points, and the peak average calculator 44 calculates the average (j2) of the maximum and minimum values, and supplies it to the servo correction signal generator 45. The servo correction signal generator 45 generates a tracking correction signal (j3) on the basis of the average value (j1) from the average calculator 43 and the average (j2) of the peak values from the peak average calculator 44, and supplies it to the servo circuit 33.

Generally, error correction codes are appended to digital data recorded on the tape 11, so that even if part of the data is erroneously read, the error can be corrected. In this embodiment too, even if the error at one point in the error signals at the respective points exceeds the error range within which it is possible to reproduce data without fail, as long as the data that could not be reproduced is only part of the data recorded in all the duplication areas, all the reproduced data can be corrected by the error correction function. Accordingly, the servo correction signal generator 45 determines the servo correction signal (j3) on the basis of the average value (j1) from the average calculator 43 and the average (j2) of the peak values from the peak average calculator 44, in accordance with:

$$j3 = \alpha \times (j1) + (1-\alpha) \times (j2)$$

In the above equation, a represents a weighting factor which assumes a value not smaller than 0 and not greater than 1, and is so set as to minimize the number of the uncorrectable errors, taking account of the track non-linearity. The value (j3) of the servo correction signal according to the above equation is supplied as the servo tracking correction signal to the servo circuit 33, which performs tracking control on the basis of the serve correction signal (j3) and the timing signal from the timing signal generator 30.

Figure 19A:
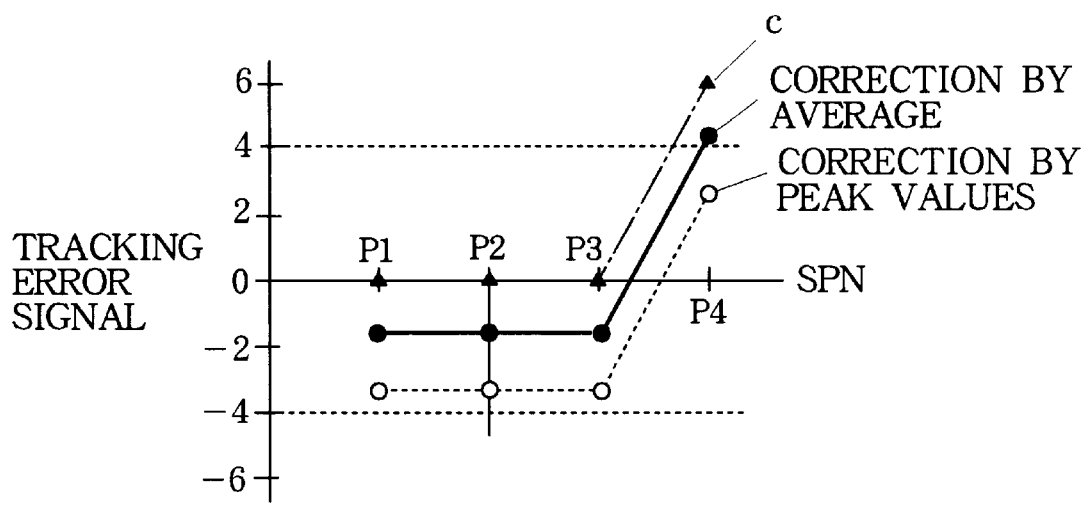
FIG. 19A and FIG. 19B show track non-linearity and tracking error correction.
Figure 19B:
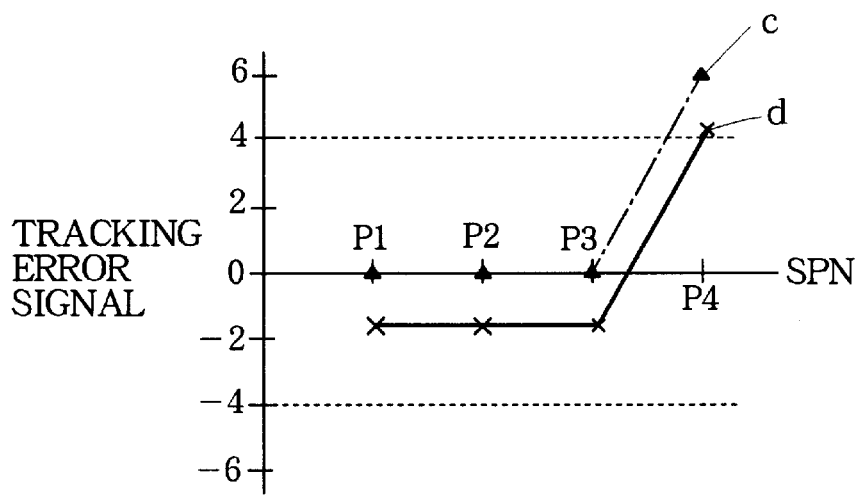

Table 7 shows the servo correction signals generated from the error signals at the four sampling points. FIG. 19A and FIG. 19B show the correction of the tracking errors due to track non-linearity.

TABLE 7

| Sampling Point | P1 | P2 | P3 | P4 |
|---|---|---|---|---|
| Memory 31 Output Error Signal (g4) | 0 | 0 | 0 | 6 |
| Average Calculator 43 Output (j1) (P1 + P2 + P3 + P4)/4 | | 1.5 | | |
| pj − p1 | −1.5 | −1.5 | −1.5 | 4.5 |
| Peak Detector 34 Output (j4) Pmax, Pmin | | Pmax = 6 Pmin = 0 | | |
| Calculator 44 Output (j2) (Pmax + Pmin)/2 | | 3 | | |
| pj − p2 | −3 | −3 | −3 | +3 |
| Servo Correction Signal Generator 45 Output (j3) | | 1.6 | | |
| After Servo Correction pj − p3 | −1.6 | −1.6 | −1.6 | +4.4 |

As shown in Table 7, when the error signals (g4) at the sampling points P1 to P4 are:

(P1, P2, P3, P4)=(0, 0, 0, 6)

the average value (j1) of the respective errors is:

(P1+P2+P3+P4)/4 =1.5 and the average value (j2) of the peak values is 3. The error signals for the sampling points P1 to P3 are all 0, and the error signal for the sampling point P4 is 6. Accordingly, by setting α=0.1 for example, the servo correction signal is given, in accordance with the above equation, as:

j3 =1.6

If tracking control is effected by the servo circuit 33 on the basis of this servo correction signal (j3), the errors at the respective sampling points after the servo correction are (−1.6, −1.6, −1.6, 4.4)

FIG. 19A shows the magnitudes of the error signals after the servo correction by the tracking control using the average value according to Embodiment 1, and by the tracking control using the average of the peak values according to Embodiment 4. FIG. 19B shows the tracking error signals after the servo correction according to Embodiment 7. In the case of the present embodiment, even if the tracking error signals before the correction have a non-linearity as indicated by c in FIG. 19B, the tracking error signals after the correction are corrected as indicated by d. Although the magnitude of the error signal for the point P4 exceeds "4," which the permissible range, the effect of the track non-linearity can be removed by the error correction, and the error signals for other points all −1.6. The tracking error can therefore be reduced compared with Embodiment 1 and Embodiment 4 in which only one of the average value or the average of the peak values is used for tracking control.

As has been described, fast playback from a magnetic tape is achieved by detecting the tracking errors by extracting, from kj (kj being a positive integer) points of each of the duplication areas traced by the head, pilot signal components appended thereto, and the tracking control is performed on the basis of the value j3 obtained from the average j1 of the errors detected from the plurality of points and the average j2 of the maximum and minimum values of the errors, in accordance with $$j3 = \alpha \times j1 + (1-\alpha) \times j2$$

$$0 \leq \alpha \leq 1$$

Accordingly, even where a track non-linearity occurs on a magnetic tape on which the largest amount of fast playback data is recorded in a plurality of duplication areas, the fast playback data can be reproduced without fail. Moreover, the tracking control can be achieved so that the fast playback data can be obtained without fail from the duplication areas at the plurality of locations.

Embodiment 8

The bitstream recording and playback device of Embodiment 8 is for reproducing signals, without fail, from the fast playback data regions, by identifying the repetition pattern of pilot signals of the playback tracks during fast playback.

Figure 20:
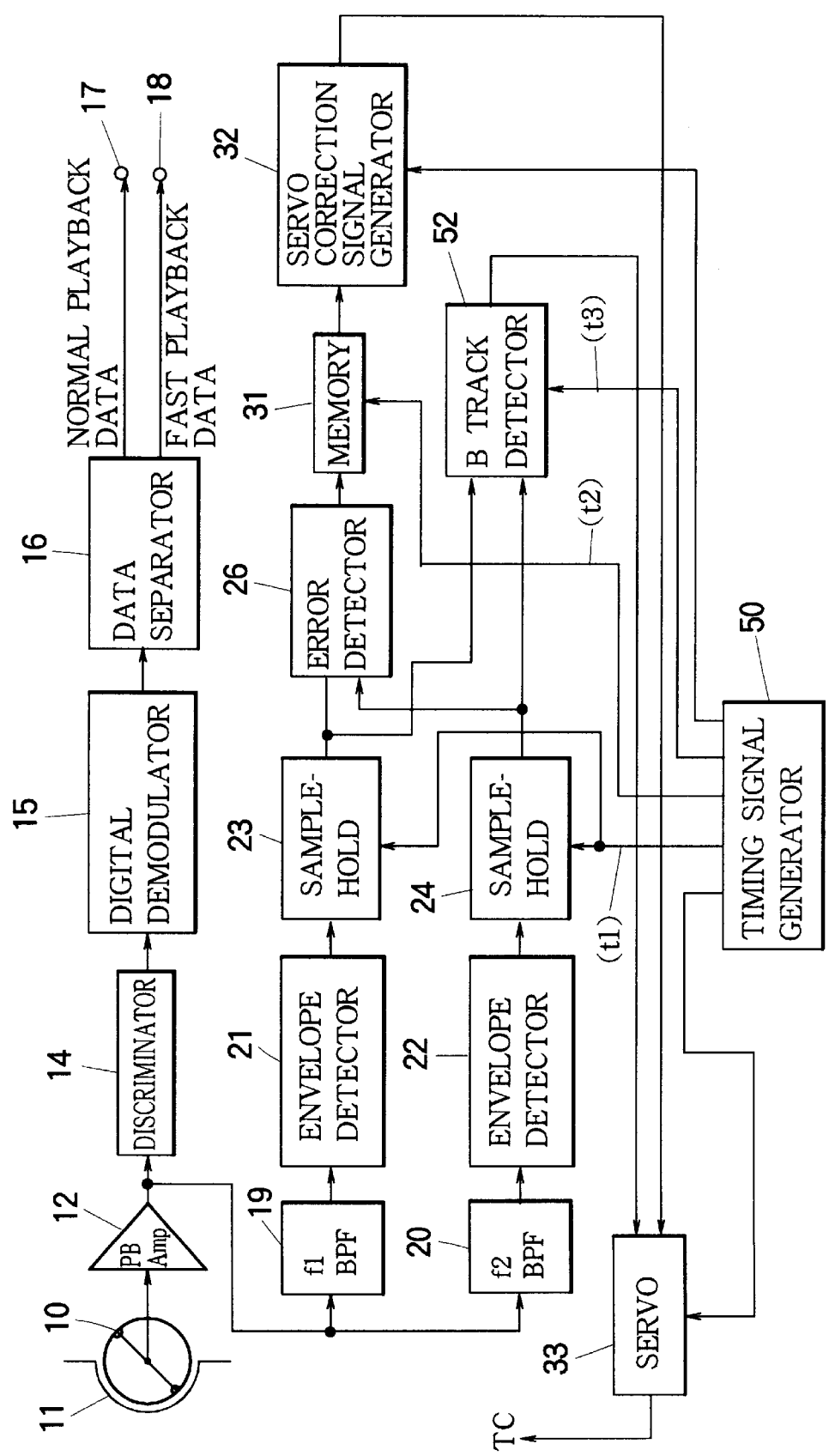
FIG. 20 is a block diagram showing the configuration of the playback section of the bitstream recording and playback device in Embodiment 8.

FIG. 20 is a block diagram showing the configuration of the playback section of the bitstream recording and playback device in Embodiment 8. In the drawing, the reference numerals 10 to 12, 14 to 24, 26, 31 and 32 denote members identical to those in the bitstream recording and playback device of Embodiment 1 (FIG. 1). Reference numeral 50 denotes a timing signal generator, 52 denotes a B track detector for detection the tracks in which f1 or f2 pilot signal is recorded and which are adjacent to a f0 track, and 53 denotes a servo circuit.

The normal playback operation and the fast playback operation up to the error detector 26 are identical to those in Embodiment 1, so their description is omitted.

Figure 21A:
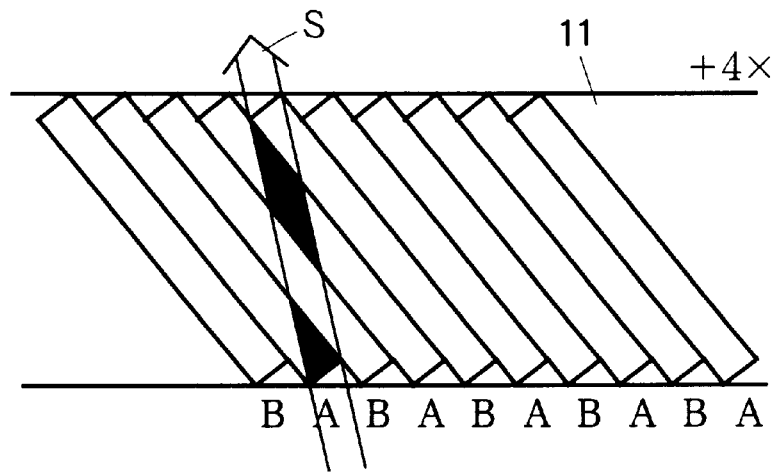
FIG. 21A is a diagram showing the head trace position on a track during four-time playback.
Figure 21B:
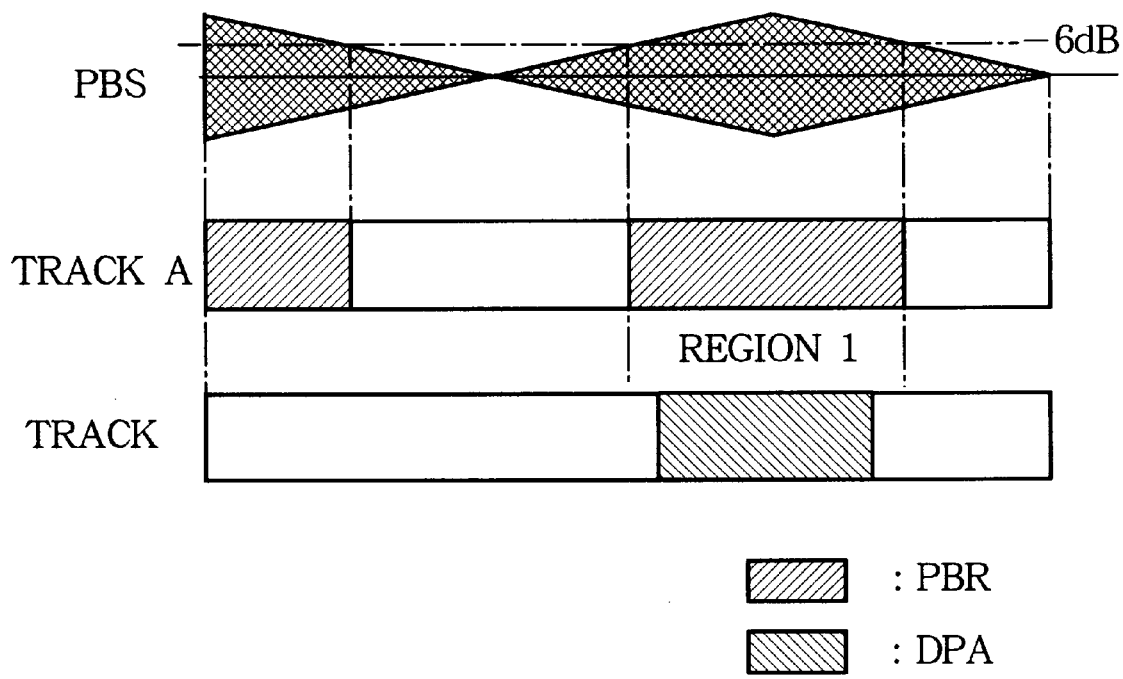
FIG. 21B is a diagram showing an example of playback regions.

FIG. 21A and FIG. 21B show an example of the head trace position and playback regions in tracks on a tape during 4-time speed playback. If four-time speed playback is effected using the head 10, then the duplication areas need to be disposed in the region 1 as shown in FIG. 21B.

Figure 22:
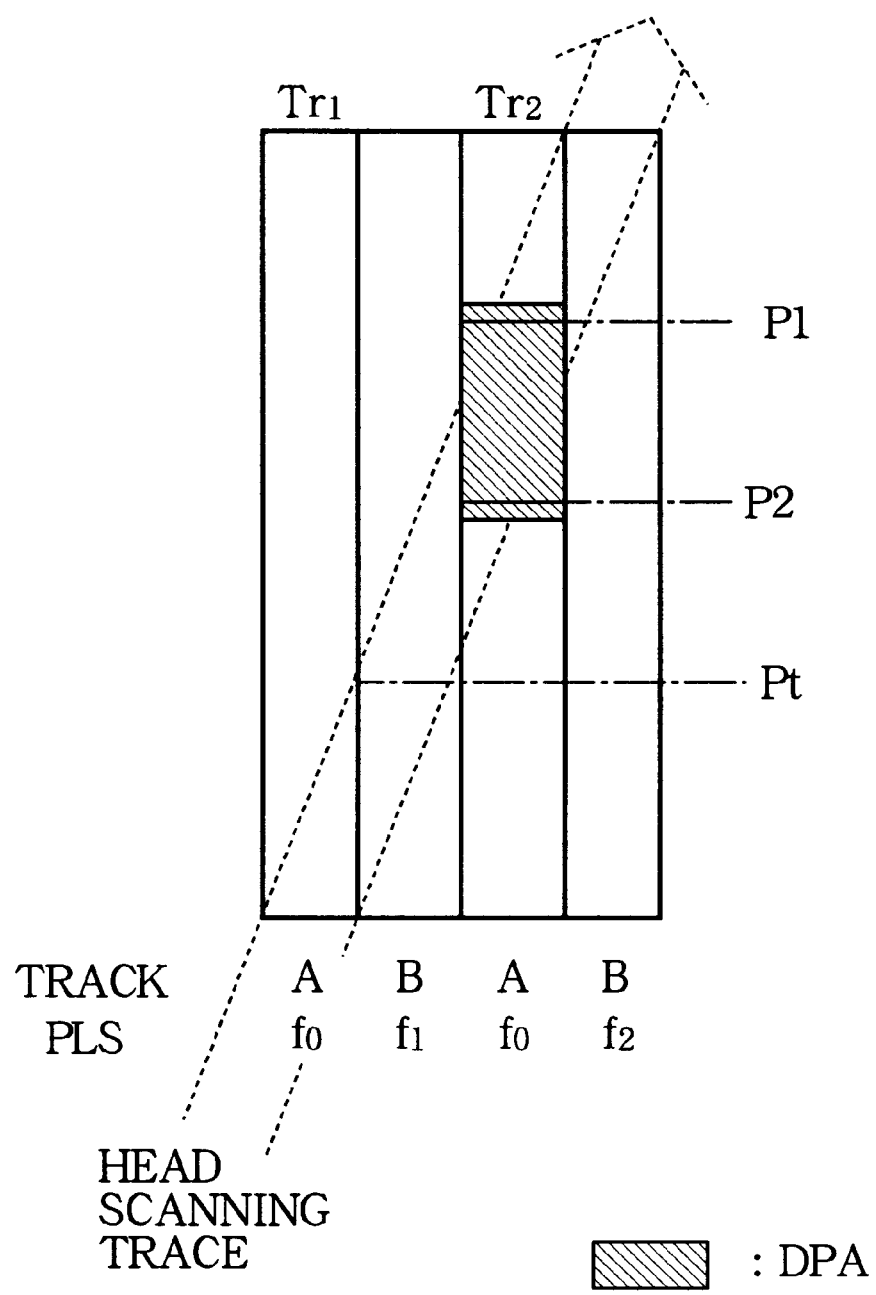
FIG. 22 shows the disposition of the duplication areas for fast playback and head trace position on the magnetic tape.

FIG. 22 shows the disposition of the duplication areas for fast playback and the head trace position on a magnetic tape 11. In the case of four-time speed playback, the head 10 scans the magnetic tape 11 every four tracks, so the duplication areas are disposed one in four tracks (A, B, A, B). The tracks immediately preceding and immediately succeeding the track in which the duplication area is disposed are f1 and f2 tracks.

FIG. 23A to FIG. 23D show an example of sampling points for detecting the tracking error signals during fast playback. As was already described in connection with Embodiment 1, the sample-hold circuits 23 and 24 sample and hold f1 and f2 components detected by the envelope detectors circuits 21 and 22, and the values at two sampling points P1 and P2 are supplied to the error detector 26. The sampling pulses supplied from the timing signal generator 50 to the sample-hold circuits 23 and 24 include pulses having sampling points at both ends of the duplication area from which reproduction is effected, i.e., P1 and P2 shown in FIG. 22, as well as a point Pt where intersection with an immediately preceding track occurs, like the sampling pulses (t1) shown in FIG. 23B.

The error detector 26 compares the deviations of the f1 component y1 and f2 component y2 at each of the points P1 and P2 with a reference value, in accordance with the servo error correction signal detection pulses (t2) shown in FIG. 23C, and outputs the errors from these values as error signals. The error signals output from the error detector 26 are supplied to and stored in the memory 31, and supplied to the servo correction signal generator 32. The serve correction signal generator 32 calculates the average value (P1+P2)/2 of the error signals from the sampling points P1 and P2, and supplies this value to the servo circuit 53 as the correction signal for the servo tracking.

The sample values at a point Pt sample-held at the sample-hold circuits 23 and 24 are also supplied to the B track detector 52, which detects the pattern of the immediately preceding track. That is, the B track detector 52 receives the pulse indicating the point Pt of the B track detecting pulse (t3) shown in FIG. 23D, and identifies the track in which the duplication area is disposed.

Figure 24A:
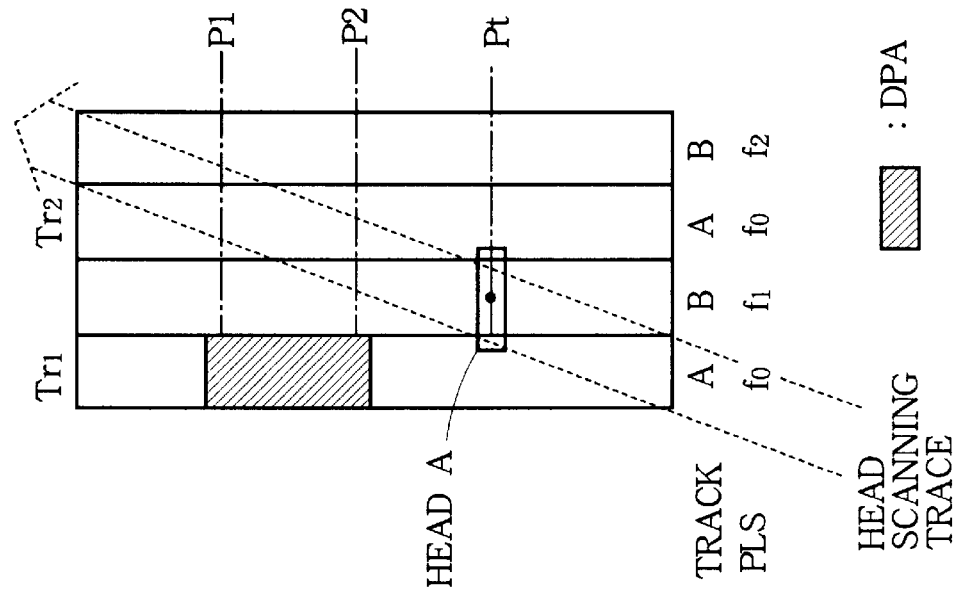
FIG. 24A and FIG. 24B are diagrams for explaining the operation of the B track detector.
Figure 24B:
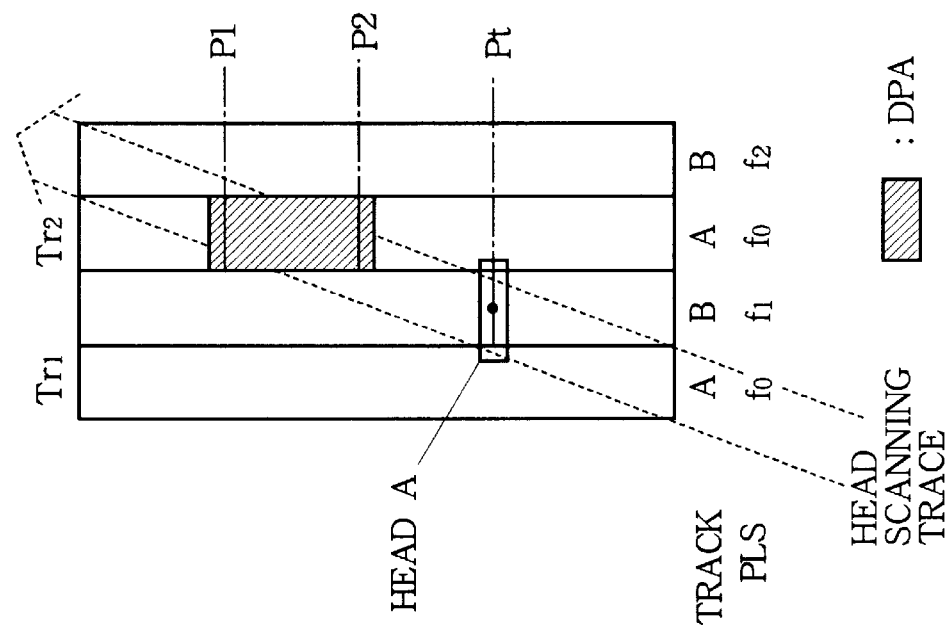

FIG. 24A and FIG. 24B show the operation of the B track detector. As shown in FIG. 24A, f1 cross-talk component alone is detected by the head A at point Pt, so that if f1 component is detected at Pt, it is found that the immediately preceding track is a f1 track and the duplication area is disposed in the next f0 track (Tr2). If f2 component is detected at point Pt as shown in FIG. 24B, it is found that the immediately preceding track is a f2 track and no duplication area is disposed in the next f0 track (Tr2).

The signal indicating that the track being scanned at point Pt is an f1 track is supplied from the B track detector 52 to the servo circuit 53, which performs tracking control on the basis of the servo correction signal according to the error signals at P1 and P2 and the track identification signal at Pt. During such control, the track at point Pt is set to be an f1 track such that the tracking control is effected at predefined points from the repetition pattern of the pilot signals as shown in FIG. 24A.

Figure 25:
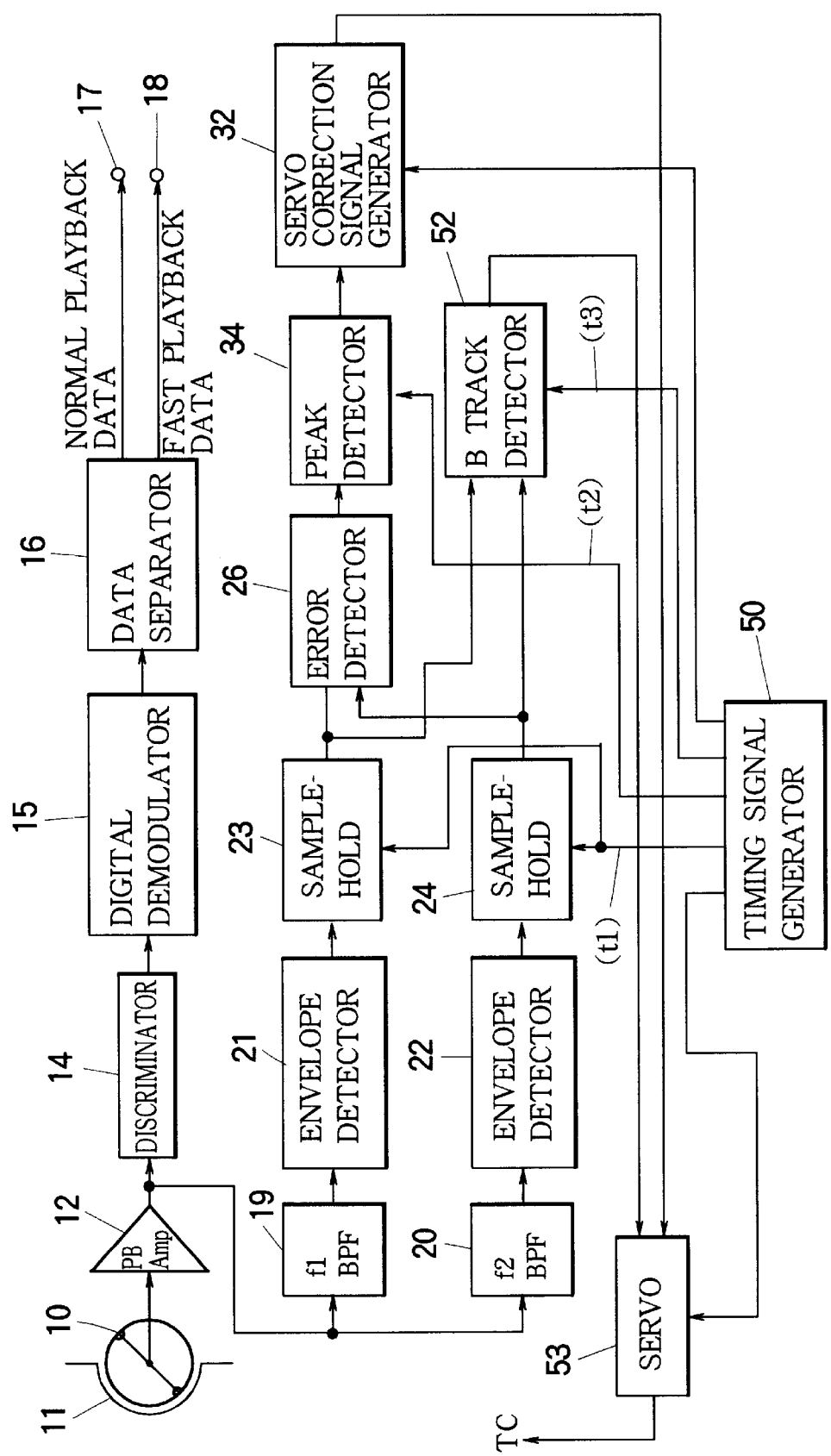
FIG. 25 is a diagram showing another example of the configuration of the playback section of the bitstream recording and playback device.

In Embodiment 8, the average value of the respective points is used for the detection of the error signal for the tracking control. However, it is possible to provide a peak detector 34 as in the configuration of a bitstream recording and playback device shown in FIG. 25, and perform tracking control on the basis of the average of peak values of the respective points. Still alternatively, a bitstream recording and playback device similar to that of Embodiment 7 (FIG. 18) in which the error is corrected on the basis of the calculation of the average value of the respective points and the average of the peak values may be used, and yet similar effects are obtained.

In Embodiment 8, the sampling points at the duplication areas include two points at both ends of the region. However, error signals may be detected at a greater number of points, within the region as well as at the ends of the region.

Figure 26:
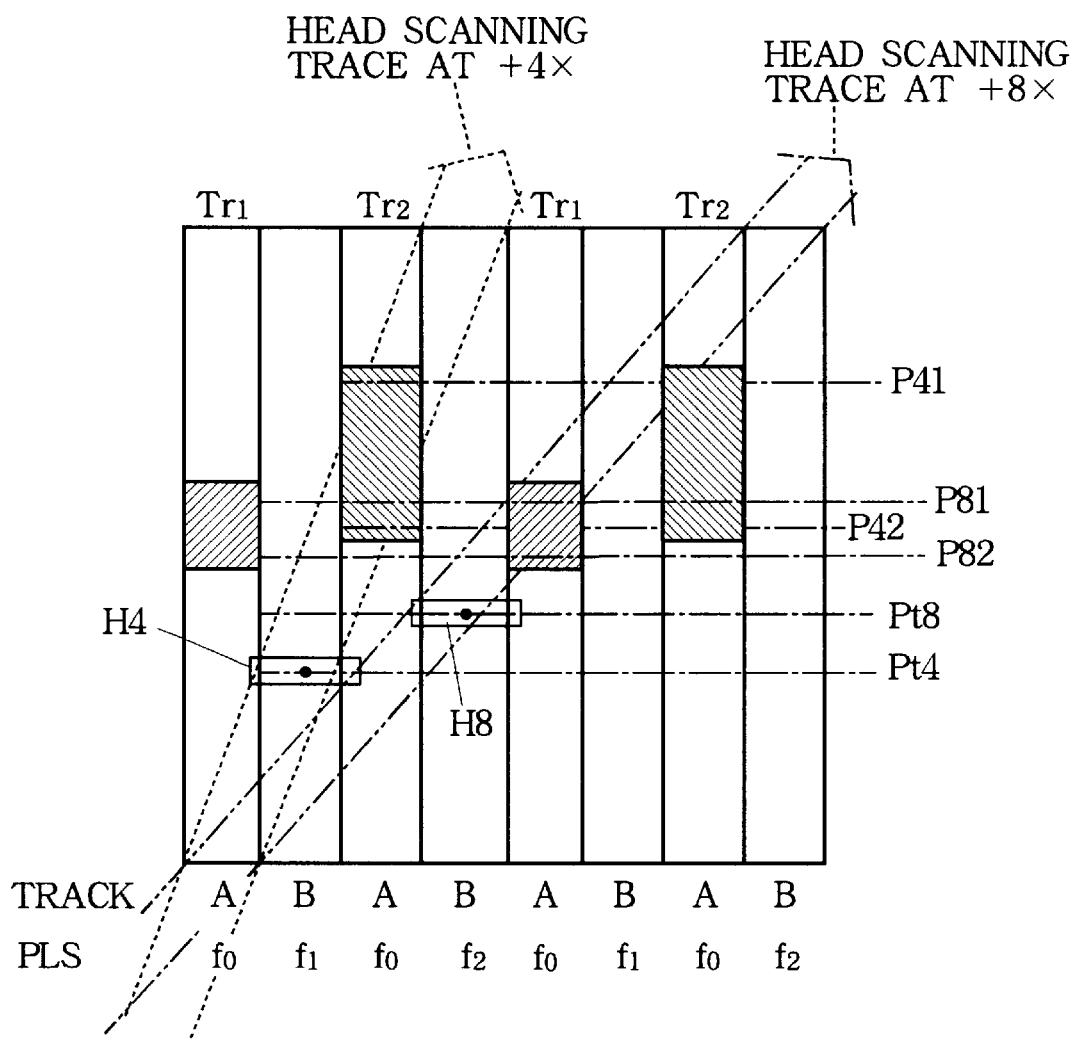
FIG. 26 shows the disposition of the duplication areas for four-time and eight-time speed fast playback and head trace positions on the magnetic tape.

FIG. 26 shows the disposition of the duplication areas for four-time speed and eight-time speed fast playback and head traces. The duplication areas for the eight-time speed playback may be disposed every four tracks like the duplication areas for four-time speed fast playback. To enable four-time speed playback and eight-time speed playback, the duplication areas for the respective playback speeds are disposed as shown in FIG. 26.

Figure 27:
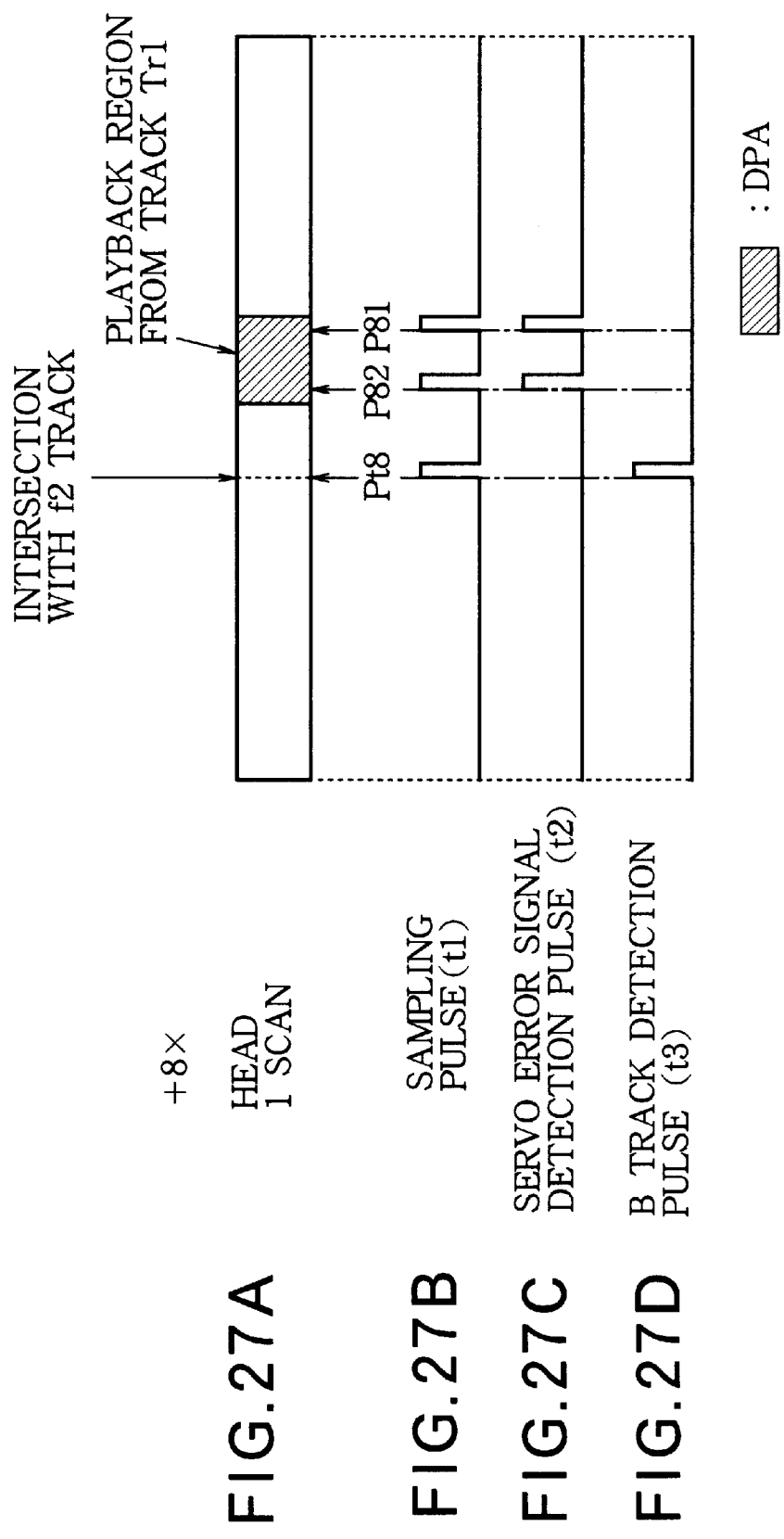
FIG. 27A to FIG. 27D shows an example of sampling points for tracking error signal detection during eight-time speed playback.

FIG. 27A to FIG. 27D show an example of sampling points for the tracking error signal detection during eight-time speed playback. When head scan is effected at an eight-time speed, the sampling pulse (t1), the servo error signal detection pulse (t2) and the B track detection pulse (t3) are generated as shown in FIG. 27B to FIG. 27D. Accordingly, at Pt8, identification of f2 track is made, and the servo correction signals are obtained from the +8× duplication areas. Thus, for effecting four-time speed or eight-time speed fast playback, tracking control can be effected in any of the manners described above, by disposing the duplication areas taking account of the track non-linearity, and generating the sampling pulses as shown in FIG. 23B or FIG. 27B, for each of the playback speeds.

As has been described, fast playback is effected from a magnetic tape on which duplication areas are disposed at k locations (k being a positive integer) at an interval of t tracks (t being a positive integer not smaller than 2) during recording of fast playback signals is achieved by detecting the tracking errors by extracting, from kj points (k being a positive integer) from each of the duplication areas traced by the head, pilot signal components appended thereto, extracting the pilot signal components in the vicinity of the intersection of the center of the head with at least one of the tracks adjacent to the track where the fast playback signal is recorded, to detect the repetition pattern of the pilot signals for t tracks, and performing tracking control on the basis of the (k×Kj) errors detected from the respective points and the result of the detection of the repetition pattern of the pilot signals. Accordingly, even when a track non-linearity is present, fast playback data can be obtained without fail, identifying the repetition pattern of the pilot signals of the playback tracks.

Embodiment 9

In the bitstream recording and playback device of Embodiment 1 to Embodiment 8, pilot signal components are extracted from the respective points in the duplication areas to detect the tracking errors, the tracking control is performed on the basis of the errors at a plurality of points, and the errors are obtained from the cross-talk components of the pilot signals.

The bitstream recording and playback device to be described next performs tracking control such that the pilot signal components errors detected at both ends of the duplication area (where the pilot signal components should be equal if there is no tracking error) are equal.

Figure 28:
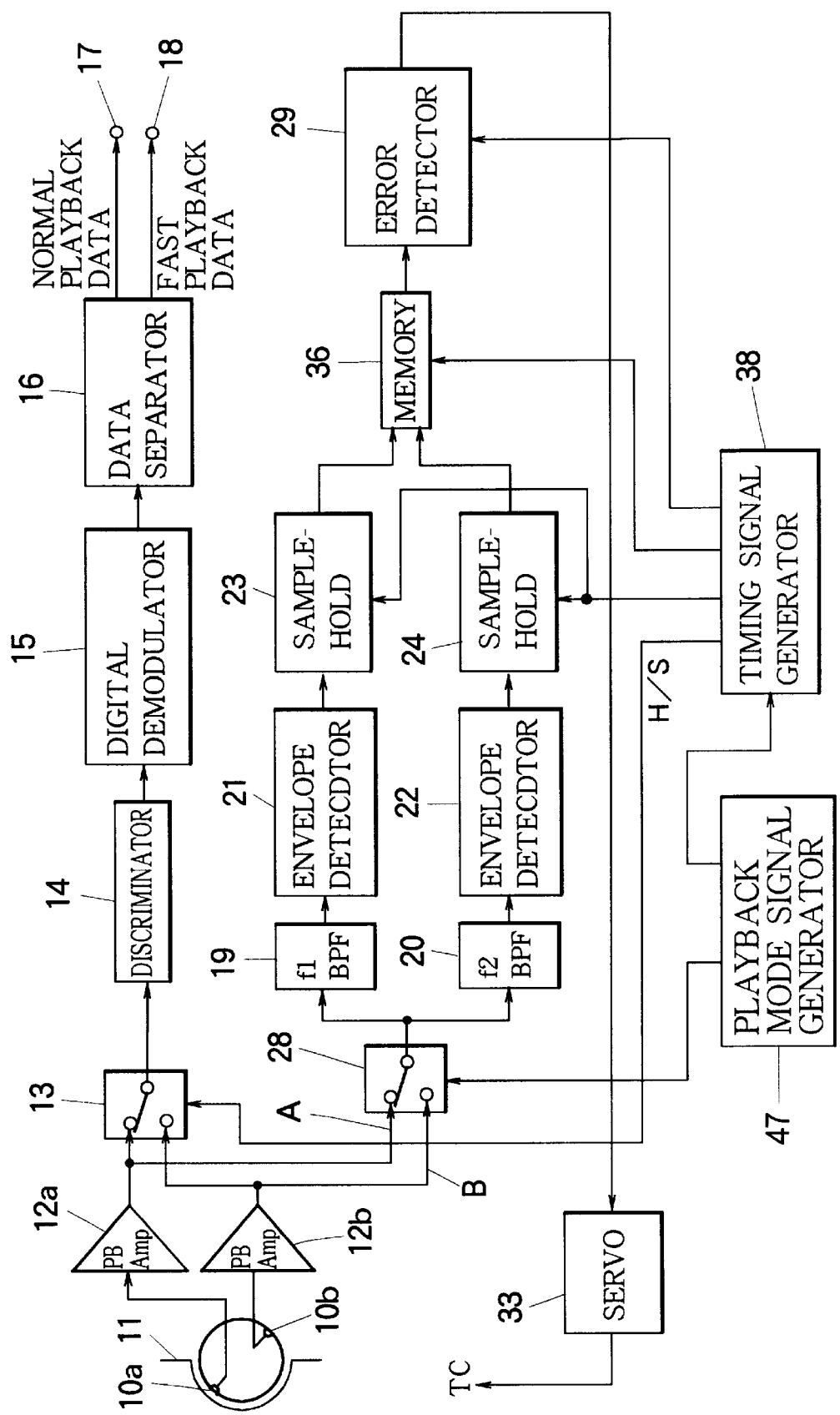
FIG. 28 is a block diagram showing the configuration of the playback section of the bitstream recording and playback device in Embodiment 9.

FIG. 28 is a block diagram showing the playback section of the bitstream recording and playback device in Embodiment 9. In the block configuration of FIG. 28, the reference numerals 10 to 12 denote members identical to those in the conventional bitstream recording and playback device shown in FIG. 69. Reference numeral 28 denotes a switch for selecting between the playback signals from the heads 10a and 10b. Reference numeral 29 denotes an error detector for tracking error, 36 denotes a memory, and 38 denotes a timing signal generator. The timing signal generator 38 generates a head selection signal, a signal indicating the sampling points for error signal detection for tracking control, and a timing signal for servo control and the like. Reference numeral 47 denotes a playback mode signal generator for generating a signal indicating the playback mode, and 33 denotes servo circuit for performing tracking control on the basis of the signals from the timing signal generator 38 and the error detector 29.

The playback operation of the bitstream recording and playback device will next be described. The playback operation during normal playback is first described. During normal playback, the heads 10a and 10b respectively read playback signals from the tracks on the tape 11, and the playback amplifiers 12a and 12b amplify the respective playback signals. The amplified playback signals are sent to the switch 13, where, according to the head selection signal from the timing signal generator 38, the playback signals from the heads used for playback are selectively combined into a single playback signal, which is then supplied to and discriminated by the discriminator 14. The digital demodulator 15 performs digital demodulation to restore the original bitstream, which is then supplied to the data separator 16. The data separator 16 separates the bitstream recorded in the main areas and the HP data stored in the duplication areas, and outputs the data of the main areas as normal playback data to the output terminal 17, and the data of the duplication areas as fast playback data to the output terminal 18. The respective playback data are supplied to the MPEG2 decoder provided outside of the digital VTR. During normal playback, the HP data is discarded.

The output of the playback amplifiers 12a and 12b are supplied not only to the switch 13 but also to the switch 28. The switch 28 selects, in accordance with the signal indicating the playback mode, the playback signal of the head A output via the playback amplifier 12a during normal playback, and the playback signal of the head B output via the playback amplifier 12b during fast playback. The selected playback signal is supplied to the bandpass filters 19 and 20.

During normal playback, the playback signal read by the head A from A tracks is selected by the switch 28 and supplied to the bandpass filters 19 and 20, which extract f1 and f2 components forming the cross-talk components from B tracks adjacent to, both right and left of, the track from which the playback signal is being read. The frequency components output from the bandpass filters 19 and 20 are detected by the envelope detectors 21 and 22, and then supplied to the sample-hold circuits 23 and 24. The sample-hold circuits 23 and 24 are given sampling pulses from the timing signal generator 38, and sample and hold the f1 and f2 components at the predefined sampling timings. The memory 36 stores the sample values at the sampling points, which are subsequently supplied, without change, to the error detector 29. The error detector 29 detects, from the cross-talk components of the pilot signal extracted as the f1 and f2 components, the differences, and supplies them as the tracking error signals to the servo circuit 33. The servo circuit 33 generates a tracking control signal (TC) to perform tracking control, on the basis of the error signals and the timing signal from the timing signal generator 38.

During normal playback, like the prior art example described above, if the sampling pulses for the sample and holding have sampling points in the ITI areas positioned at the lower end of each track shown in FIG. 70, f1 and f2 pilot signal components forming the cross-talk components are detected in the playback signal from the head A for tracing the A track of f0. The errors of the extracted f1 and f2 components are detected, and the tracking control signal (TC) is generated from the error signals at the sampling points, and the tracking control is effected such that the error is zero.

Figure 29A:
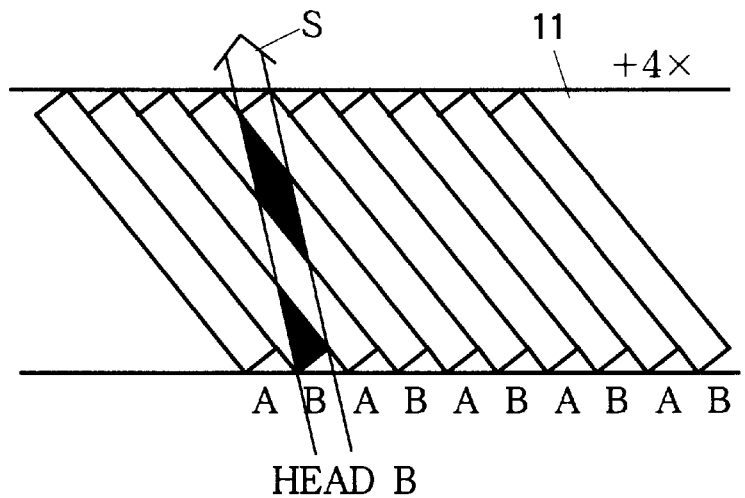
FIG. 29A is a diagram showing the head trace position on a track during four-time playback.
Figure 29B:
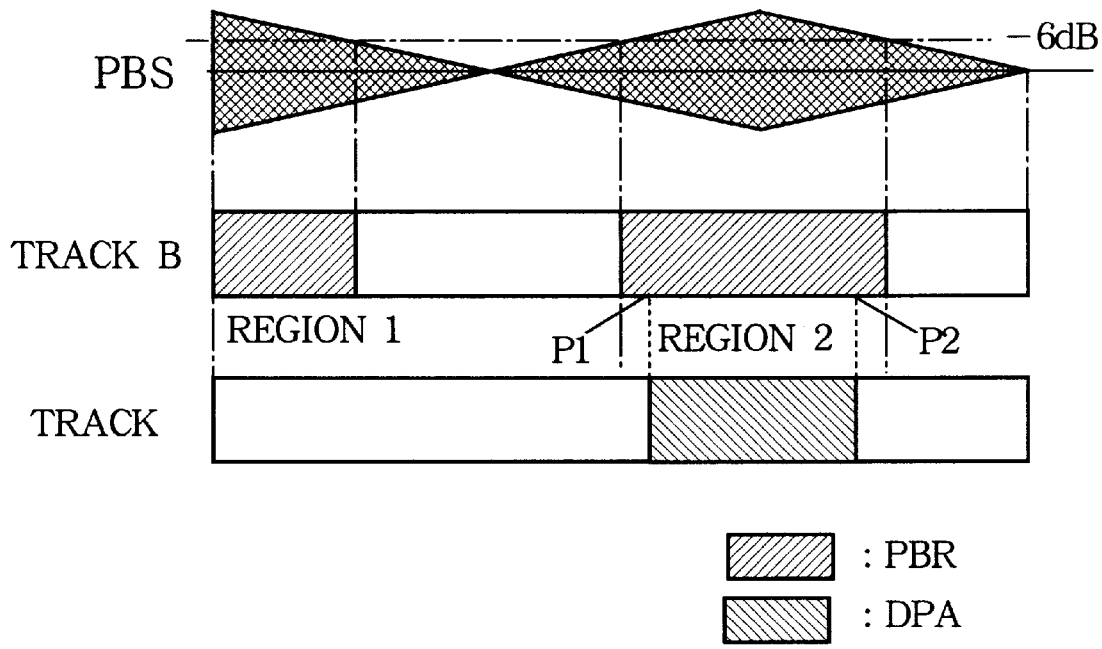
FIG. 29B is a diagram showing an example of playback regions.

FIG. 29A shows the head trace position of the head B on the tracks on a tape during four-time speed playback, and FIG. 29B shows an example of the playback regions.

Let assume that a four-time speed playback is effected. If phase-locked control is effective, the head scanning is synchronized with the identical-azimuth tracks. Description is made of the case where four-time speed playback is effected in synchronism with the B track, and the head trace is as shown in FIG. 29A. The duplication areas are disposed in the region 1 or 2. If the duplication area is disposed in the region 2, the position of the duplication area on the track is in the area P1 to P2 on the track B as shown in FIG. 29B, and fast playback data is reproduced from this area during fast playback. The duplication areas that are traced are on the tracks B on which pilot signal f1 is recorded.

Description will next be made of the operation of the bitstream recording and playback device during fast playback. During fast playback, the playback signals from the heads 10a and 10b are amplified by the playback amplifiers 12a and 12b, selected by the switch 13, discriminated by the signal discriminator 14, and digitally modulated by the digital demodulator 15. The output of the digital demodulator 15 is supplied to the data separator 16. The HP data of the duplication areas separated at the data separator 16 and output to the output terminal 18 are collected and supplied to the decoder, while the bitstream of the main areas is discarded. The outputs of the playback amplifiers 12a and 12b are also supplied to the switch 28, which, in accordance with the signal indicating the fast playback mode from the playback mode signal generator 47, selects the playback signal from the track B read by the head 10b, and supplies it to the bandpass filters 19 and 20. Pilot signal f1 and f2 components in the track B from which reproduction is taking place are extracted, and the frequency components output from the respective filters 19 and 29 are detected at the envelope detectors 21 and 22, and then supplied to the sample-hold circuits 23 and 24. The sample-hold circuits 23 and 24, in accordance with the sample pulses from the timing signal generator 38, sample and hold the f1 and f2 components detected at the envelope detectors 21 and 22, and supply the values at the sampling points to the memory 36.

FIG. 30 shows the disposition of the duplication areas, the head trace, and sampling points for the four-time speed playback. FIG. 31A and FIG. 31B show an example of sampling points for tracking error signal detection during fast playback according to the embodiment.

The sampling pulses supplied form the timing signal generator 38 to the sample-hold circuits 23 and 24 are pulses shown in FIG. 31B during track B scanning, and having sampling points P1 and P2 at both ends of the duplication area from which reproduction is effected. If the two points are at a distance z (z is shorter than the head B playback burst length) from the intersection P0 of the center of the head B with the center of the track B, then at P1 and P2, pilot signal components of the track B positioned at the duplication area as shown in FIG. 30 are extracted, and the values of the pilot signal components eb1 and eb2 extracted from the identical track at the two points are equal. The burst length recited above means the length over which correct data can be obtained and is expressed in terms of the number of the sync blocks or the length along the track.

In the case of FIG. 30, f1 component is extracted, at the two sampling points P1 and P2, from the B track on which f1 is recorded, and the situation in which the difference between f1 components eb1 and eb2, i.e., (eb1–eb2), is zero provides a reference value, and the difference of (eb1 –eb2) from this value is detected by the error detector 29. Accordingly, if there is no head trace deviation due for example to track non-linearity, the error signal from the two points is zero, and the value of (eb1–eb2) corresponding to the direction of the deviation with respect to the track (right or left) and the amount of the deviation is detected at the error detector 29.

Then the recording region in the duplication area is within the regions from which reproduction is possible during fast playback, and the length of the recording region is determined taking account of the deviation of the tracking due to the amount of track non-linearity which can occur during tape transport and the track non-linearity at the sampling points which are used as references. As an example, if the track non-linearity is such that the absolute value |x|of the tracking error x is not more than 6 in the scanning trace of one scan of the head, then the absolute value of the difference between the maximum and minimum values of the errors x at the sampling points before the servo correction will be not more than 6, and the target value of the tracking error after the servo correction at the two sampling points in the region of the duplication area is such that:

error $x \leq +3$

When the four-time speed playback is effected using the trace as shown in FIG. 29A, the pilot signal f1 component eb1 extracted from the track B in which f1 is recorded is read at the sampling point P1 and stored in the memory 36, and the pilot signal f1 component eb2 extracted from the same track is read at the sampling point P2 and stored in the memory 36. When the f1 component eb2 at P2 is read, the f1 components eb1 and eb2 at P1 and P2 are supplied to the error detector 29, where the difference (eb1–eb2) between the detected f1 components at the sampling points P1 and P2 is calculated, and this value is supplied as the correction signal for the servo tracking, to the servo circuit 33. The servo circuit 33 performs the tracking control on the basis of the (eb1–eb2) from the error detector 29 and the timing signal from the timing signal generator 38, so as to bring the (eb1–eb2) closer to zero.

Figure 32:
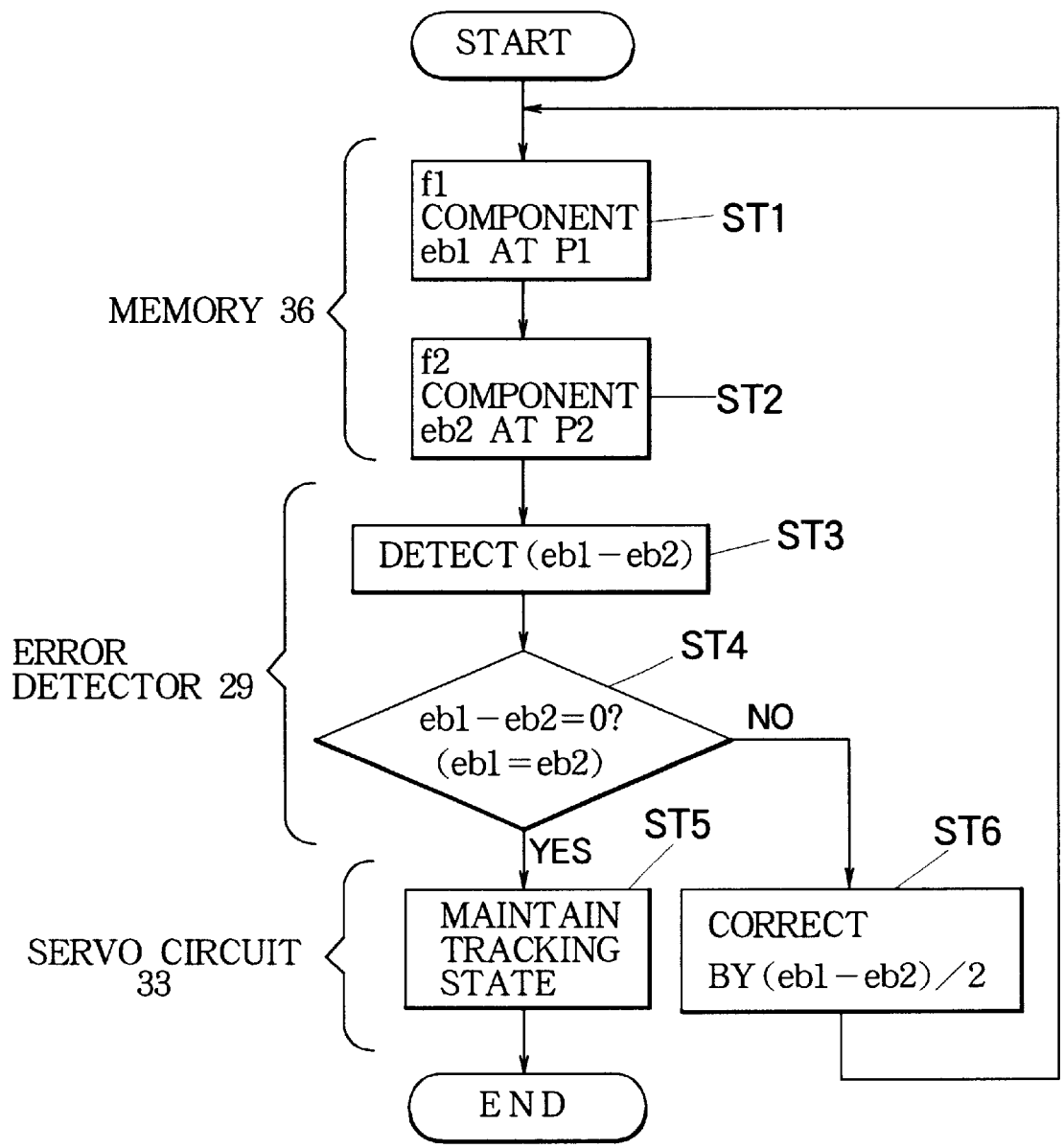
FIG. 32 is a flowchart for explaining the tracking control operation during fast playback.

FIG. 32 is a flowchart showing the tracking control operation during fast playback. In the tracking control during fast playback, tracking control is effected such that values of the f1 components eb1 and eb2 from B track at sampling points P1 and P2 at a distance z (z being not longer than the playback burst length of the head B) from the intersection P0 of the center of the head B with the center of the track B are equal, i.e., (eb1–eb2)=0. When f1 components eb1 and eb2 at sampling points P1 and P2 read in the memory 36 at steps ST1 and ST2 are supplied to the error detector 29, the difference (eb1–eb2) is detected at step ST3, and this difference is supplied to the servo circuit 33. If it is found (eb1–eb2)=0 at step ST4, then the next step is step ST5, where the tracking state is maintained. If it is not found (eb1–eb2)=0, the next step is the step ST6 where the tracking position is corrected by (eb1–eb2)/2, for example, and then steps ST1 to ST4 are repeated to detect (eb1–eb2) again. The servo circuit 33 performs the tracking control in this way such that eb1=eb2.

Figure 33:
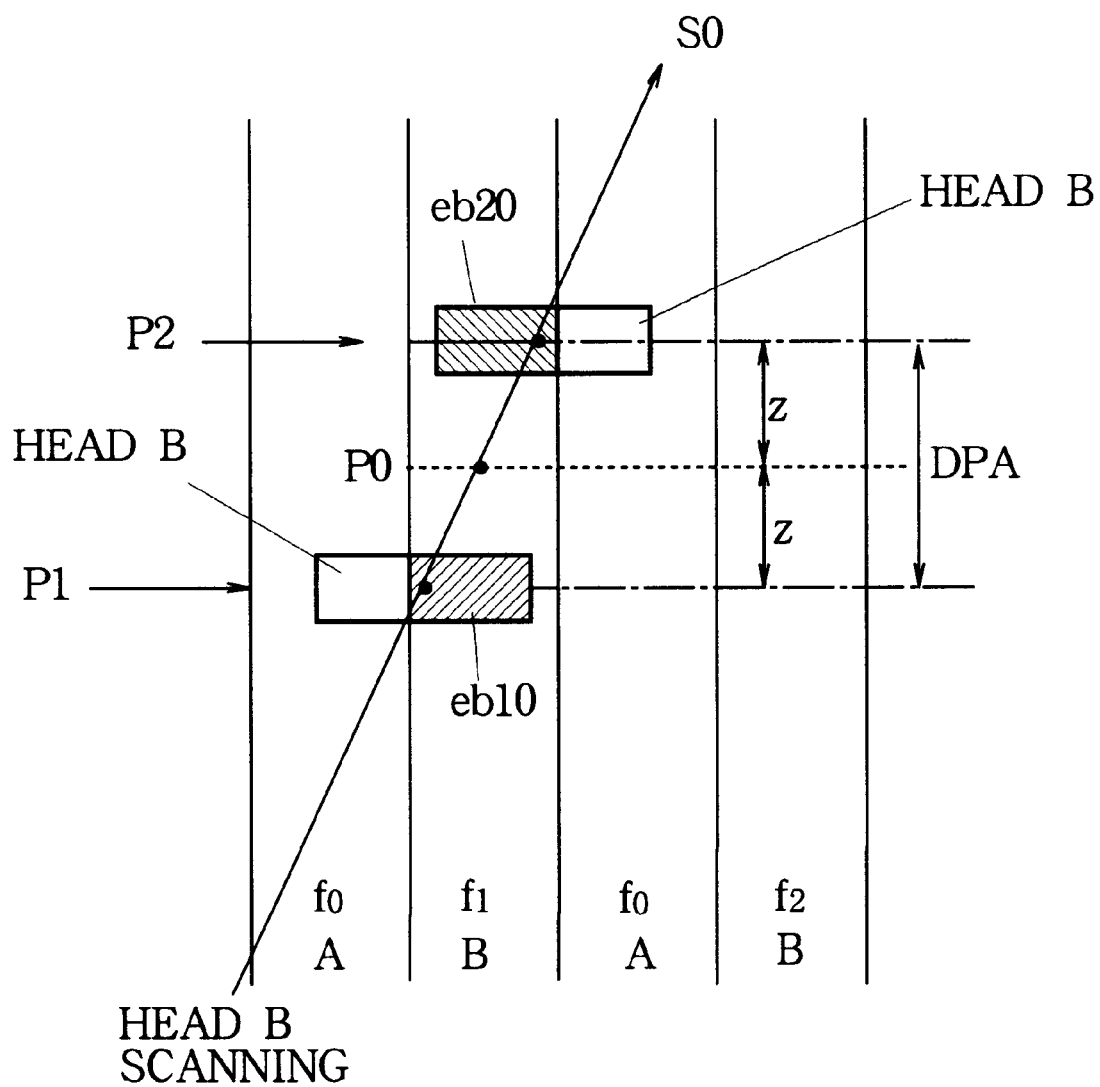
FIG. 33 is a diagram for explaining track non-linearity and tracking error correction.
Figure 34:
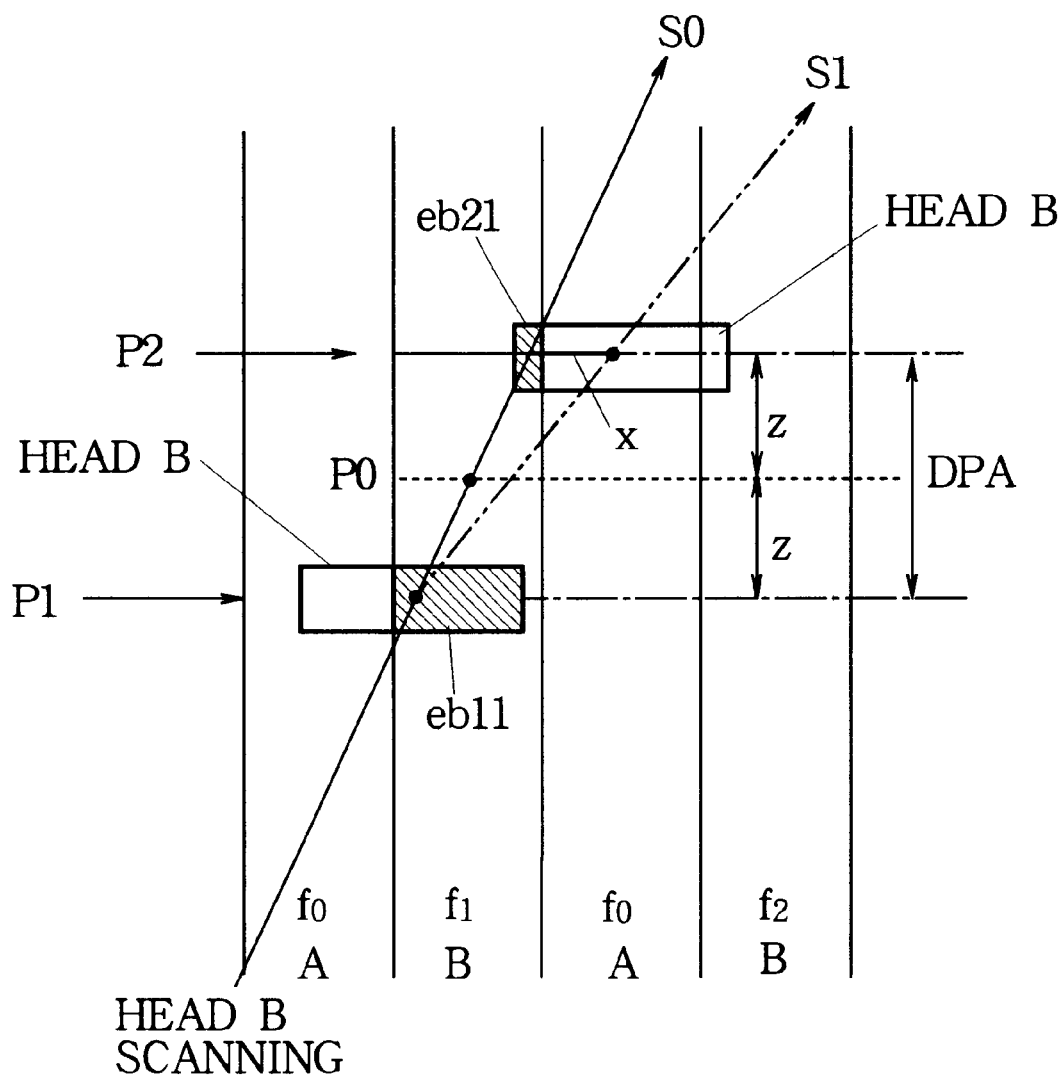
FIG. 34 is a diagram for explaining track non-linearity and tracking error correction.
Figure 35:
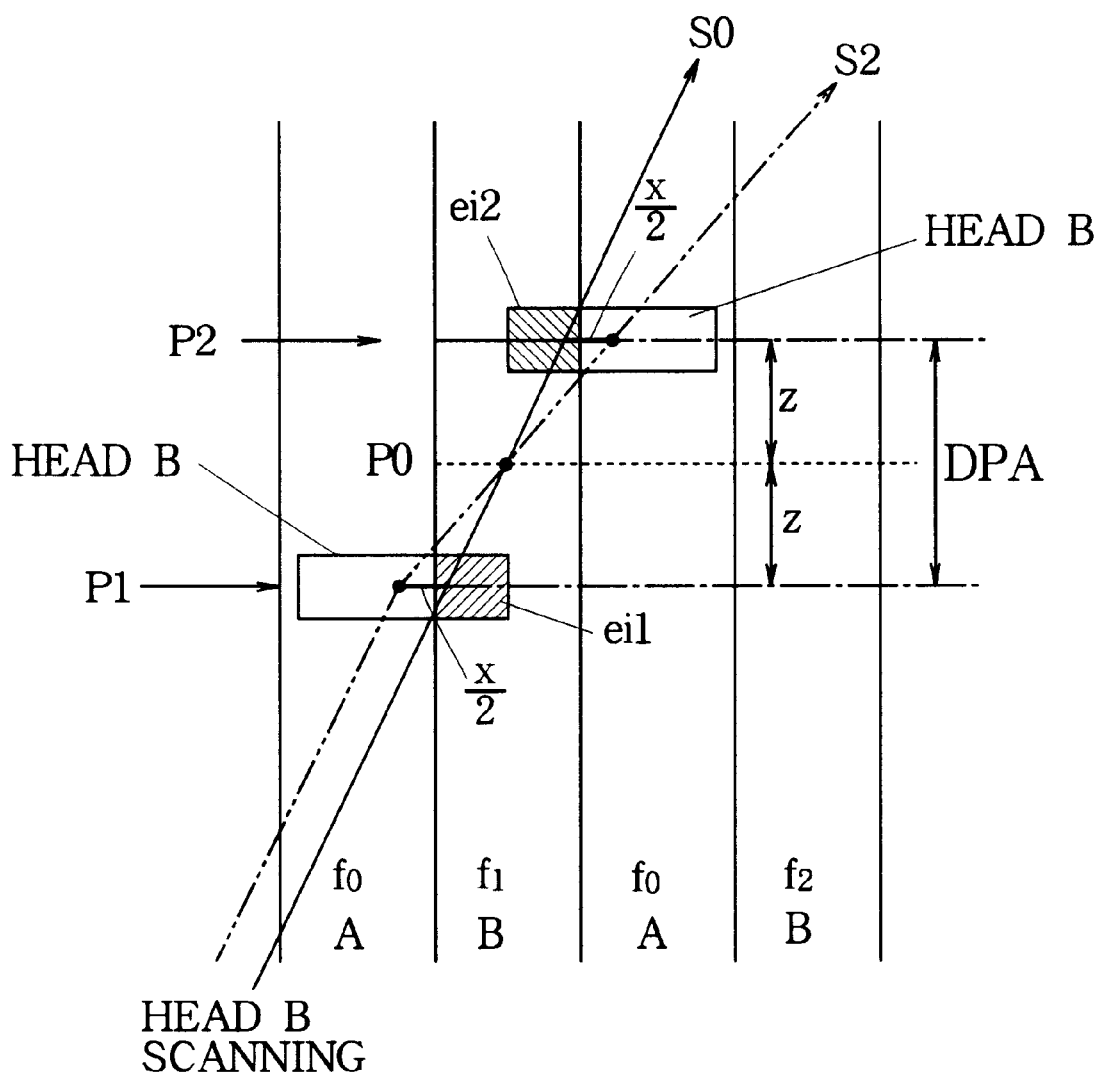
FIG. 35 is a diagram for explaining track non-linearity and tracking error correction.

FIG. 33 to FIG. 35 explain the correction of tracking non-linearity and tracking error. The following tracking control is performed if a deviation x is present at sampling point P2, for example.

If there is no track non-linearity, as shown in FIG. 33, the values of eb10 at P1 and eb20 at P2 are equal. If deviation x is present at P2, f1 component eb21 at P2 is smaller than eb11 at P1, as shown in FIG. 4, so that (eb11–eb21) is detected as a value corresponding to the deviation x. Accordingly, for correcting this (eb11–eb21), correction is made by x/2 at the respective points as shown in FIG. 35, and the f1 components ei1 and ei2 at points P1 and P2 from the track B in which f1 is recorded are equal after the correction.

As was described, when the track non-linearity is such that the magnitude (absolute value) of the tracking error x is not more than 6 in the head trace during one scan, and the regions for the duplication areas are set such that the magnitude of the target value of the tracking error x after the error correction is not more than 3, the absolute value of the difference between the maximum and minimum values of the errors x at the respective sampling points is not more than 3 because (x/2 =6/2=3), and the fast playback data in the duplication areas can be reproduced without fail.

Figure 36:
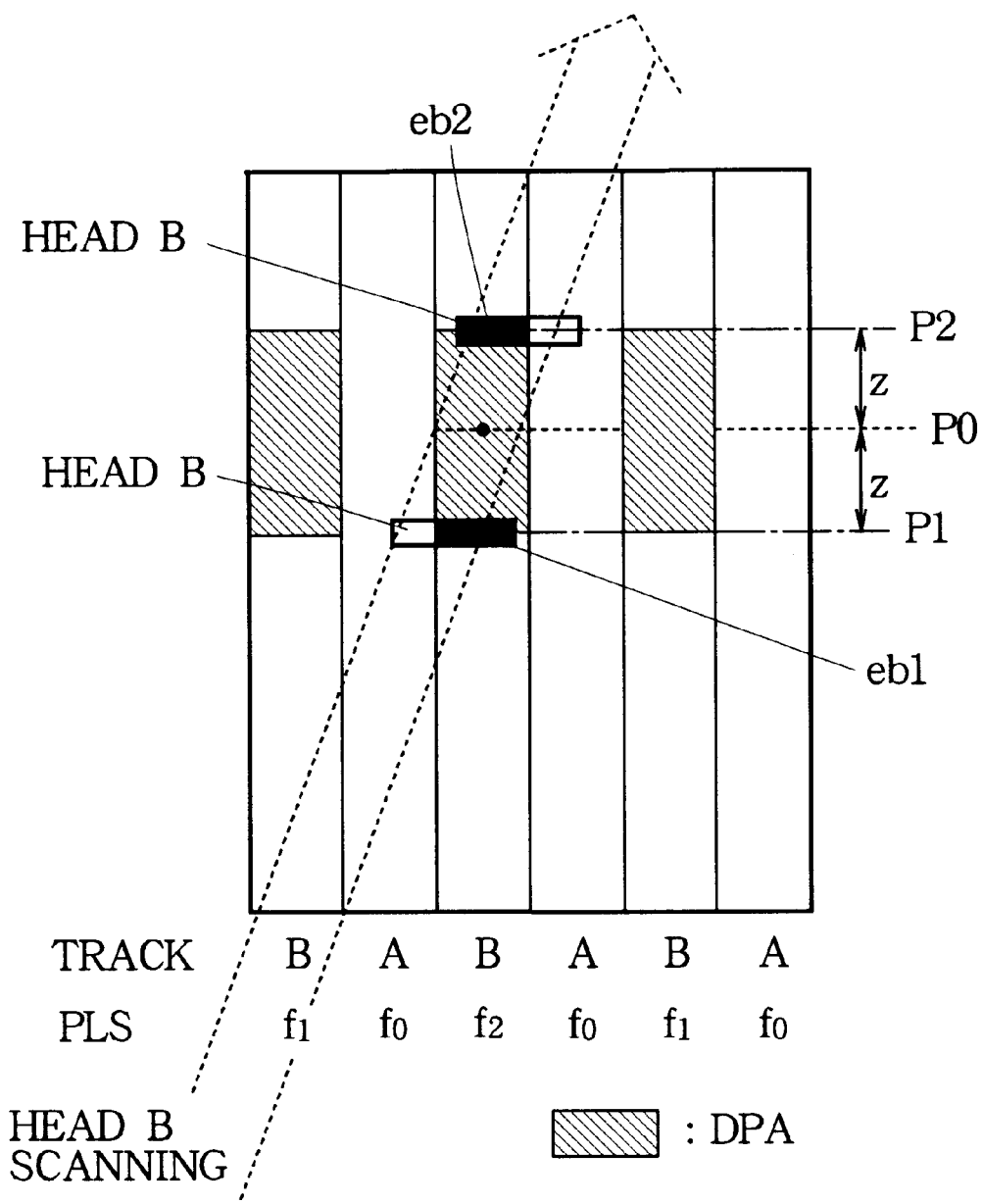
FIG. 36 shows another example of the disposition of the duplication areas for four-time speed fast playback, head trace positions, and sampling points.

FIG. 36 shows another example of the disposition of the duplication area, the head trace, and the sampling points for four-time speed fast playback. In FIG. 30, the pilot signal of the track B in which the duplication area from which reproduction is effected is recorded is f1. But, as shown in FIG. 36, synchronization for playback may alternatively be such that the pilot signal of the track B in which the duplication area from which reproduced is effected is recorded is f2. In such a case, the f2 component eb10 in track B at sampling point PI and f2 component eb20 at sampling point P2 both in track B are compared, and the tracking control is effected such that eb10 and eb20 are equal.

In FIG. 30, the sampling points P1 and P2 are at both ends of the duplication area from which reproduction is effected, pilot signal components are extracted at P1 and P2 from the track B in which f1 is recorded, the f1 components at P1 and P2 are compared, and the tracking control is performed so that these values are equal. However, alternative arrangement may be employed. For instance, the sampling points are at two points at a distance z' less than the playback burst length, pilot signal components are extracted at these two sampling points from the track in which the pilot signal of the same frequency is recorded, these components are compared, and the tracking control is performed so that these values are equal. Yet, effects similar to those of the embodiment described with reference to FIG. 28 to FIG. 35 are obtained.

Figure 37:
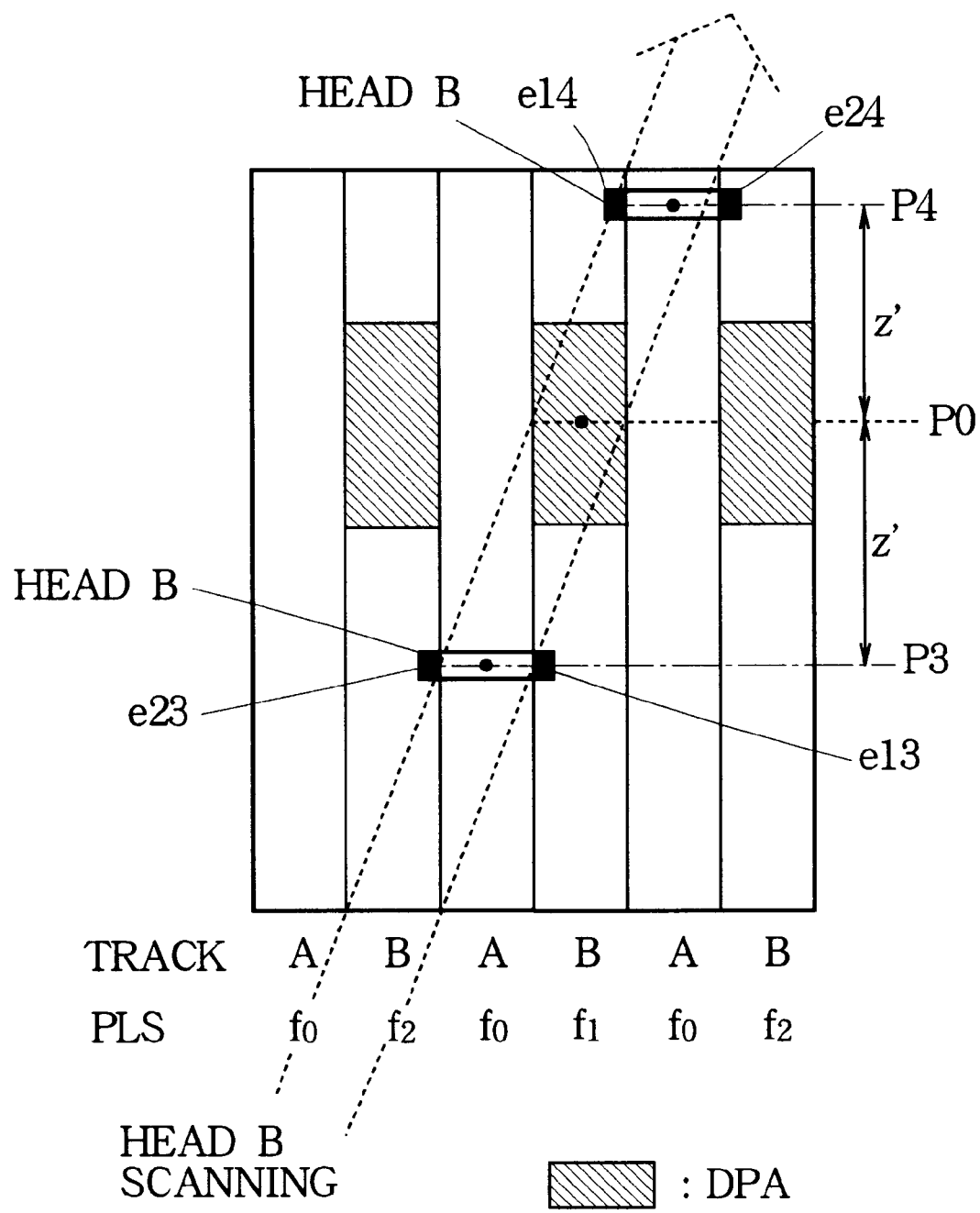
FIG. 37 shows another example of the disposition of the duplication areas for four-time speed fast playback, head trace positions, and sampling points.

FIG. 37 shows another example of the disposition of the duplication area, the head trace, and the sampling points for four-time speed fast playback. When sampling points are at P3 and P4, the tracking control is performed such that the pilot signal components e13 and e14 from the track B of f1 are equal, or pilot signal components e23 and e24 from the tracks B of f2 which are adjacent-but-one track B in which duplication area from which reproduction is effected is disposed are equal.

Figure 38:
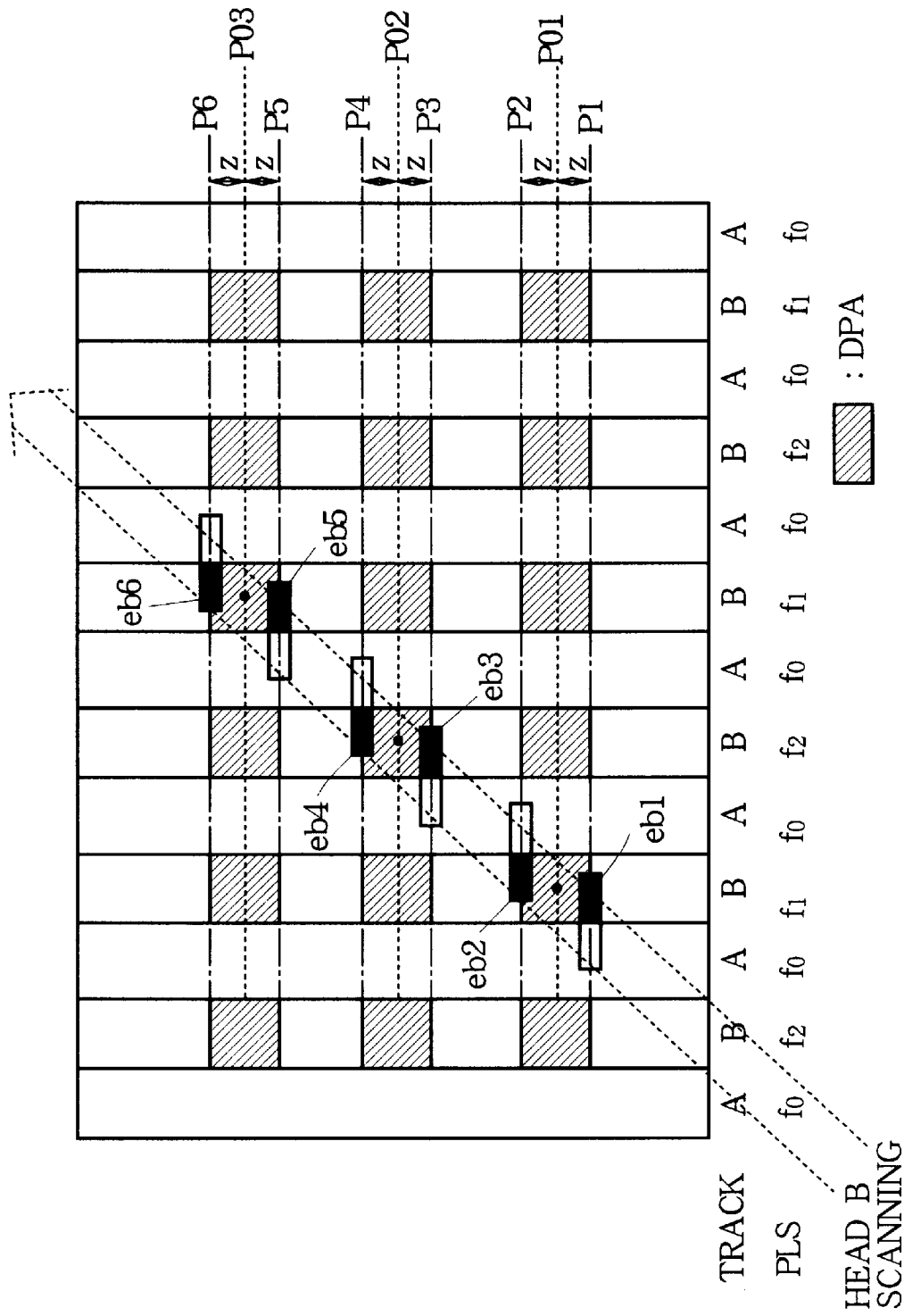
FIG. 38 shows another example of head trace positions and sampling points for the case where a plurality of duplication areas are disposed.

FIG. 38 shows another example of the disposition of the head trace and sampling point in which a plurality of duplication areas are disposed. As illustrated, when fast playback is performed from duplication areas which are disposed at a plurality of locations on a track, pilot signal components are extracted from each track B at two sampling points at a distance z (z being less than the playback burst length of the head B) from an intersection of the center of the head with the center of the track for each region, and the tracking control is performed such that the pilot signal components at the respective points are equal.

Figure 39A:
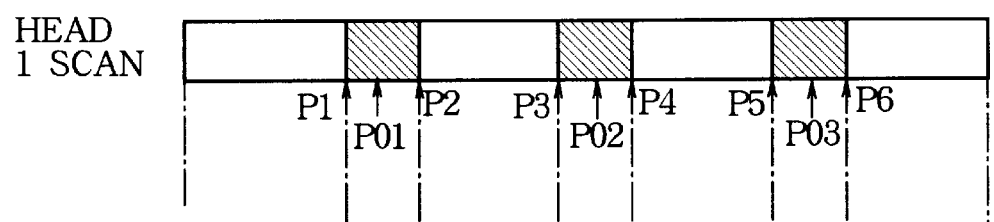
FIG. 39A and FIG. 39B show another example of sampling points for tracking error signal detection during fast playback for the case where a plurality of duplication areas are disposed.
Figure 39B:

FIG. 39A and FIG. 39B show an example of sampling points for detecting tracking error signals during fast playback where a plurality of duplication areas are disposed. Assume, for instance, duplication areas are disposed at three locations as shown in FIG. 38, and 9-time speed playback is to be effected. Pilot signal components are extracted from the track B, at sampling points P1 to P6, two points each for each of the duplication areas, at a distance z (z being less than the playback burst length of the head B) from intersections P01, P02 and P03 of the center of the head B with the center of the track B, and the pilot signal components eb1 to eb6 of track B are compared. The tracking control is performed such that the values of the pilot signals are equal on average. FIG. 39B shows an example of sampling pulses at the sample-hold circuits 23 and 24.

For conducting fast playback from the magnetic tape, pilot signal components of the same frequency recorded on the track are extracted from two points at a positions disposed opposite from each other, in the track length direction, with respect to the intersection of the center of the track with the center of the head in the duplication area, and the tracking control is performed on the basis of the tracking error detected by comparing the extracted signal levels, as described above, so that fast playback data can be reproduced without fail even where the largest amount of fast playback data is recorded and there is a track non-linearity. Moreover, the tracking can be controlled such that the fast playback signals are obtained without fail from the duplication areas. Furthermore, since the pilot signal components of the same frequency are compared for control, the level difference in the reproduced pilot signal due to the characteristic of the head, the tape and the like, so that the comparison of the components is more accurate, and the tracking can be effected such that the fast playback signals can be obtained without fail.

Embodiment 10

Another example of detecting error signals for tracking, during fast playback, in a bitstream recording and playback device capable of fast playback will next be described.

FIG. 40 is a block diagram showing the configuration of the playback section of the bitstream recording and playback device of Embodiment 10. In the drawing, reference numerals 10 to 24 denote members identical to those in Embodiment 9 (FIG. 28). Reference numeral 36 denotes a memory, 37 denotes an error detector, 38 denotes a timing signal generator, and 39 denotes a servo circuit.

The error detector 37 detects the difference between the pilot signal components at two sampling points from the memory 36, to thereby detect a tracking error signal. The timing signal generator 38 generates and outputs a head selection signal, signals indicating the sampling timings for error signal detection, servo timing signals, and other timing signals. The servo circuit 39 performs tracking control on the basis of the signals from the timing signal generator 38 and the error detector 37.

The normal playback operation and the fast playback operation up to the data separator 16 are identical to those of the bitstream recording and playback device of Embodiment 9, and their description is therefore omitted. During normal playback, the output of the playback amplifier 12a which is the playback signal read by head 10a from the track A is input to the bandpass filters 19 and 20, where frequency f1 and f2 components are extracted, and and the frequency components output from the filters 19 and 29 are detected at the envelope detectors 21 and 22, and then supplied to the sample-hold circuits 23 and 24. The sample-hold circuits 23 and 24 sample and hold the f1 and f2 components in accordance with the sampling pulses from the timing signal generator 38. The values at the sampling points are input into the memory 36, and then supplied to the error detector 37. The error detector 37 detects the difference between the f1 and f2 pilot signals within the playback signal, i.e., the cross-talk components from the left and right tracks, to thereby detect the tracking error, and supplies the result of the detection to the servo circuit 39. The servo circuit 39 performs tracking control on the basis of the servo correction signal derived from the error detection result and the timing signals from the timing signal generator 38.

Let us assume that, during normal playback, the sampling pulses for the sample-hold have sampling points in the ITI area at the lower end of the track, as shown in FIG. 70, as in Embodiment 9. f1 and f2 pilot signal frequency components in the playback signal from the head A tracking a track A of f0, that is, the cross-talk components from adjacent tracks at the sampling points are sampled, and the difference between the extracted f1 and f2 components, and the tracking control is performed such that the difference is zero.

Figure 41A:
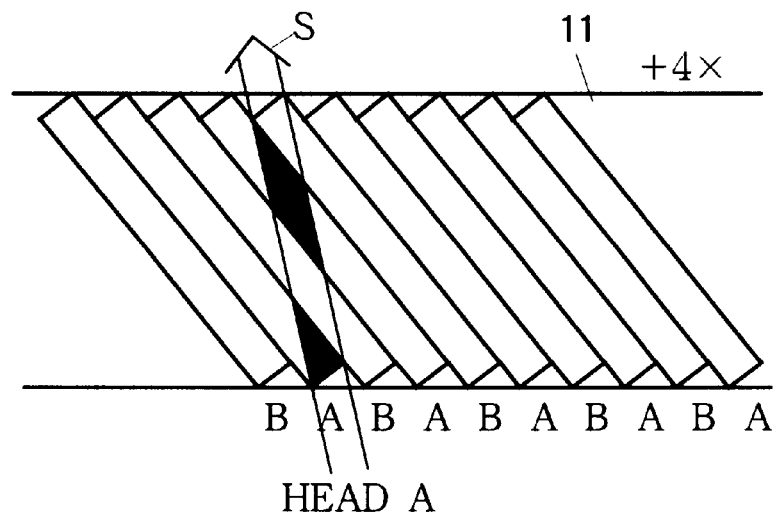
FIG. 41A is a diagram showing the position of the head trace by the head A on the track on the tape during four-time speed playback.
Figure 41B:
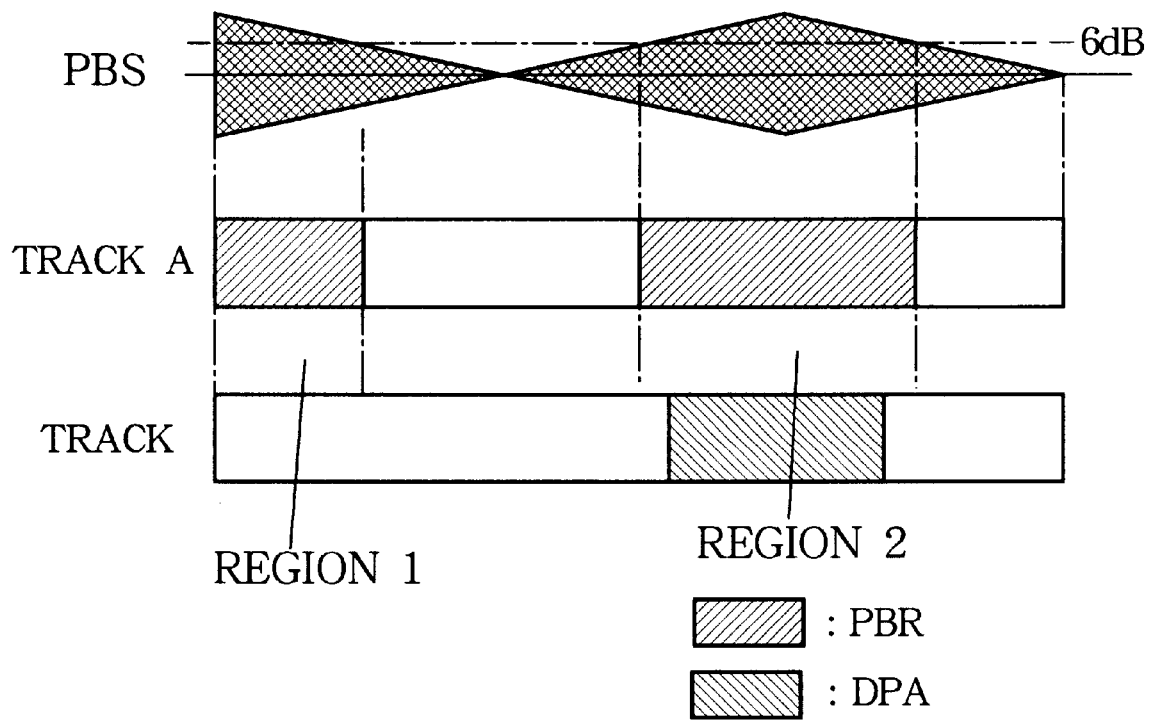
FIG. 41B is a diagram showing an example of playback regions.
Figure 42:
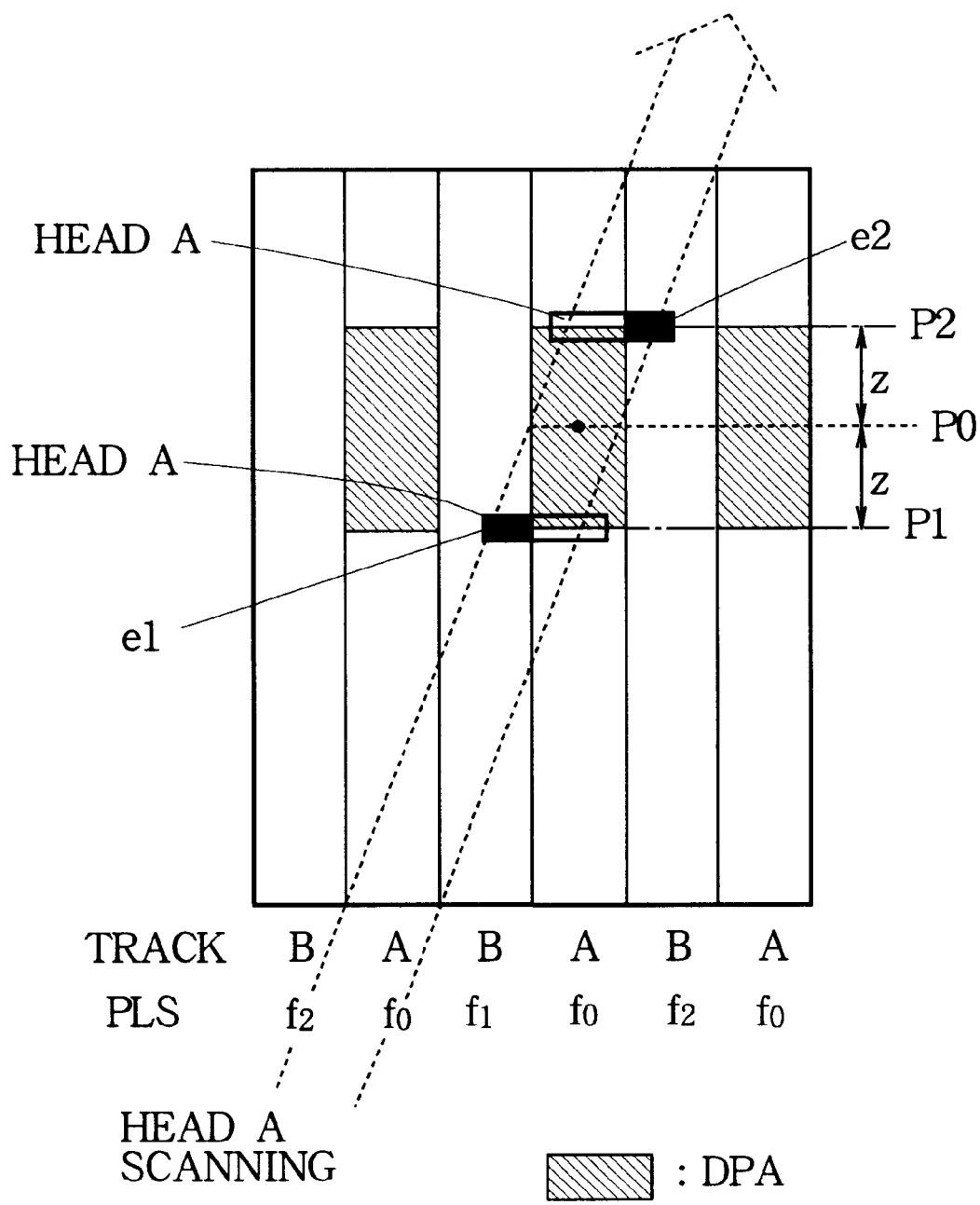
FIG. 42 shows the disposition of the duplication areas for four-time speed fast playback, head trace positions, and sampling points.

The operation during fast playback will next be described. FIG. 41A shows the positions of the head trace by the head A on the tracks on the tape during four-time speed playback. FIG. 41B shows an example of playback regions. FIG. 42 shows the disposition of the duplication areas and the sampling points during four-time speed playback. The following description is made on the assumption that four-time speed playback is to be effected, like Embodiment 9, and that the four-time speed playback is effected in synchronism with the A tracks, and the head trace is as shown in FIG. 41A.

Referring to FIG. 41B, the duplication area is disposed in the playback signal region 1 or 2. If the duplication area is disposed in the region 2, for example, the duplication area is positioned in the area from P1 to P2 on track A as shown in FIG. 42, and fast playback data is reproduced from this area during fast playback. It is also assumed that with regard to the pilot signals from the adjacent tracks B positioned on the right and left sides of the track in which the duplication area that is traced is positioned, f1 is recorded on the track B on the left side, and f2 is recorded on the track B on the right side.

During fast playback, the signal from the playback amplifier 12a, which is a playback signal from the track A, reproduced by the head 10a, is input to the bandpass filters 19 and 20, where cross-talk components of frequencies f1 and f2 are extracted from the playback signal, and are then detected at the envelope detector 21 and 22, and then supplied to the sample-hold circuits 23 and 24. The operation up to this point is identical to that for the normal playback described above.

The sample-hold circuits 23 and 24 sample and hold the f1 and f2 components detected by the envelope detectors 21 and 22, in accordance with the sampling pulses from the timing signal generator 38, and supply the values at the sampling points to the memory 36. The sampling pulses supplied from the timing signal generator 38 to the sample-hold circuits 23 and 24 are at the same positions as the pulses shown in FIG. 31 for track A scanning, and have sampling points P1 and P2 at both ends of the duplication area from which reproduction is effected. If these two points are at a distance z (z being less than the playback burst length) from an intersection P0 of the center of the head A with the center of the track A, f1 component extracted, at one of the points, from the track adjacent to the track A, and f2 component e2 extracted, at the other point, from the track adjacent to the track A are equal. In this case, the reference value is obtained when (e1–e2) is zero. The error of (e1–e2) from this value is detected by the error detector 37. If there is no head trace deviation due for example to track non-linearity, the error signal from the two points is zero. The value (e1–e2) which corresponds to the direction and amount of deviation of the track due to track non-linearity is detected by the error detector 37.

The recording region in the duplication area extends over the region from which reproduction is possible during fast playback, like Embodiment 9, and is determined taking account of the track deviation due to track non-linearity which can occur during tape transport, and the tracking deviation due to track non-linearity at the sampling point used as a reference. As an example, if the track non-linearity is such that the absolute value of the tracking error x in the trace of one scanning of the head is not more than six, then the absolute value of the difference between the maximum and minimum values of the errors x at the respective sampling points before the servo correction is not more than six, and the target value of the tracking error after the servo correction at the two sampling points in the region of the duplication area is not more than 3.

If four-time speed playback is effected using a trace shown in FIG. 42, pilot signal f1 component e1 extracted at sampling point P1 from the track to the left of the track A is stored in the memory 36, and pilot signal f2 component e2 extracted at sampling point P2 from the right track is also stored in the memory 36. When f2 component e2 at P2 is stored, the f1 component e1 at P1 and f2 component e2 at P2 are supplied to the error detector 37, where the difference (e1–e2) is calculated, and this value is supplied as tracking correction signal to the servo circuit 39. The servo circuit 39 performs tracking control on the basis of (e1–e2) from the error detector 37 and the timing signal from the timing signal generator 38, in such a manner that (e1–e2) approaches zero.

Figure 43:
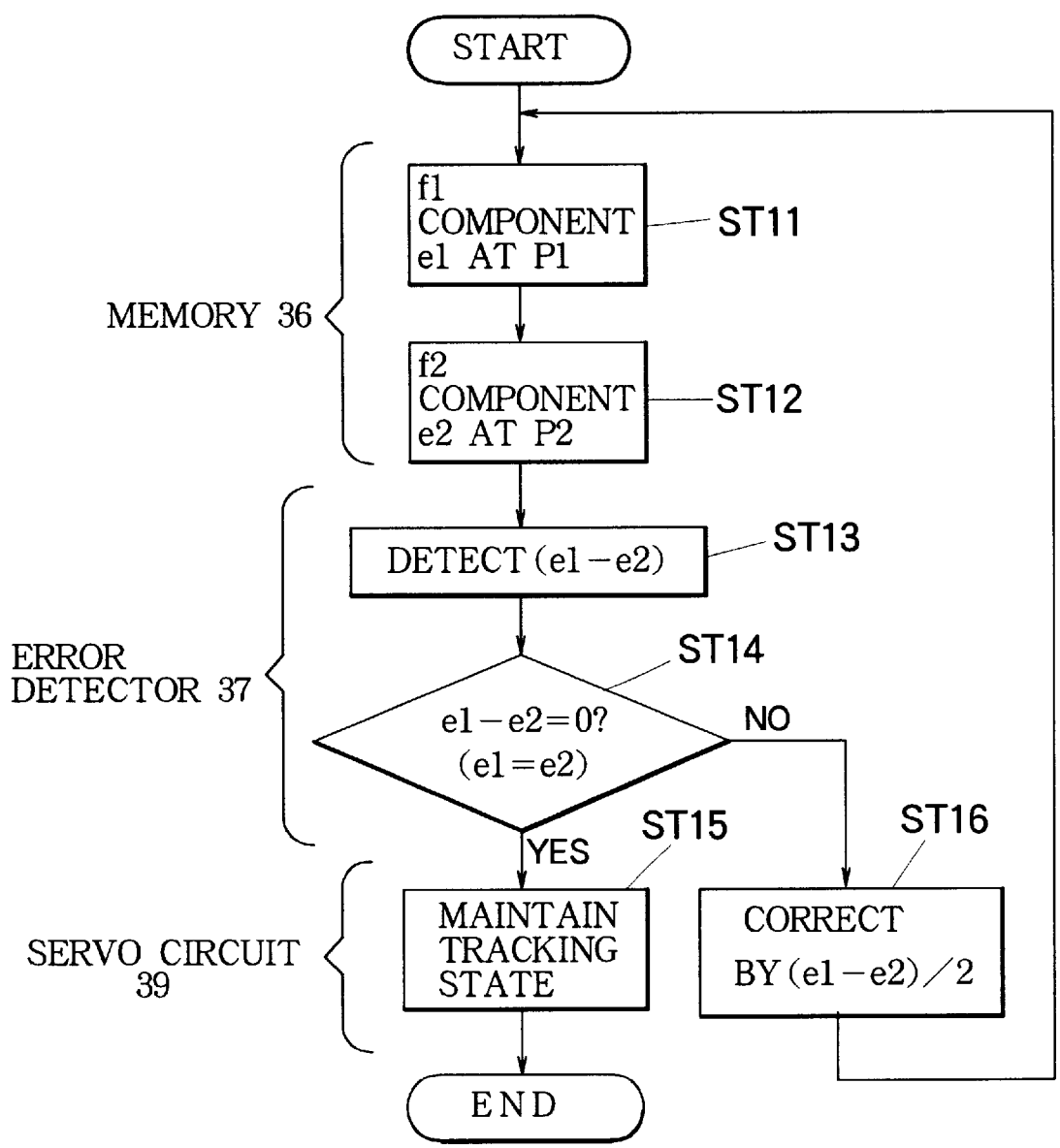
FIG. 43 is a flowchart for explaining the tracking control operation during fast playback.

FIG. 43 is a flowchart showing the tracking control operation during fast playback. The bitstream recording and playback device described above performs control such that f1 component e1 and f2 component e2 at one and the other of the sampling points P1 and P2 at a distance z (z being less than the playback burst length of the head A) from an intersection of the center of the head A with the center of the track A are equal.

When performing tracking control such that (e1–e2)=0, At steps ST11 and ST12, f1 component e1 at sampling point P1 and f2 component e2 at sampling point P2 are supplied to the error detector 37, where (e1–e2) is detected, and this value is supplied to the servo circuit 39 (step ST13). At step ST14, judgment is made whether (e1–e2)=0. If (e1–e2)=0, the next step is step ST15 and the tracking state is maintained. If (e1–e2) is not zero, the next step is the step ST16, where tracking position is corrected by (e1–e2)/2, and then (e1–e2) is again detected. In this way, the servo circuit 39 performs the tracking control such that e1=e2.

The tracking control effected when a deviation x is present at sampling point P2 will next be described.

Figure 44:
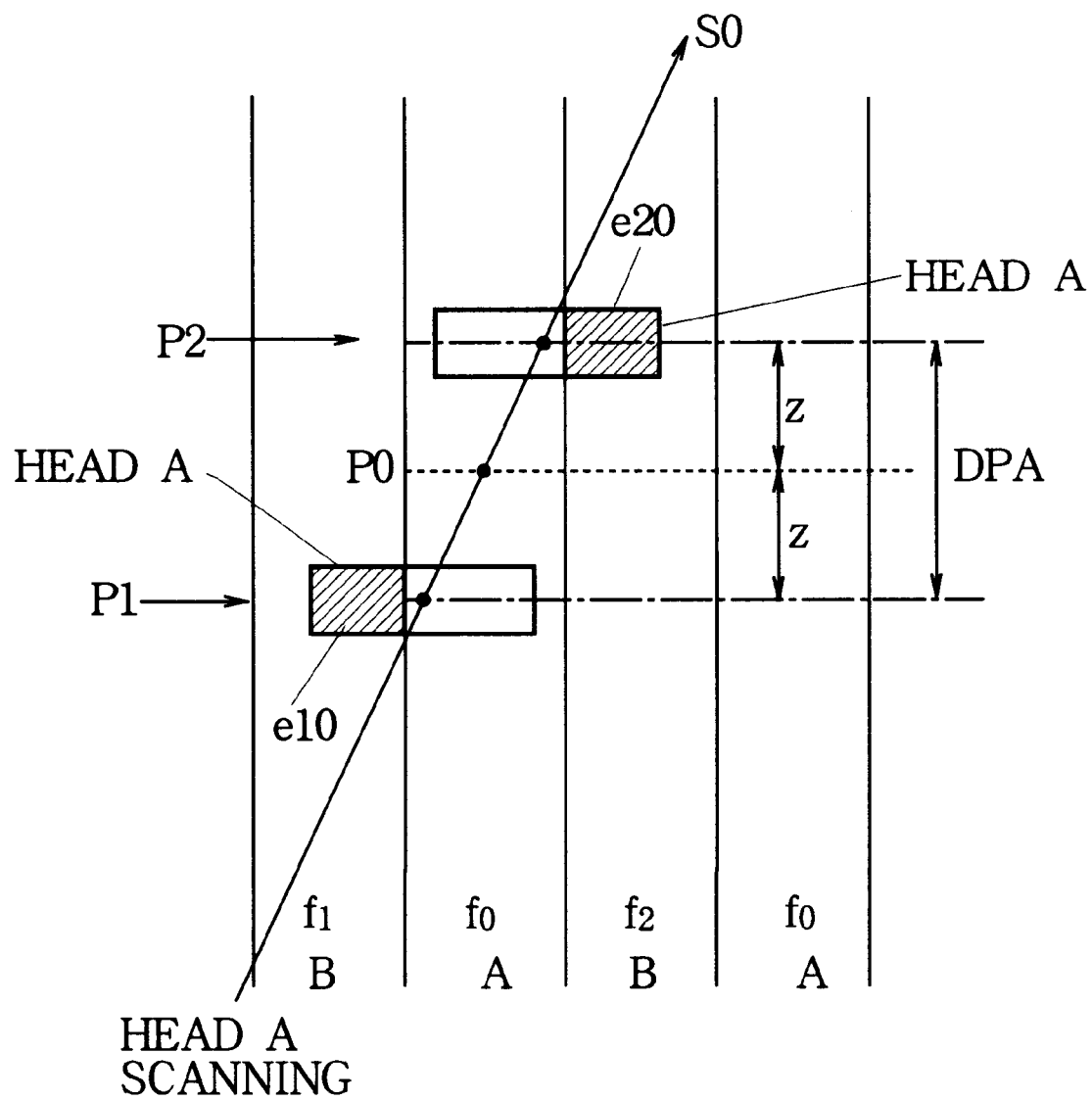
FIG. 44 is a diagram for explaining track non-linearity and tracking error correction.
Figure 45:
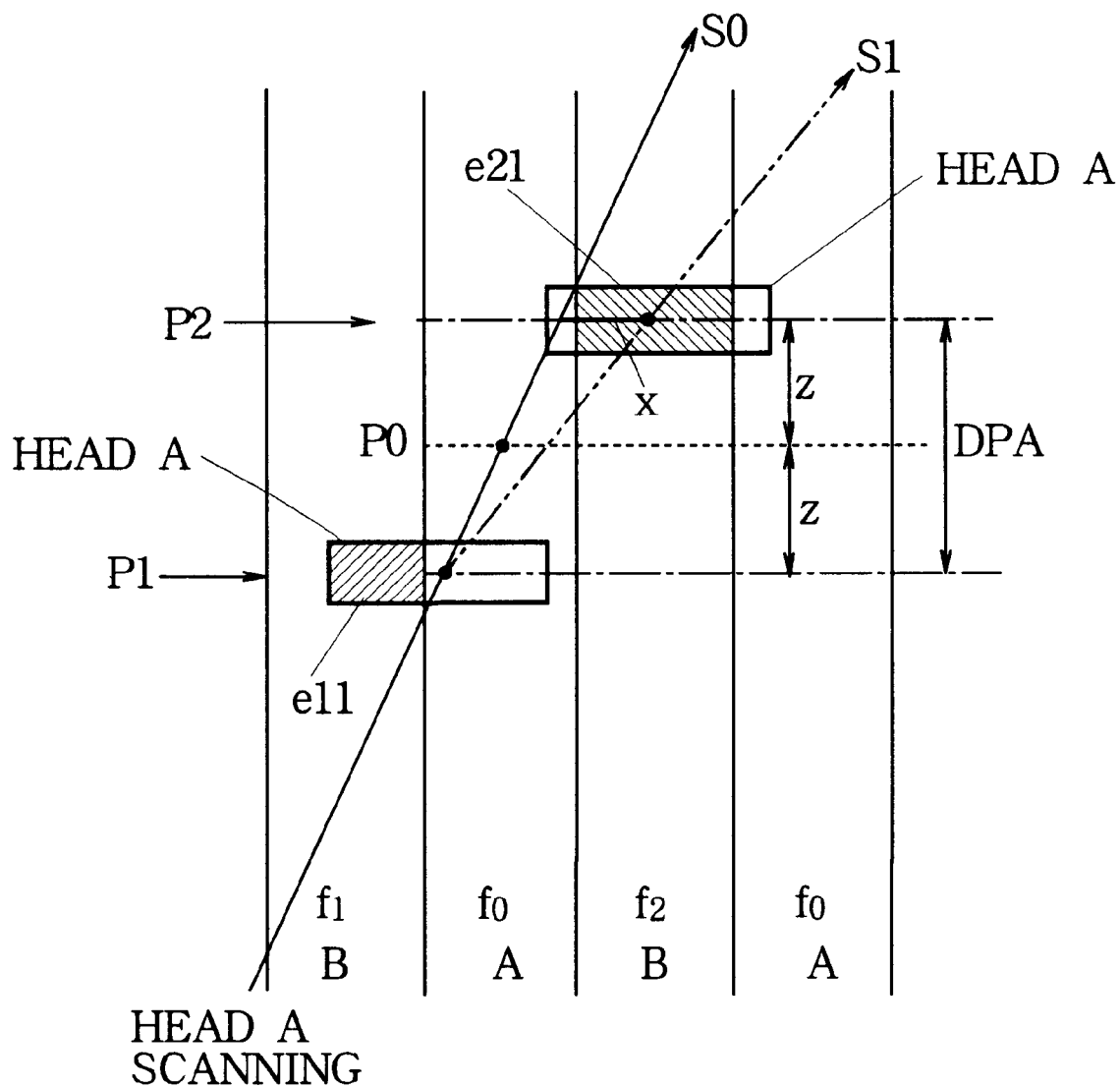
FIG. 45 is a diagram for explaining track non-linearity and tracking error correction.
Figure 46:
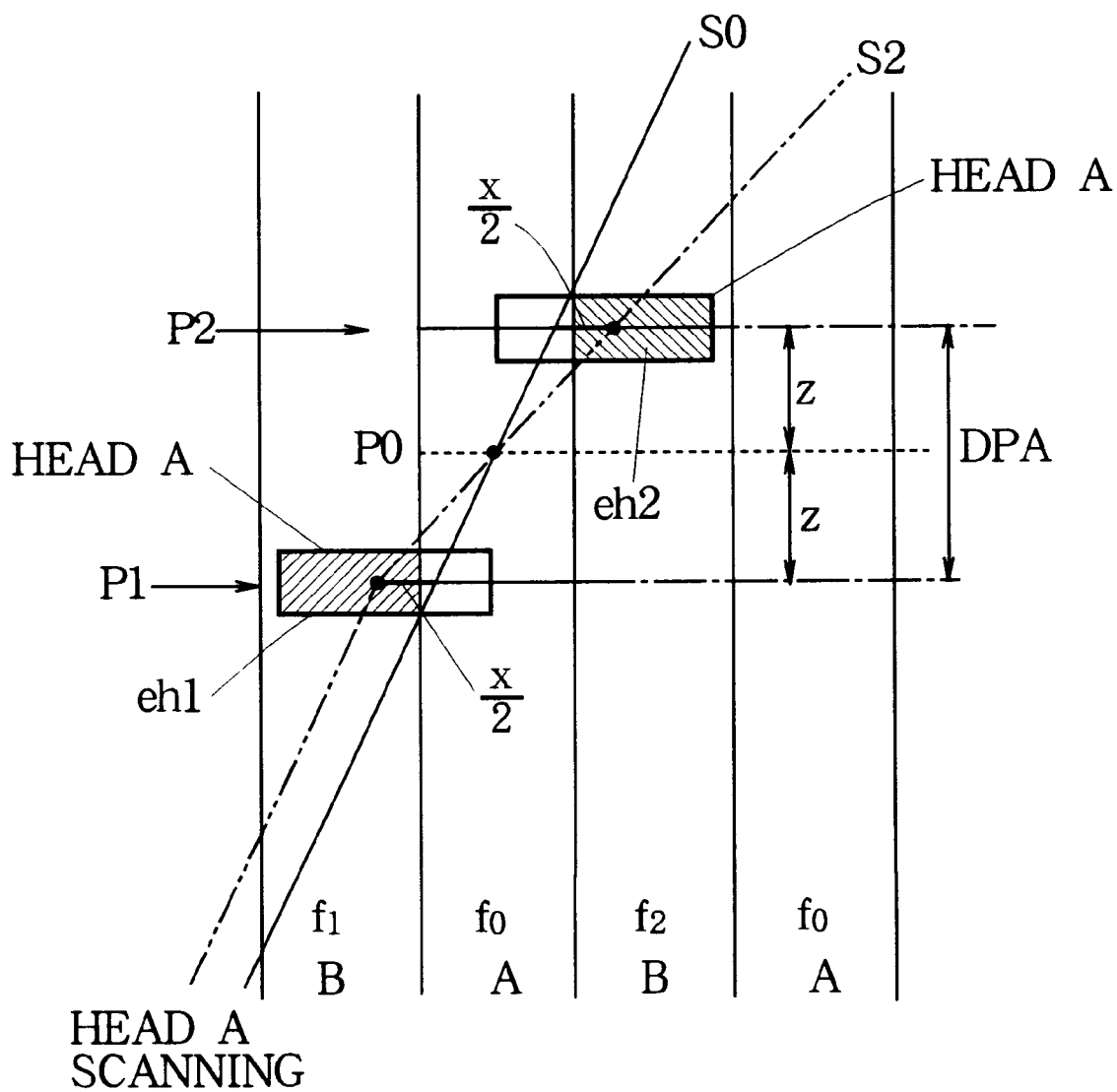
FIG. 46 is a diagram for explaining track non-linearity and tracking error correction.

FIGS. 44 to 46 are diagrams for explaining track non-linearity and tracking error correction. FIG. 44 shows tracking control where there is no track non-linearity, and the value of e10 at P1 and the value of e20 at P2 are equal. When there is a deviation x at P2, f2 component e21 from the right track is larger than e11 at P1, as will be seen from FIG. 45, and (e11–e21) is detected as a value corresponding to x. Accordingly, for correction by x/2 at the respective points, on the basis of (e11–e21) as shown in FIG. 46, the control needs to be so made that f1 component eh1 at P1 and the f2 component eh2 at P2 from the left and right tracks are equal after the correction.

As was described, when the duplication area is set so that the track non-linearity is such that the absolute value of the tracking error x in one head scanning trace is not more than six, and the region for the target value of the tracking errors at two sampling points after the servo correction is not more than 3, the absolute value of the difference between the maximum and minimum values of the errors x at the respective sampling points is not more than six, and, according to the above method, the tracking errors are within ±3 as (x/2 =6/2=3), and it is possible to obtain fast playback data from the duplication region without fail.

Figure 47:
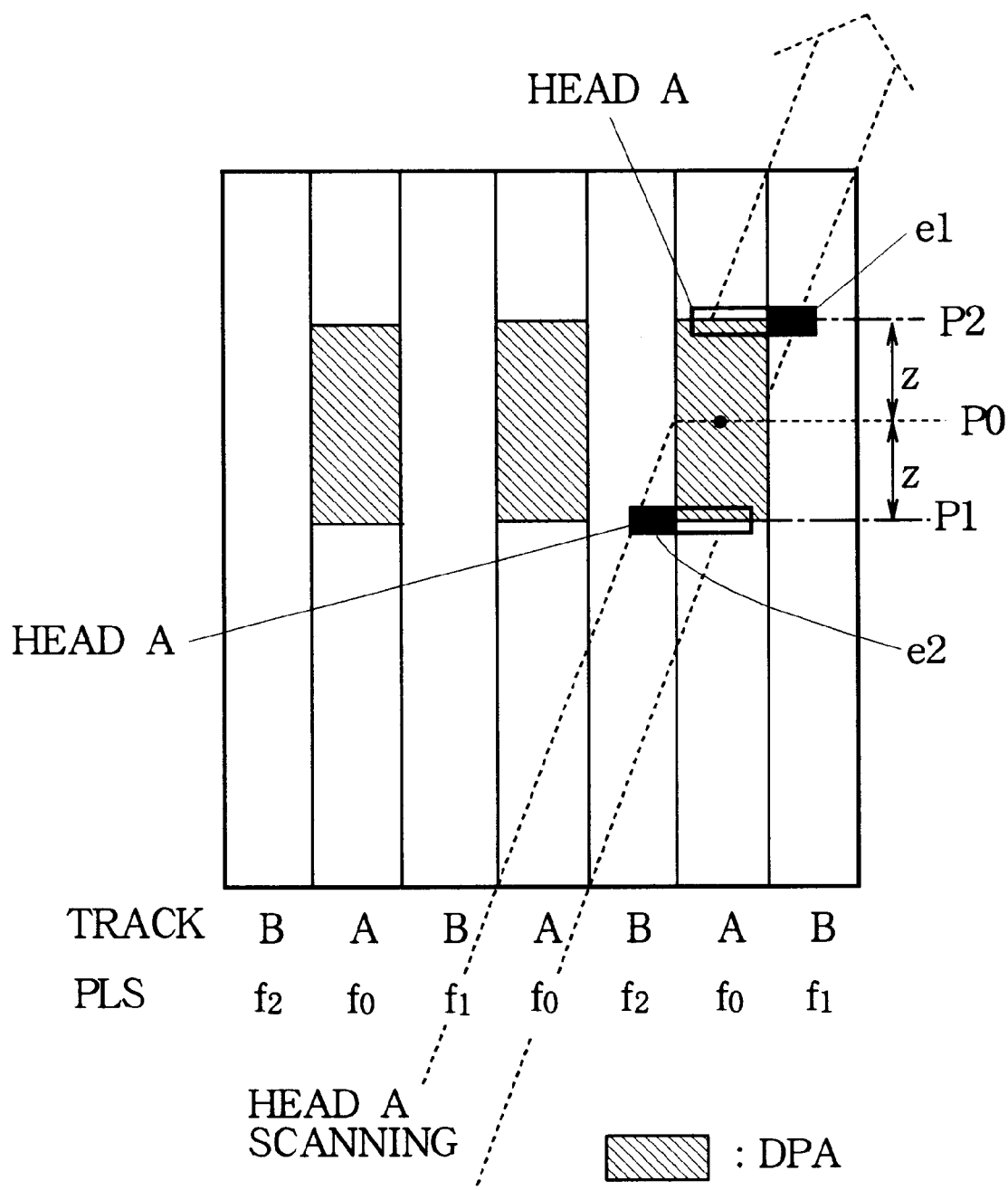
FIG. 47 shows another example of the disposition of the duplication areas for four-time speed fast playback, head trace positions, and sampling points.

FIG. 47 shows another example of disposition of the duplication area, the head trace, and sampling points for four-time speed playback. In the case of FIG. 42, f1 is recorded on the track to the left of the track A in which the duplication area from which reproduction is effected is recorded, and f2 is recorded on the right track. However, there is a situation in which, as shown in FIG. 47, f2 is recorded on the track to the left of the track A in which the duplication area from which reproduction is effected is recorded, and f1 is recorded on the right track. In this case, f2 component e2 at sampling point P1 and f1 component e1 at P2 are compared, and the tracking control is performed so that e1 and e2 are equal.

Figure 48:
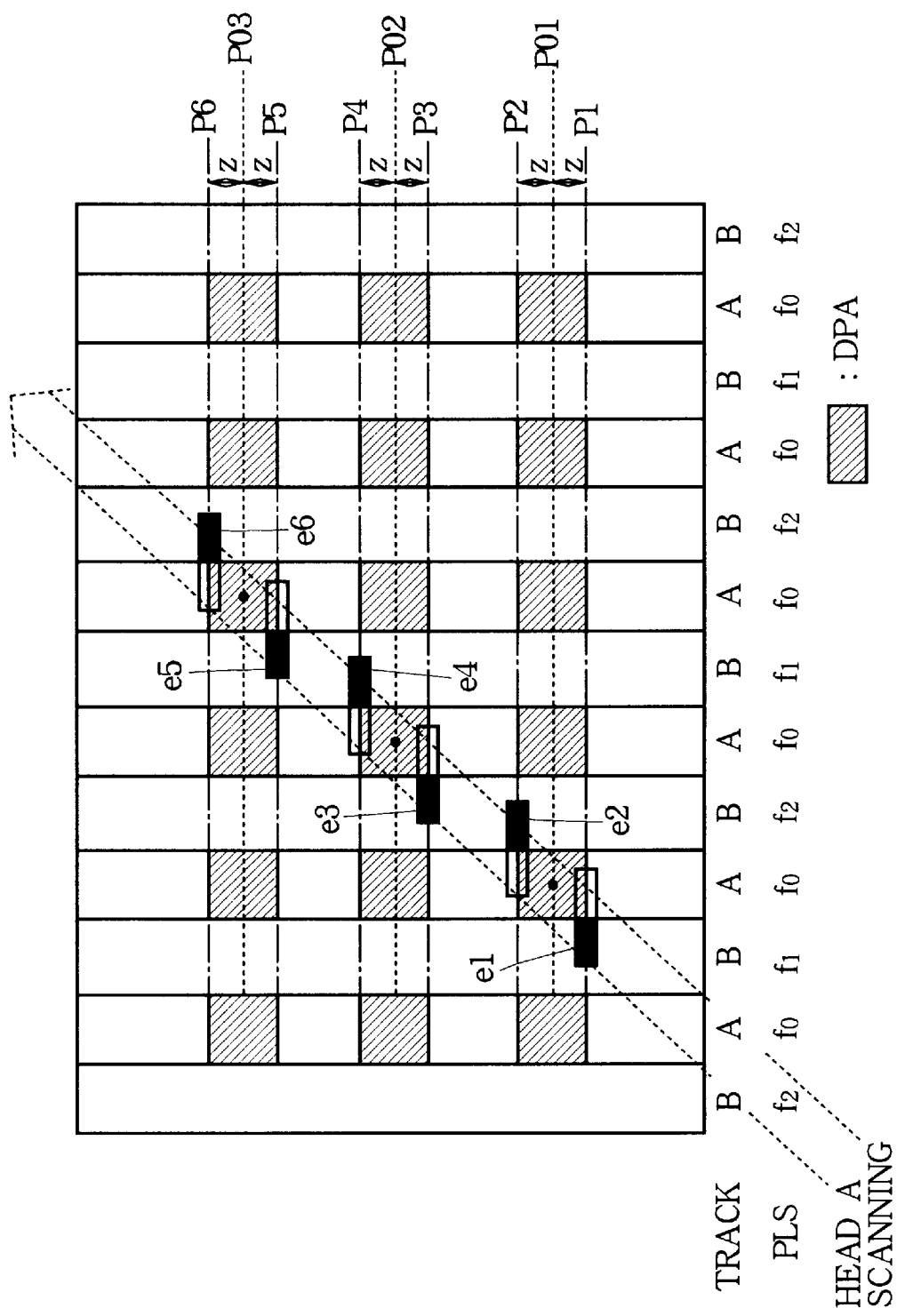
FIG. 48 shows an example of head trace positions and sampling points for the case where a plurality of duplication areas are disposed.

FIG. 48 shows an example of head trace and sampling points where a plurality of duplication areas are disposed. Where duplication areas are disposed at a plurality of locations on a track as illustrated, cross-talk components of the pilot signals from adjacent tracks at two sampling points at a distance z (z being not more than the playback burst length of the head A) from an intersection of the center of the head A with the track A in each region, and the tracking control is performed so that the pilot signal components from the adjacent tracks at the respective points are equal. For instance, if duplication areas are disposed at three locations as shown in FIG. 48, and a nine-time speed playback is to be effected, the pilot signal cross-talk components from adjacent tracks are detected at sampling points P1 to P6 at a distance z (z being not more than the playback burst length of the head A) from intersections P01, P02 and P03 of the centers of the head A with the centers of the respective tracks A in the respective duplication areas, and the pilot signal cross-talk components from tracks adjacent to the respective tracks are compared, and the tracking control is performed such that they are on average equal. The sampling pulses used at the sample-hold circuits 23 and 24 are as shown in FIG. 39.

As has been described, fast playback from a magnetic tape is effected by extracting first and second pilot signal components due to cross-talk from tracks adjacent to each track at two points at a distance z (which is not more than the playback burst length of the head) from an intersection of the center of the track with the center, and performing tracking control on the basis of the tracking error detected by comparing the levels of the pilot signal components.

Accordingly, even when the largest amount of fast playback data is recorded, and there is a track non-linearity fast playback data can be reproduced without fail.

Embodiment 11

In the bitstream recording and playback device of Embodiment 9 and Embodiment 10, the tracking control is performed so that the pilot signal components are equal by detecting the errors at two points of duplication area at which the pilot signal components should be equal.

The bitstream recording and playback device described next compares the pilot signal components from the left and right adjacent tracks, when tracing f0 track using of a head B having recorded fast playback data on tracks f1 or f2, and performing tracking control so that the pilot signal components are equal.

Figure 49:
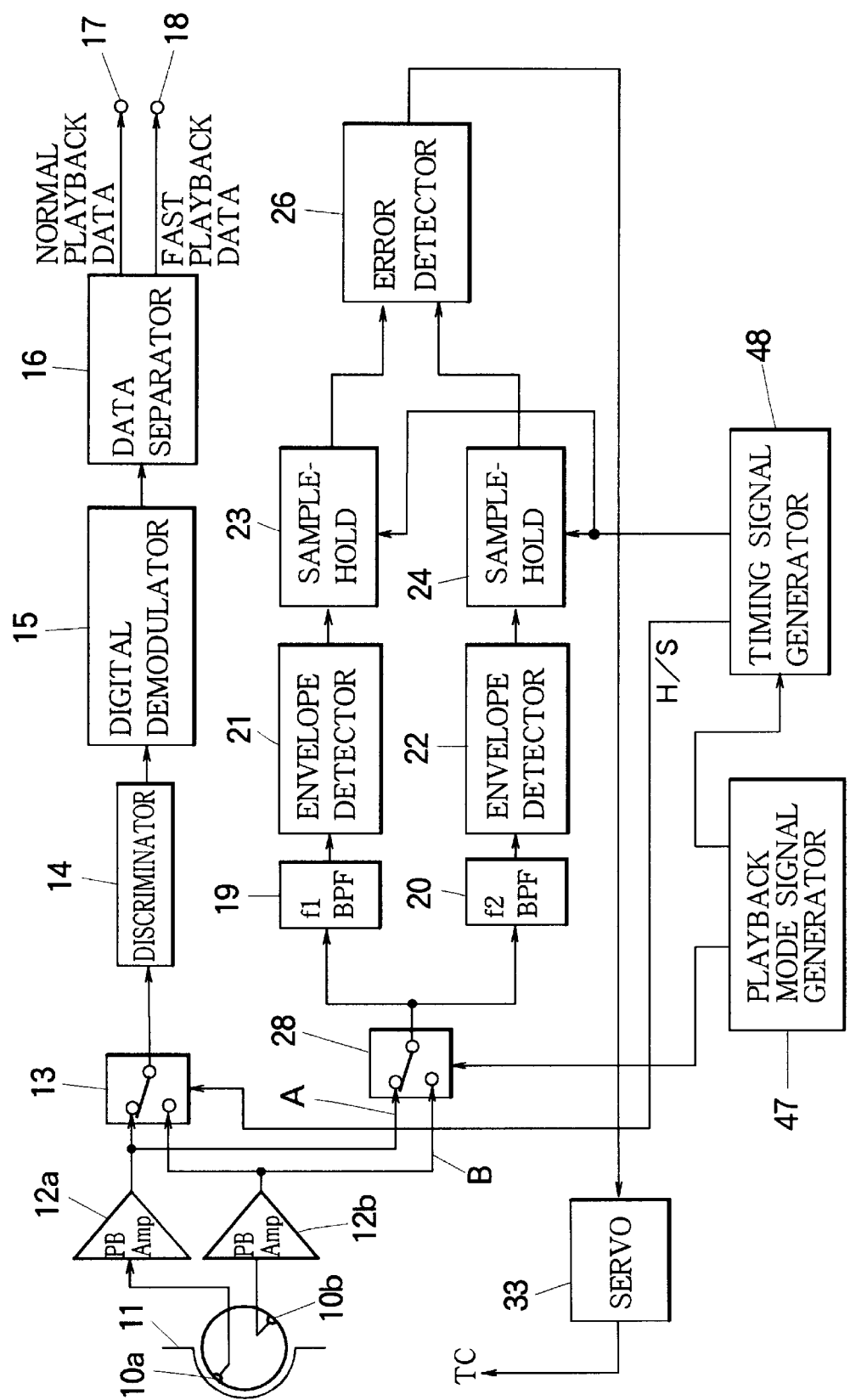
FIG. 49 is a block diagram showing the configuration of the playback section of the bitstream recording and playback device in Embodiment 11.

FIG. 49 is a block diagram showing the configuration of the playback section of the bitstream recording and playback device of Embodiment 11. In the configuration of FIG. 49, reference numerals 10 to 24 and 26 denote members identical to those in the prior art bitstream recording and playback device described with reference to FIG. 69. Reference numeral 28 denotes a switch for selection of the playback signal between the heads 10a and 10b. Reference numeral 33 denotes a servo circuit for performing tracking control on the basis of the signal from the error detector 26. Reference numeral 47 denotes a playback mode signal generator for generating a signal indicating the playback mode, and 48 denotes a timing signal generator for generating a head selection signal, signals indicating the sampling points for error signal detection for the purpose of tracking control, and other timing signals.

The operation of the above-described bitstream recording and playback device will next be described. It is assumed that the fast playback performed is a four-time speed playback. If phase-locked control is achieved, the head scanning is in synchronism with the same azimuth tracks.

Figure 50A:
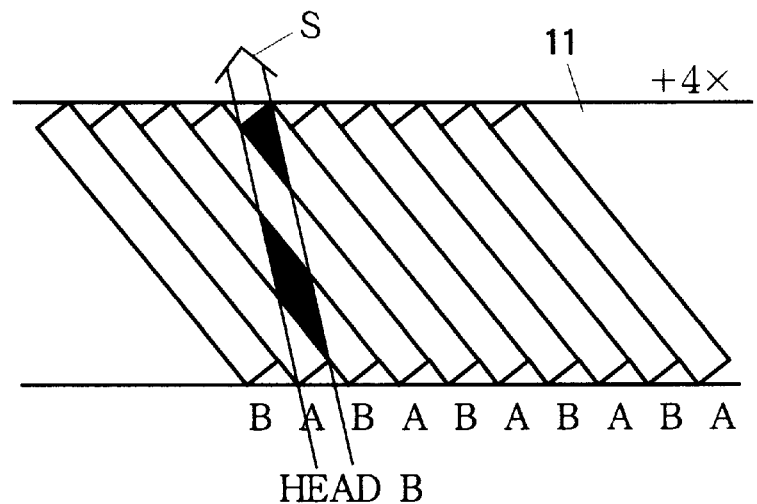
FIG. 50A is a diagram showing the position of the head trace by the head B on the track on the tape during four-time speed playback.
Figure 50B:
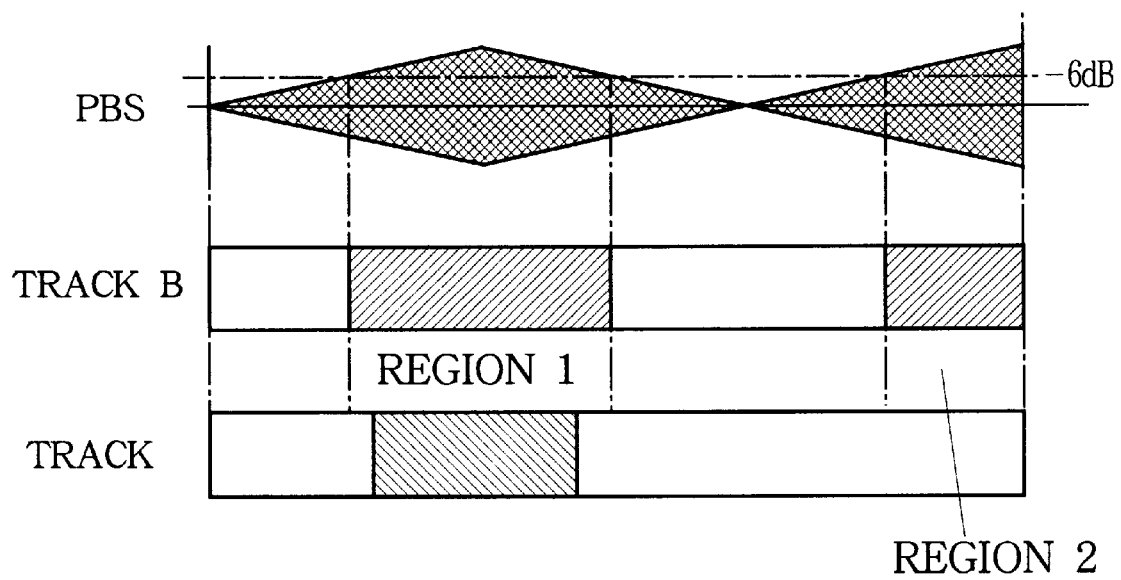
FIG. 50B is a diagram showing an example of playback regions.
Figure 51:
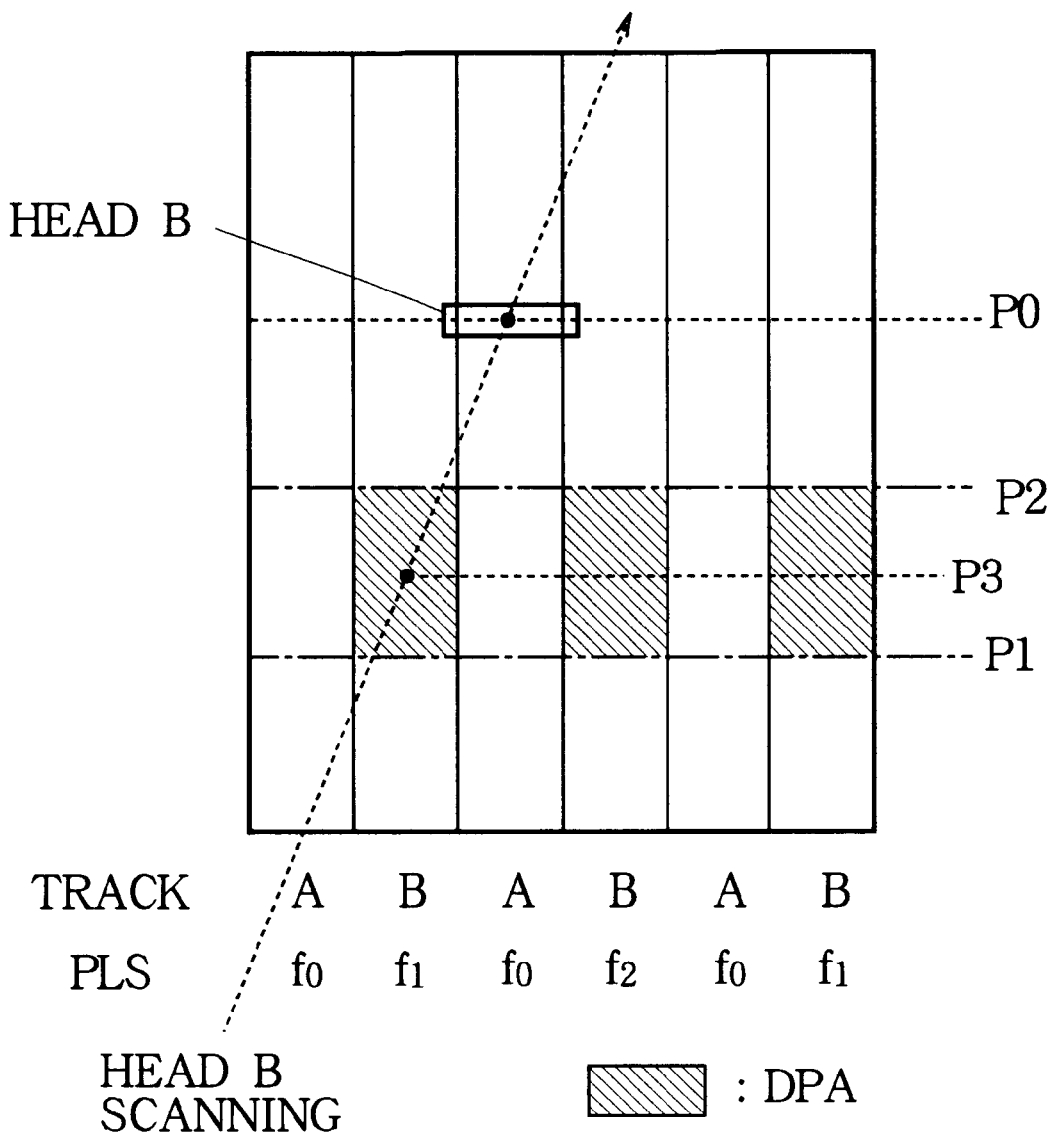
FIG. 51 shows the disposition of the duplication areas for four-time speed fast playback, head trace positions, and sampling points.

FIG. 50A shows the position of the head trace of the head B on tracks on a tape during four-time speed playback. FIG. 50B shows an example of playback regions. Description is made for the case where the head trace is by the head B. The duplication areas can be disposed in the region 1 or 2 from which reproduction is possible. If the duplication area is disposed in the region 1, the duplication area is positioned, on the tracks, in the area from P1 to P2 on each B azimuth track on which pilot signal is recorded, as shown in FIG. 51, and fast playback data is reproduced from these areas during fast playback.

During normal playback, the heads 10a and 10b read playback signals from the respective tracks on the tape 11, and the playback amplifiers 12a and 12b amplify the signals, and the switch 13 makes selection between the signals in accordance with the head selection signal from the timing signal generator 48 to produce a playback signal. The discriminator 14 discriminates the playback signal, and the digital demodulator 15 performs digital demodulation to restore the original bitstream. The data separator separates the bitstream into bitstream recorded in the main areas and the HP data in the duplication areas. The data of the main areas is supplied as normal playback data to the output terminal 17, while the data of the duplication areas is supplied as fast playback data to the output terminal 18. They are supplied to an MPEG2 decoder outside of the digital VTR. During normal playback, the HP data is discarded. The outputs of the playback amplifiers 12a and 12b are also supplied to the switch 28, which is controlled by the playback mode signal from the playback mode signal generator 47 to select the playback signal of the head A from the playback amplifier 12a during normal playback, and the playback signal of the head B from the playback amplifier 12b during fast playback. The output of the switch 28 is supplied to bandpass filters 19 and 20.

During normal playback, the playback signal of the track A is selected by the switch 28, and input to the bandpass filters 19 and 20, and f1 and f2 components e1 and e2 which are cross-talk components from the left and right tracks B are extracted, and detected by the envelope detectors 23 and 24, and supplied to the sample-hold circuits 23 and 24, which sample and hold the f1 and f2 components e1 and e2 in accordance with the sampling pulses from the timing signal generator 48. The sample-held values e1 and e2 at the sampling points are supplied to the error detector 26, which detects the difference (e1–e2) of the cross-talk components f1 and f2, and supplies the detected difference to the servo circuit 33. The servo circuit 33 performs tracking control on the basis of the detected difference. During normal playback, as in the prior art, the sampling pulses for the sample-hold are assumed to have sampling points at the ITI area positioned at the lower end of the track as shown in FIG. 70. Then, the f1 and f2 pilot signal components which are cross-talk components from the adjacent tracks at the sampling points are extracted from the playback signal of the head A tracing the track A of f0 are sampled and the difference between the extracted components of f1 and f2 is detected, and the tracking control is performed such that the difference is zero.

The operation during fast playback will next be described. During fast playback, the playback signals from the heads 10a and 10b are amplified by the playback amplifiers 12a and 12b, selected by the switch 13, discriminated by the discriminator detector 14, and digitally modulated by the digital demodulator 15. The demodulated signal is separated by the data separator 16, and the HP data of the duplication areas output to the output terminal 18 is collected and supplied to the decoder, while the bitstream of the main areas is discarded. The outputs of the playback amplifiers 12a and 12b are also supplied to the switch 28, where the playback signal from the head 10b is selected in accordance with the signal indicating the fast playback mode from the playback mode signal generator 47, and the selected playback signal is supplied to the bandpass filters 19 and 20, where pilot signal f1 and f2 components are extracted. The extracted f1 and f2 components are detected at the envelope detectors 21 and 22, and sampled-held at the sample-hold circuits 23 and 24 in accordance with the sampling pulses from the timing signal generator 48. The sample-held values are supplied to the error detector 26.

FIG. 51 shows the disposition of the duplication areas, the head trace and the sampling points during four-time speed playback. The sampling pulses supplied from the timing signal generator 48 to the sample-hole circuits 23 and 24 are generated on the basis of the head selection signal and the like. In FIG. 51, the position of the sampling point P0 during the scanning of the tape 11 by the head B is determined.

Figure 52:
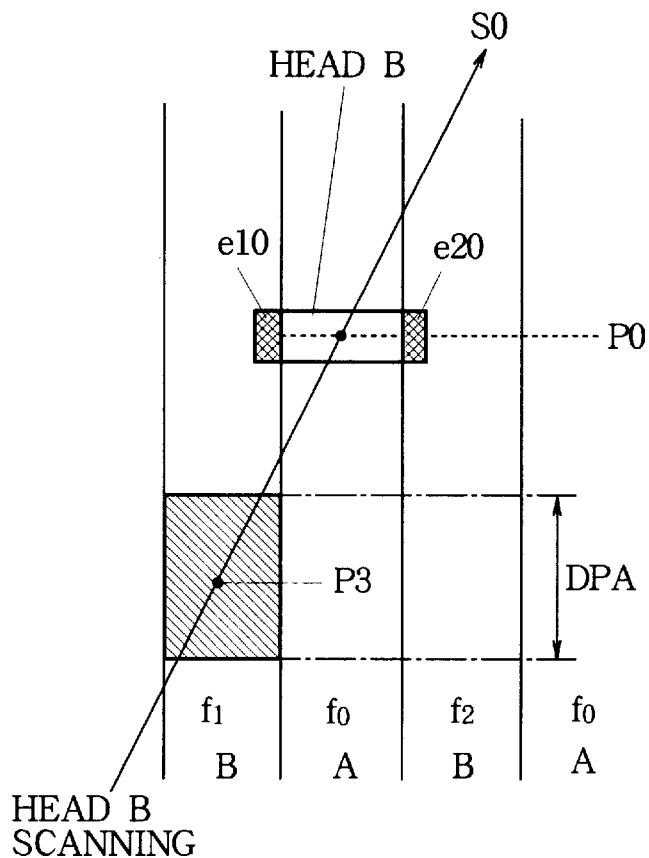
FIG. 52 shows the position of the sampling points for tracking error detection during fast playback, and the position of the center of the head B.

FIG. 52 shows the position of the sampling points for tracking error detecting and the position of the center of the head B during fast playback. The position of the sampling point P0 is at the intersection of the center of the track A with the scanning trace of the head B shown by arrow S0. Pilot signal f1 and f2 components from the tracks B adjacent to and to the left and right of the head B are detected at this position of P0. The servo circuit 33 performs tracking control such that the extracted pilot signal components e1 and e2 are equal. That is, the error detector 26 determines the difference (e1–e2). If the head B scanning is as indicated by the arrow S0, and there is no tracking error, the value of the error signal at the sampling point P0 is zero, and the error (e1–e2) depending on the direction and the amount of deviation of the head B in the left and right directions is detected by the error detector 26.

Figure 53A:
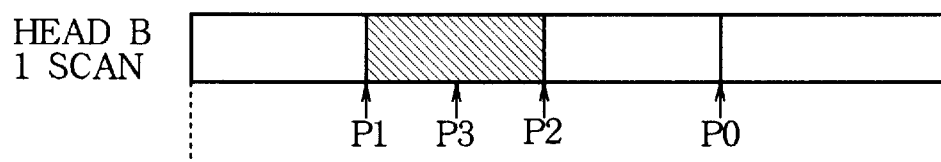
FIG. 53A and FIG. 53B show an example of sampling pulses for tracking error signal detection during fast playback.
Figure 53B:
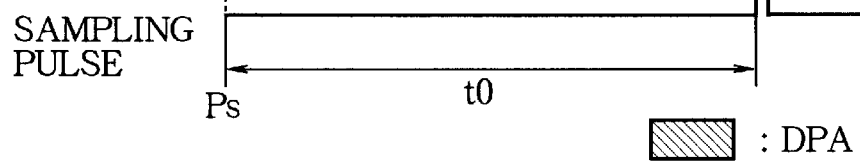

FIG. 53A and FIG. 53B show an example of sampling pulses for tracking error detection during fast playback. FIG. 53A shows the positions of the duplication area disposed in one head B scan and the sampling point P0. FIG. 53B shows the sampling pulses supplied from the timing signal generator 48 to the sample-hold circuits 23 and 24. The sampling pulse generator 48 generates a sampling pulse on the basis of the predicted time t0 up to the head reaching the position of the sampling point P0, taking the starting point Ps of the head B scan as a reference, on the basis of the head selection signal, for example, and supplies the sampling pulses to the sample-hold circuits 23 and 24.

Figure 54A:
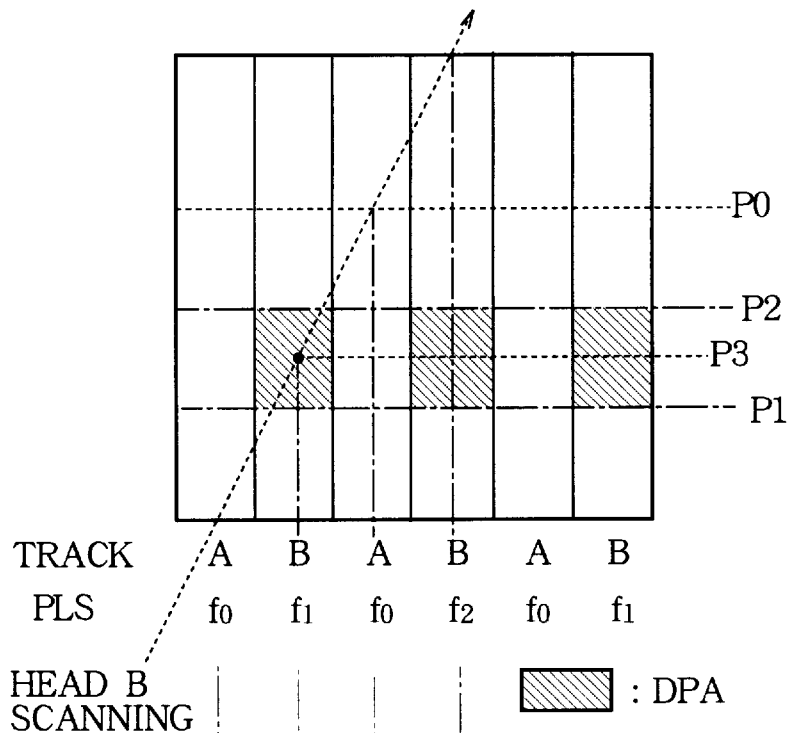
FIG. 54A to FIG. 54D are diagrams for explaining the level of the pilot signals extracted during fast playback.
Figure 54B:
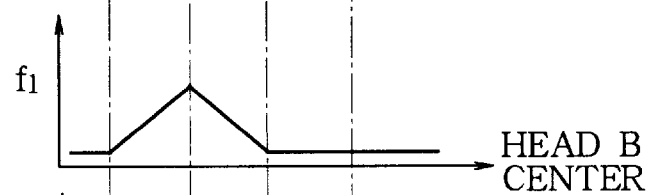
Figure 54C:
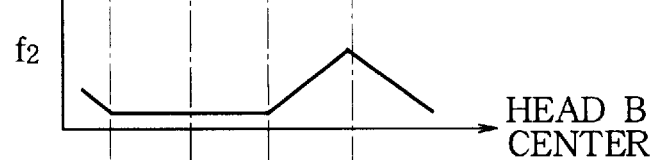
Figure 54D:
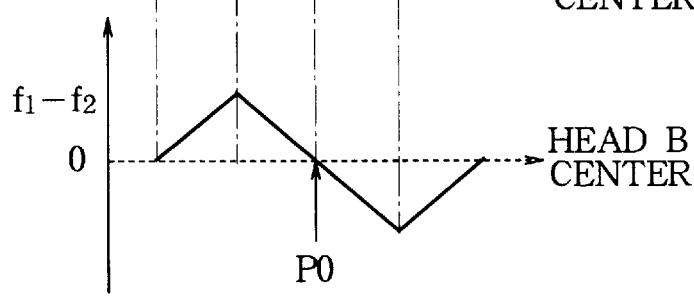

FIG. 54A to FIG. 54D show the levels of the extracted pilot signals during fast playback. When four-time speed playback is conducted as shown in FIG. 54A, the pilot signal f1 and f2 components from the envelope detector 21 and 22 are as shown in FIG. 54B and FIG. 54C, and the sample-hold circuits 23 and 24 sample and hold the values of the pilot signal f1 and f2 components detected by the head B and extracted at the sampling points P0. The values of the f1 and f2 components at the sampling points P0 are supplied to the error detector, where (e1–e2) is calculated. The value of this error signal is supplied as a correction signal for servo tracking to the servo circuit 33. FIG. 54D shows the value of the error signal (e1–e2) at the sampling points P0 detected by the error detector 26. The servo circuit 33 performs the tracking control on the basis of the value of the error signal (e1–e2) such that (e1–e2) becomes zero.

Figure 55:
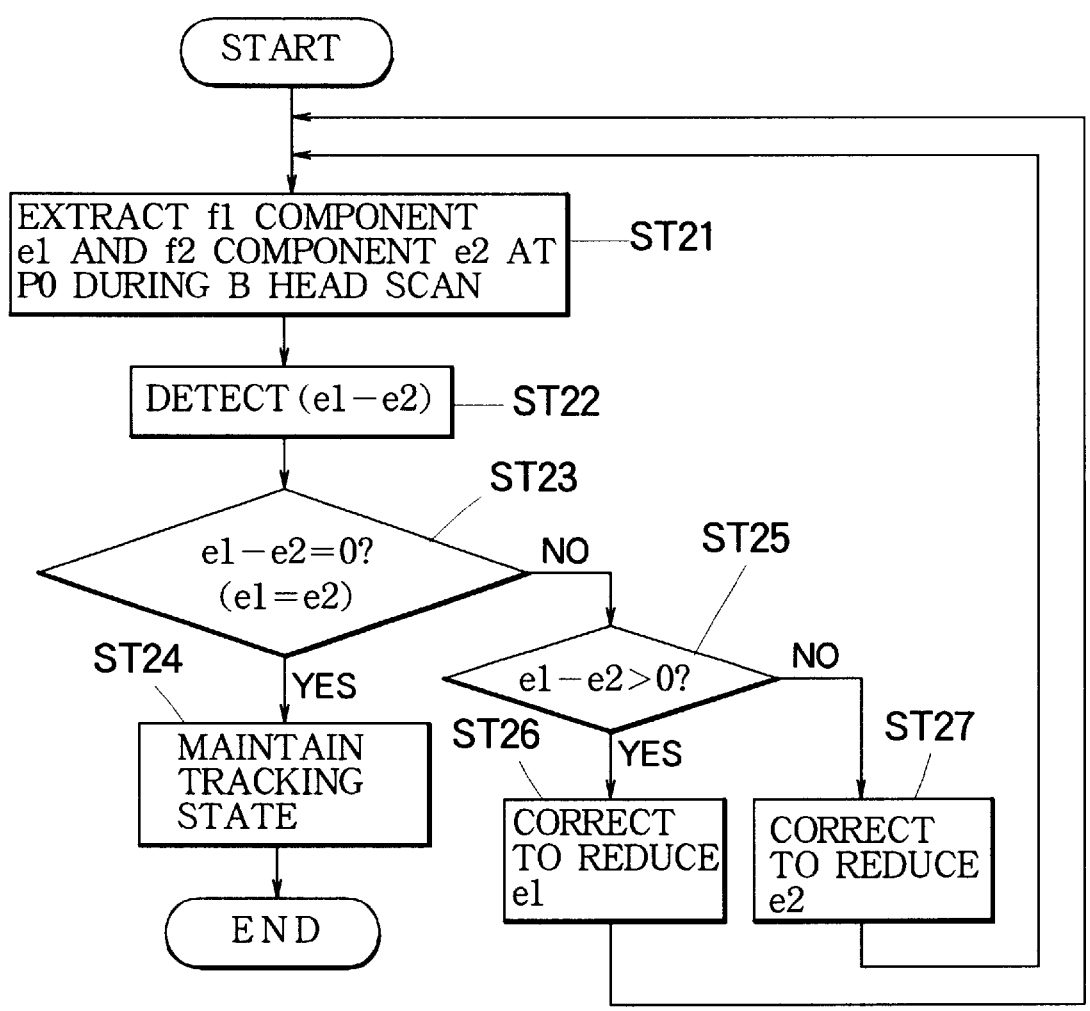
FIG. 55 is a flowchart for explaining the tracking control operation during fast playback.

FIG. 55 is a flowchart showing the tracking control during fast playback. The tracking control is performed such that the values of e1 and e2 are equal, i.e., (e1–e2) is zero, on the basis of the f1 and f2 components e1 and e2 detected by the head B from the adjacent tracks B at the intersection P0 of the center of the head B with the center of the track A. At step ST21, f1 and f2 components e1 and e2 at the sampling points P0 are extracted by the sample-hold circuits 23 and 24. At step ST22, the f1 and f2 components e1 and e2 are supplied to the error detector 26, where the difference (e1–e2) is detected, and this value is supplied to the servo circuit 33. At step ST23, judgement as to whether (e1–e2) equals 0 is made. If (e1–e2)=0, the next step is the step ST24, where the tracking state is maintained. If (e1–e2) is not equal to zero, the next step is the step ST25, where judgment is made as to whether (e1–e2) is positive or negative. When (e1–e2)>0, the next step is the step ST26, and otherwise the next step is the step ST27. At step ST26 or ST27, the tracking position is corrected in such a direction that the f1 component e1 or f2 component e2 will reduced. After this, the (e1–e2) is again detected. In this way, the servo circuit 33 performs tracking control such that (e1–e2)= 0.

Figure 56:
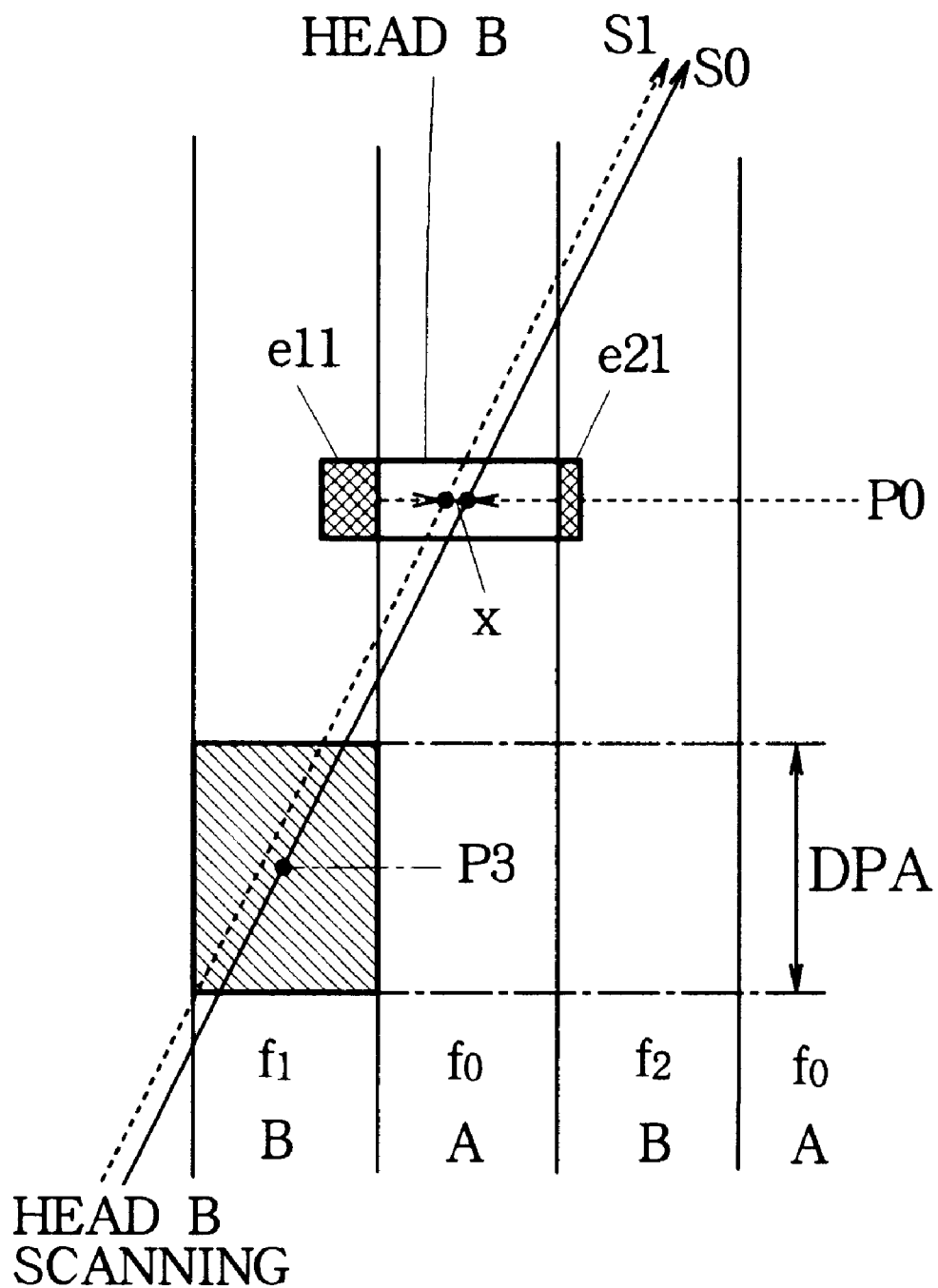
FIG. 56 shows the position of the head B for the case where there is a track non-linearity.

FIG. 56 shows the position of the head where there is a tracking error. If the head trace which should ideally be as indicated by S0 is deviated as indicated by broken line S1, then an error x is produced at the sampling point P0. That is, if there is an error x toward the left track B, f1 component e11 becomes larger than the f2 component e12, so that (e11–e21) is detected as a value corresponding to the deviation x. Accordingly, (e11–e21)>0, and the tracking is corrected so as to reduce e11. Tracking is so controlled that, after this correction, e11 from the track B in which f1 is recorded and e21 from the track B in which the f2 is recorded are equal.

Figure 57:
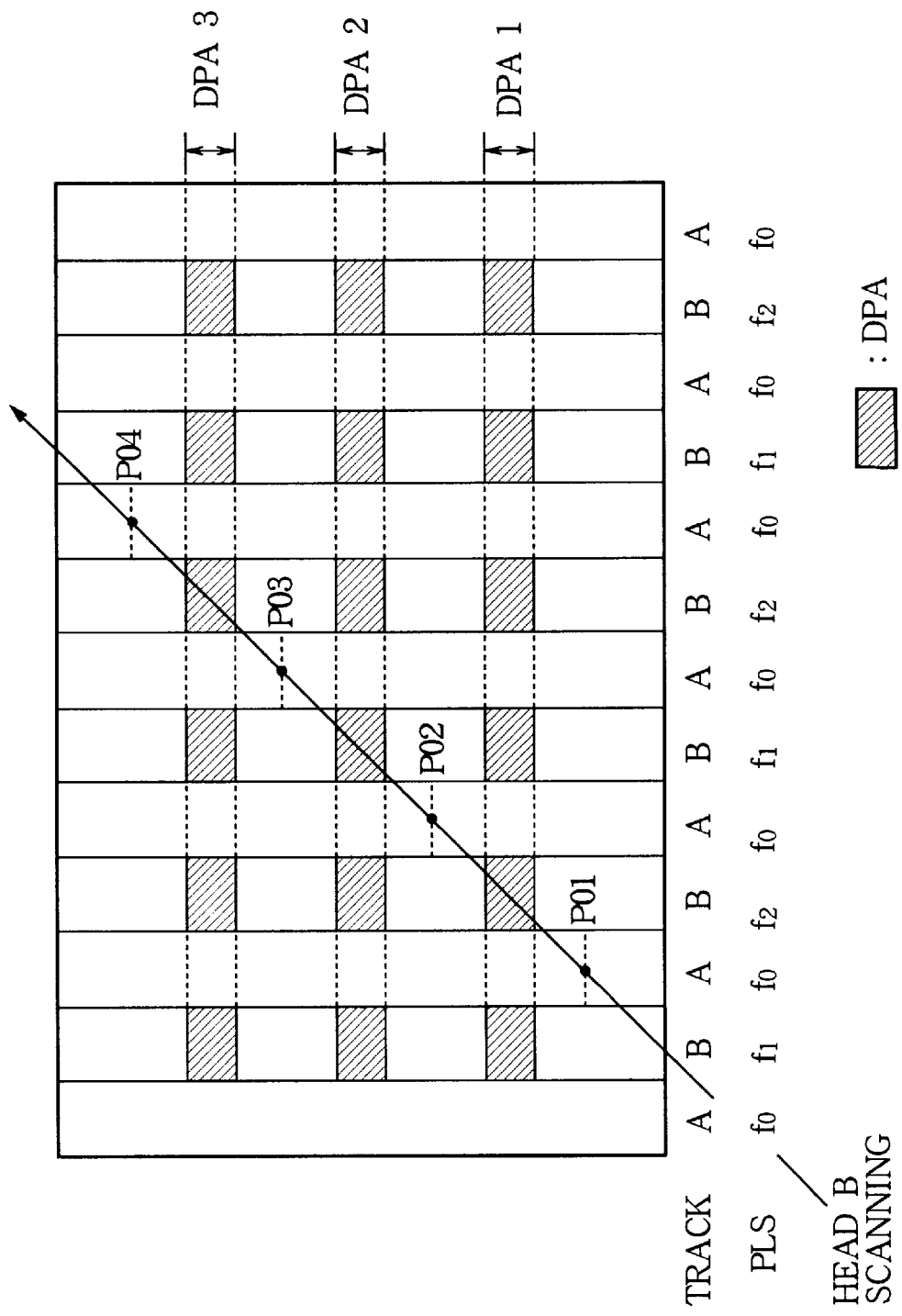
FIG. 57 shows an example of head trace positions and sampling points for the case where a plurality of duplication areas are disposed.

FIG. 57 shows an example of head trace and sampling points where a plurality of duplication areas are disposed. As illustrated, where duplication areas are disposed at a plurality of locations on the tracks, and used for fast playback, pilot signal components are extracted from the adjacent tracks, at the intersections P01, P02, P03 and P04 of the center of the scanning head B with the center of the track A, and the error signals are detected from the pilot signal components at the respective points, and used for tracking control. Let us assume, for instance, that duplication areas are disposed at three locations, and a nine-time speed playback is conducted. Pilot signal components are extracted at the intersections P01, P02, P03 and P04 of the center of the head B with the centers of the tracks A during one trace, from adjacent tracks B, and the pilot signal components e1 and e2 are compared, and the error signal (e1–e2) is detected, and the tracking control is performed on the basis of the average over one trace of the error signals.

Where the fast playback data is disposed only in the duplication areas 2 in FIG. 57, the pilot signal components from the adjacent B tracks are extracted at the two intersections P02 and P03 of the center of the scanning head B with the center of the track A, and the pilot signal components e1 and e2 are compared to detect the error signal (e1–e2), and the values of the error signals on the respective points are averaged, and the tracking control is effected using the average over one trace. In this way, the tracking control can be performed such that the duplication area 2 is traced with a higher accuracy.

In the manner described above, during fast playback from a magnetic tape, pilot signal components recorded on the tracks adjacent to the track recorded by the head A are extracted, at the intersection of the center of the head B of the same azimuth as the track in which the duplication area is disposed, with the center of the track recorded by the head A having a different azimuth from the head B, and tracking error is detected, and the tracking control is performed on the basis of the error. Accordingly, it is possible to extract pilot signal by means of a head B on a track having an azimuth deferent from the head B, and to use the extracted pilot signal for the tracking control, in the fast playback. Moreover, it is possible to achieve tracking control such that the fast playback signal can be obtained without fail, from a magnetic tape in which the largest amount of fast playback data is recorded in the duplication areas.

Embodiment 12

In Embodiment 11, the signal indicating the sampling points for the sample-hold is generated using, as a reference, the signal indicating the start of scanning of the head B such as the head selection signal. The arrangement for performing fast playback may be such as to detect a predefined position from the data which is traced during scanning by the head and reproduced, generate a signal indicating the predefined position, and use this signal as a reference to generate sampling pulses indicating the sampling points.

Figure 58:
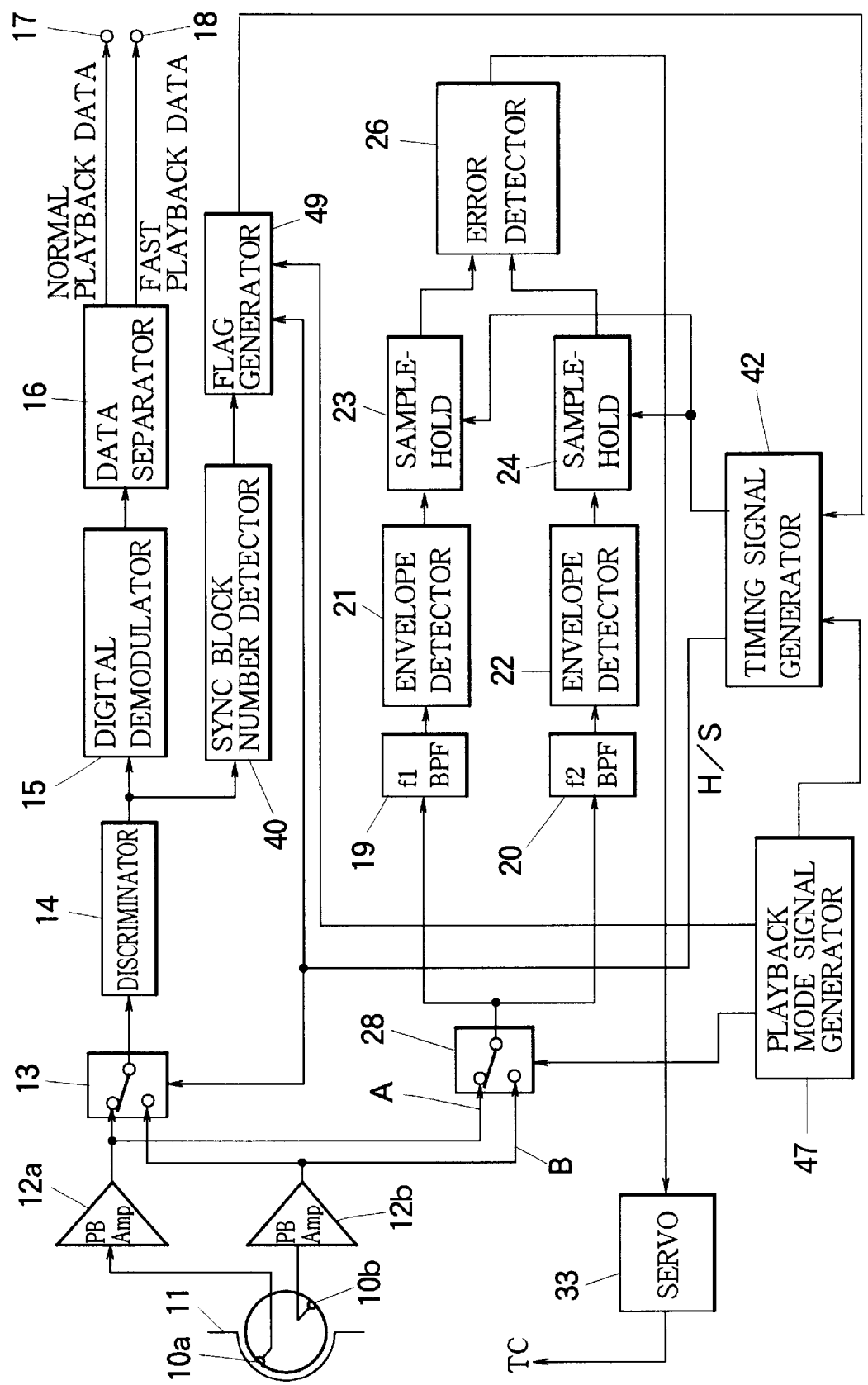
FIG. 58 is a block diagram showing the configuration of the playback section of the bitstream recording and playback device in Embodiment 12.

FIG. 58 is a block diagram showing the configuration of the playback section of the bitstream recording and playback device in Embodiment 12. In FIG. 58, reference numeral 10 to 24, 26, 28, 33 and 47 denote members identical to those of Embodiment 11. Reference numeral 40 denotes a sync block number detector, 42 denotes a timing signal generator, and 49 denotes a flag generator. The sync block number detector 40 detects the sync block number of the signal from the signal output from the discriminator 14. The timing signal generator 42 uses, as a reference point, the head selection signal or the flag signal from the flag generator 49 indicating a predefined position, to generate a signal indicating the sampling points for the error signal detection for the purpose of tracking control. The flag generator 49 generates a flag signal indicating the predefined position on the basis of the signal from the sync block number generator 40 indicating the sync block number.

The operation during normal playback, and the operation during fast playback up to the data separator 16, and the operation for extracting the pilot signals at the sampling point P0, and detecting the tracking error by means of the error detector 26, and using the result of detection for tracking control are identical to those of Embodiment 11, so their description is omitted.

FIG. 59 shows an example of configuration of data of one sync block in a digital VTR. Generally, disposed after a sync code is an ID code indicating a sync block number or a track number. Accordingly, the sync block number detector 40 can detect the sync block number of the data being reproduced, from the ID code in the playback signal.

The sync block number detector 40 detects the code indicating the sync block number of the data being reproduced, from the playback data supplied from the discriminator 14, during normal playback and fast playback. During fast playback, when the head B is scanning, the sync block number in the fast playback data recorded on track B reproduced by the head lob is detected. The sync block number detected by the sync block number detector 40 is supplied to the flag generator 49.

FIG. 60A to FIG. 60C show sampling pulses for tracking error detection during fast playback. When the head B scans during fast playback, the flag generator 49 generates a flag signal indicating the position of the predefined sync block number on the basis of the sync block number of the data reproduced by the sync block number generator 40. For instance, when four-time speed playback is effected as shown in FIG. 51 in connection with Embodiment 11, during head B scanning, the fast playback data is reproduced from the duplication area disposed between P1 and P2, and the sync block number of the data is detected (FIG. 60A). When the sync block number positioned at the center (P3) of the duplication area is input, the flag generator 49 generates a flag signal Ps corresponding to the position of P3 as shown in FIG. 60B. The output of the flag generator 49 is supplied to the timing signal generator 42.

The timing signal generator 42 generates a sampling pulse (FIG. 60C) a predefined time t1 after the generation of the flag signal Ps. The time t1 corresponds to the scanning from the point at which the flag signal Ps is generated to the point P0 at which the tracking error signal is to be sampled. The sampling pulse is supplied to the sample-hold circuits 23 and 24. In accordance with the sampling pulse, the sample-hold circuits 23 and 24 sample and hold the f1 and f2 components at the sampling point P0 of the signals detected by the envelope detectors 21 and 22, and supply the values at the sampling point to the error detector 26. The error detector 26 detects the error signal, and the servo circuit 33 performs the tracking control.

In the above embodiment, the flag detector 49 generates a flag signal Ps at the position of P3 on the basis of the sync block number at the center of the duplication area that is reproduced, and the sampling pulse is generated therefrom. However, the sync block number used as a reference may be any other sync block number data which can be reproduced by the head B in the duplication area, and the flag signal can be generated from this flag signal. If the flag signal Ps used as a reference is at a position near the desired sampling point, a sampling pulse indicating the sampling point P0 more accurately can be obtained.

In the above embodiment, the sync block number detected from the data reproduced by the head B is used as a reference to detect a signal indicating the sampling point at an intersection P0 of the center of the head B with the center of the track f0 recorded by the head A of a different azimuth, for use in tracking control. However, where pilot signals are extracted by the head A in f0 track, it is possible to obtain a signal indicating the sampling point accurately, like the above embodiment by detecting the sync block number of the data reproduced by the head A, and generating a signal indicating the sampling point on the basis of this number.

As has been described, during fast playback from a magnetic tape, the predefined position of the duplication area is detected, a flag signal indicating the intersection of the center of the head B with the center of the track recorded by head A is generated, the pilot signal components recorded on the adjacent tracks is extracted at the point, the tracking error is detected from the pilot signal components, and the tracking control is performed on the basis of the tracking error. Accordingly, tracking can be controlled in such a manner that fast playback data can be obtained without fail from a magnetic tape on which the largest amount of fast playback data is recorded in the duplication areas. Moreover, the point P0 at which the pilot signals are extracted are determined using, as a reference, the position detected by the pilot signals reproduced by the tracing head, so that the pilot signal can be extracted with a higher accuracy, and the tracking can be controlled without fail.

Embodiment 13

An embodiment relating to extraction of pilot signals for error detection for the purpose of tracking during fast playback in a bitstream recording and playback device capable of fast playback will next be described.

Figure 61:
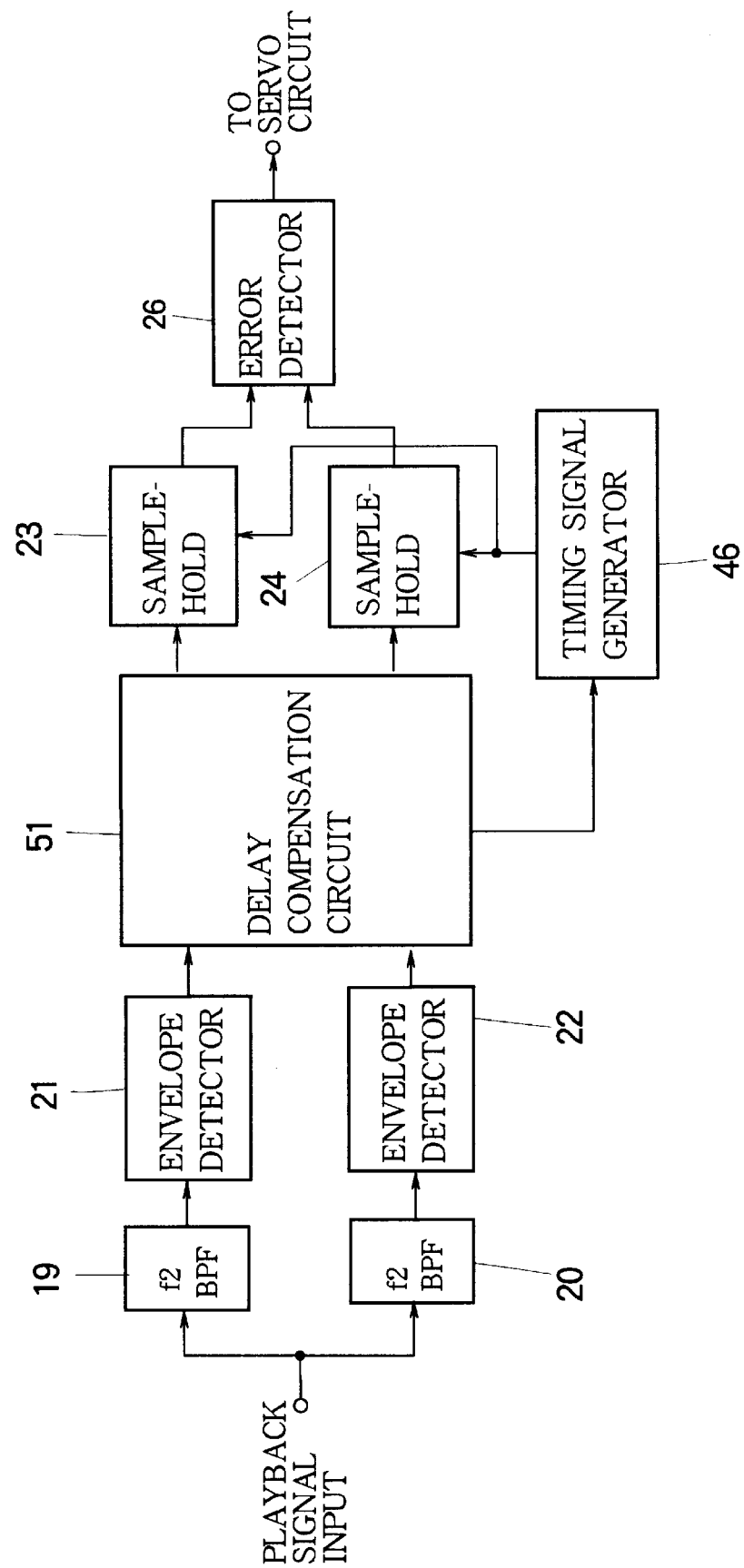
FIG. 61 is a block diagram showing the configuration of the error signal detector for tracking in the bitstream recording and playback device in Embodiment 13.

FIG. 61 is a block diagram showing the configuration of the error signal detecting section for the purpose of tracking in a bitstream recording and playback device in Embodiment 13. In FIG. 61, reference numerals 19 to 24, and 26 denote members identical to those of Embodiment 11 (FIG. 49). Reference numeral 46 denotes a timing signal generator for generating sampling pulses, and 51 denotes a delay compensation circuit for compensating the delay times of the pilot signals f1 and f2 extracted and envelope-detected.

It is assumed that four-time speed playback is effected, and extraction of pilot signal for tracking is performed in the same way as in Embodiment 11 and Embodiment 12, that is, f1 and f2 pilot signal components e1 and e2 reproduced by the head B from the tracks B are extracted at a sampling point at an intersection P0 of the center of the head B with the center of the f0 track (between the above-mentioned tracks B) recorded by a head A having a different azimuth, and the tracking control is performed so that (e1–e2) is zero.

When four-time speed playback by means of head B is effected is as shown in FIG. 54A, the playback signal from the head B that is tracing is input to the bandpass filters 19 and 20. The pilot signal f1 and f2 components e1 and e2 contained in the playback signal are extracted by and output from the bandpass filters 19 and 20, and detected by the envelope detectors 21 and 22. The envelope-detected f1 component as shown in FIG. 54B, output from the envelope detector 21 and envelope-detected f2 component as shown in FIG. 54C, output from the envelope detector 22 are supplied to the delay compensation circuit 51.

Figure 62A:
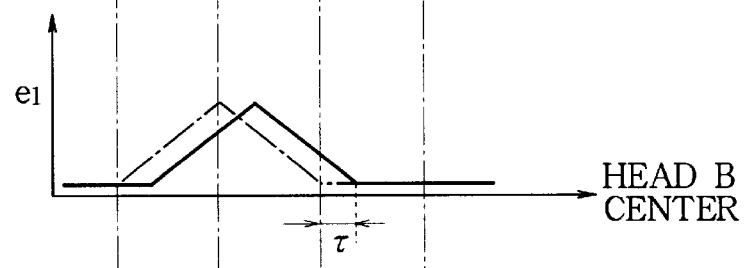
FIG. 62A to FIG. 62C are diagrams for explaining the operation for the cases where the delay times of the pilot signals extracted during fast playback are different.
Figure 62B:
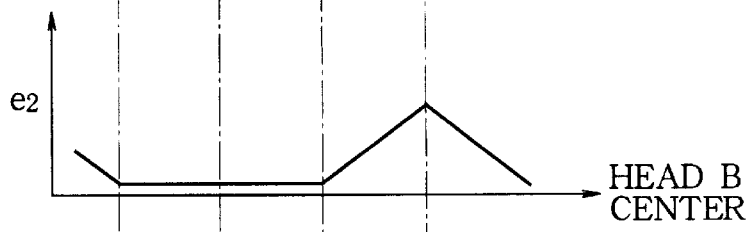
Figure 62C:
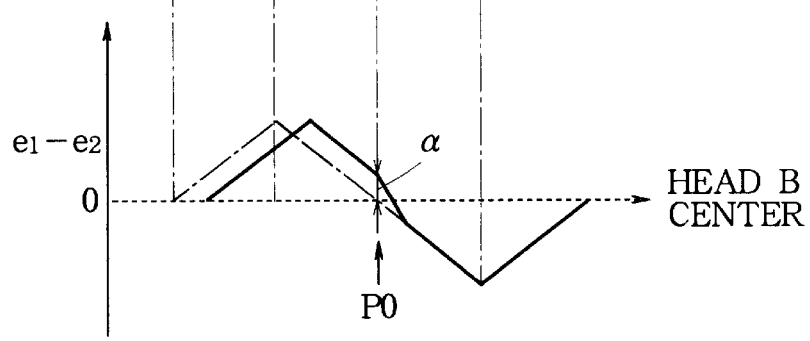

The input-output characteristics of the bandpass filters 19 and 20 generally have delay time, and their outputs may be different delay time. FIG. 62A to FIG. 62C show the operation when the delay times of the pilot signal extracted during the fast playback are different. For instance, the bandpass filter 19 extracting the pilot signal f1, and the output of the envelope detector 21 has a delay of $\tau$ (FIG. 62A), while the bandpass filter 20 extracting the pilot signal f2 has no delay (FIG. 62B). FIG. 62C shows the value of (f1–f2). Since the error detector 26 conducts sampling at the sampling point at an intersection P0 of the center of the head B with the center of the f0 track, even if the true situation is e1–e2=0, error signal is detected as e1–e2=$\alpha$. As a result, correction of the tracking position is effected, when in fact there is no tracking error. The delay compensation circuit 51 makes adjustment so that the delays of the pilot signal f1 and f2 components are equal.

Figure 63A:
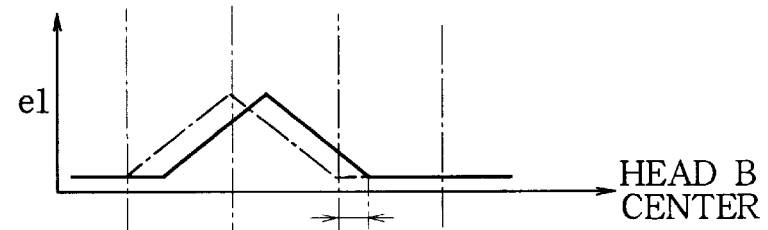
FIG. 63A to FIG. 63C are diagrams for explaining the sampling points for error detection using the pilot signals which have been time-delay compensated.
Figure 63B:
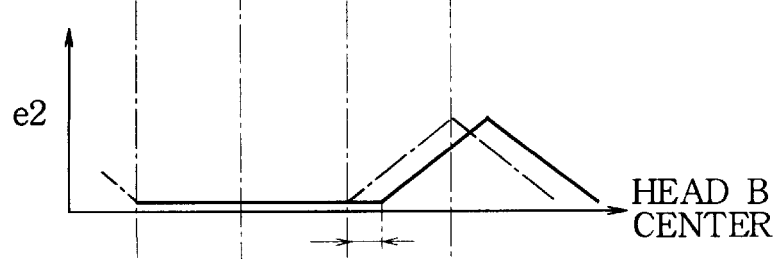
Figure 63C:
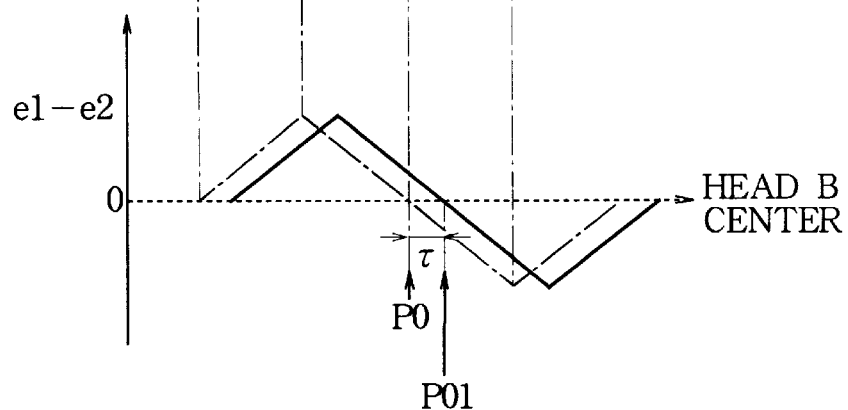
Figure 64:
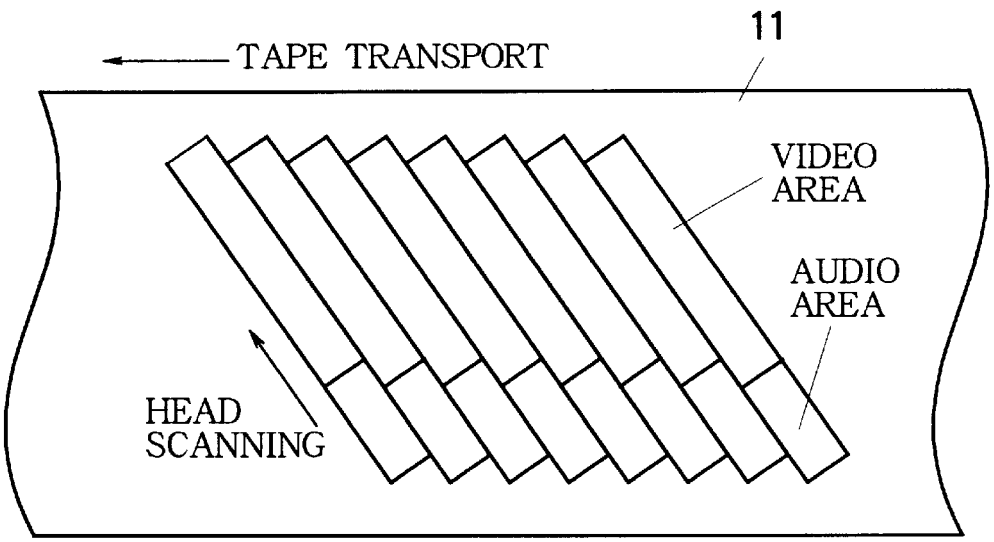
FIG. 64 shows a track pattern in a conventional consumer digital VTR.
Figure 65A:
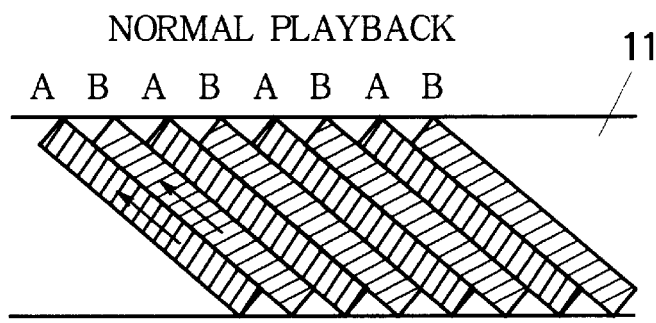
FIG. 65A shows scanning traces on a magnetic tape followed by a rotary head in a digital VTR in normal playback.
Figure 65B:
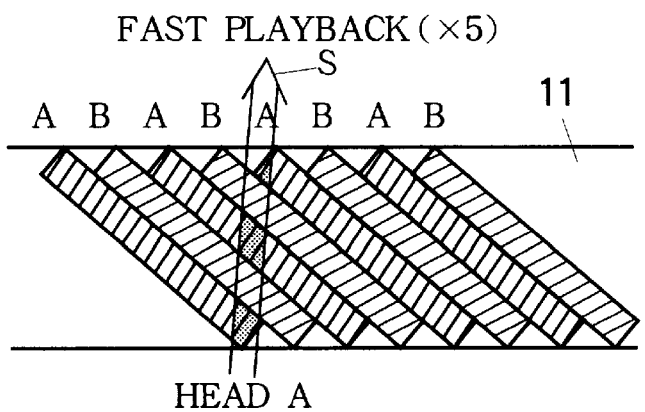
FIG. 65B shows the scanning traces of the rotary head in fast playback.
Figure 66:
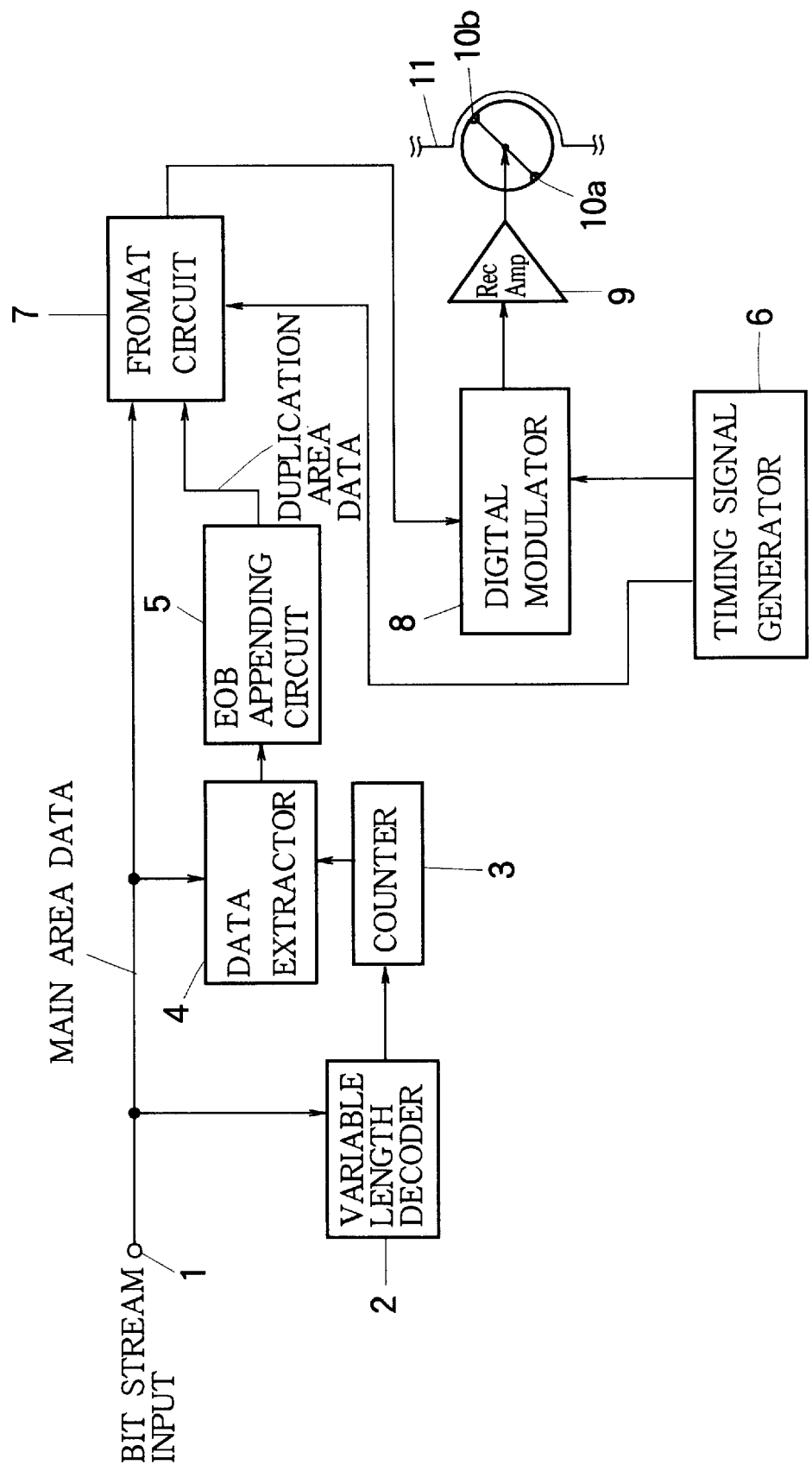
FIG. 66 is a block diagram showing the configuration of the playback section of the bitstream recording and playback device capable of fast playback.
Figure 67:
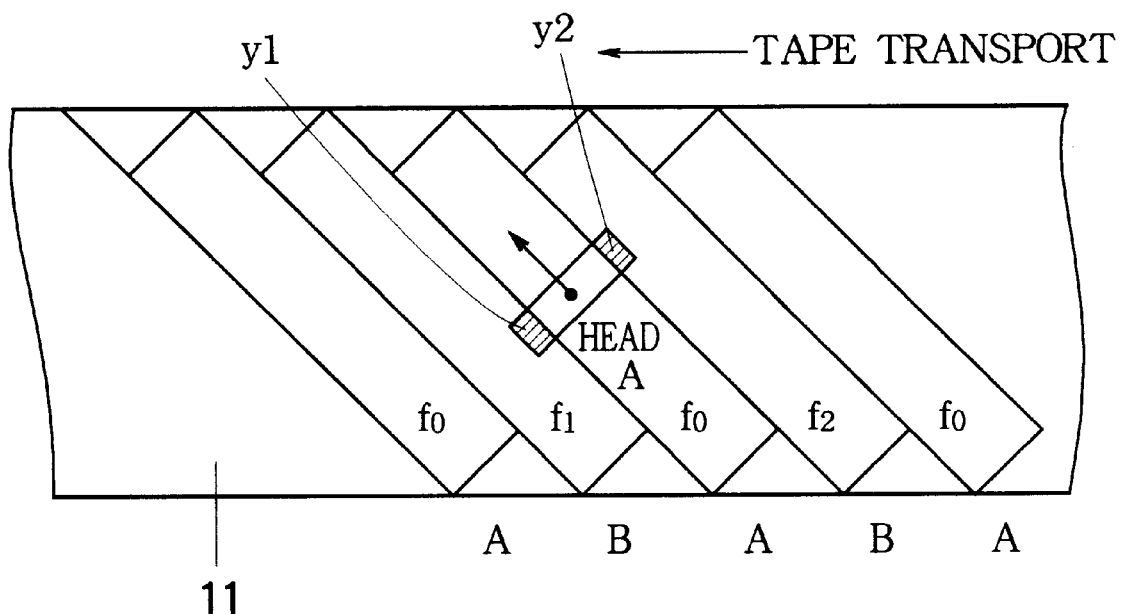
FIG. 67 shows a pattern of tracking pilot signals in a consumer digital VTR.
Figure 68A:
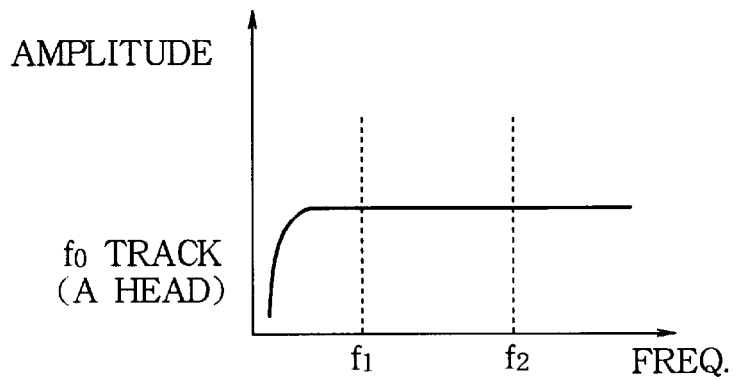
FIG. 68A to FIG. 68C show examples of frequency spectra of recording signals with tracking pilot signals appended thereto.
Figure 68B:
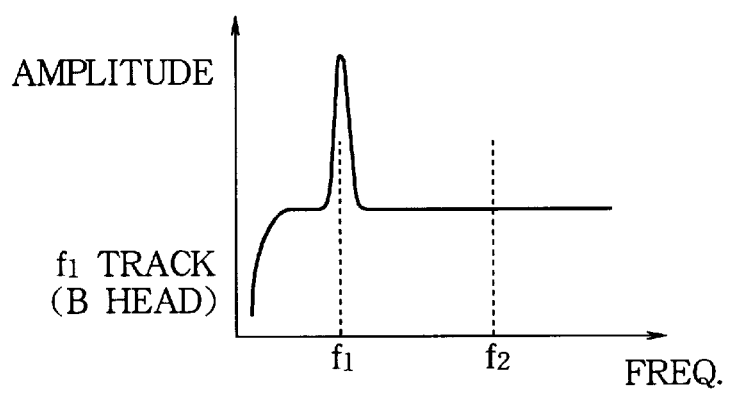
Figure 68C:
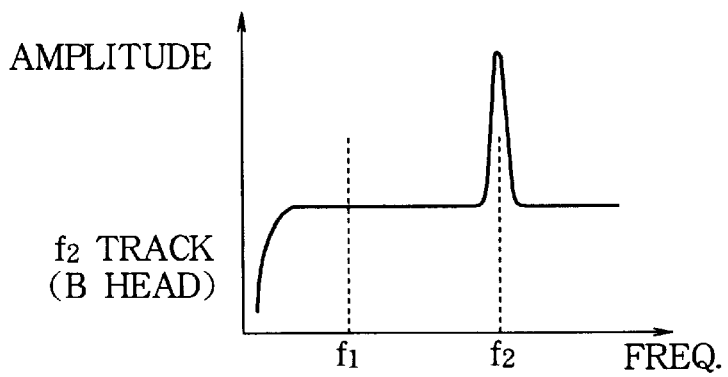

FIG. 63A to FIG. 63C are diagrams for explaining the sampling points for error detection using the delay-amount compensated pilot signals. The delay compensation circuit 51 compensates the delay times of the pilot signal, so that the delay times of f1 and f2 are both $\tau$, and outputs the delay-time adjusted signals. The pilot signals f1 and f2 having the delay time adjusted to be equal are supplied to the sample-hold circuits 23 and 24. The signal indicating the delay amount $\tau$ is supplied to the timing signal generator 46.

The position P0 of the sampling pulses supplied from the signal generator 46 to the sample-hold circuits 23 and 24 is corrected by the amount $\tau$. As a result, the sampling pulses for conducting sampling at P01 as shown in FIG. 63C are supplied to the sample-hold circuits 23 and 24. The sample-hold circuits 23 and 24 conduct sampling and holding of the pilot signal f1 and f2 components in accordance with the sampling pulses from the timing signal generator 46, and supply the values at sampling point P01 to the error detector 26.

The error detector 26 detects the value of (e1–e2) at the sampling point P01 as shown in FIG. 63C, and supplies this value of error signal to the servo circuit 33 for tracking control such that the value of (e1–e2) equals zero. Accordingly, the tracking error signal detected by the error detector 26 is equal to the true error signal at the sampling point P0 because the delay times of the bandpass filters 19 and 20 are compensated, and the tracking is therefore controlled to the accurate position. Incidentally, the chain lines in FIG. 62 and FIG. 63 represent values that would be obtained if the delay time were zero.

In Embodiment 13, four-time speed playback is conducted, and pilot signals are extracted, like Embodiment 12 and Embodiment 13, at a sampling point at an intersection P0 of the center of the head B with the center of the f0 track recorded by a head A of a different azimuth, and used for tracking control. The delay time compensation can also be made in a case where the pilot signals are extracted as cross-talk components from adjacent tracks, at an intersection of head A with f0 track, and yet similar effects are obtained.

As has been described, during fast playback frame a magnetic tape, pilot signal components recorded on the tracks are extracted from the playback signal from the tracing head, and the delay time of the pilot signals is compensated, and a flag signal indicating the intersection of the center of the head A with the center of the track recorded by the head B is generated, and the flag signal is corrected in accordance with the correction of the delay time, and the error of the tracking position is detected from the delay-time corrected pilot signal components, at the corrected point of the intersection of the center of the head with the center of the track, so that the tracking can be controlled so as to reproduce the recorded fast playback data without fail, without regard to the delay time of the extracting means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording and playback device in which duplication areas for recording fast playback signals are disposed on a magnetic tape on which tracking pilot signals are appended to oblique tracks at k locations (k being a positive integer not smaller than 2) from which reproduction is possible during one head trace at a predetermined fast playback speed, comprising:

error detection means for detecting a tracking error by extracting pilot signal components, from kj (kj being a positive integer) points for each of the duplication areas traced by the head: and tracking control means for performing tracking control based on errors detected at (k×kj) points by said error detecting means.

2. The magnetic recording and playback device according to claim 1, wherein the fast playback signals are reproduced from the magnetic tape on which the duplication areas are disposed at two or more locations (k≧2), and said error detecting means detects the tracking error by extracting the pilot signal components from one point (kj=1) for each of the duplication areas.

3. The magnetic recording and playback device according to claim 1, wherein the fast playback signals are reproduced from the magnetic tape on which said duplication areas are disposed at two or more locations (k≧2), said error detecting means detects the tracking error extracting the pilot signal components, from n (kj=n, n being a positive integer not smaller than 2) points for each of the duplication areas.

4. The magnetic recording and playback device according to claim 1, wherein said error detecting means detects the tracking error by extracting the pilot signal components, from two points at both ends of each of the duplication areas.

5. The magnetic recording and playback device according to claim 1, wherein said tracking control means includes calculating means for calculating an average value of the errors detected by said error detecting means at a plurality of points.

6. The magnetic recording and playback device according to claim 1, wherein said tracking control means includes calculating means for calculating an average value of maximum and minimum values of the errors detected by said error detecting means at a plurality of points.

7. The magnetic recording and playback device according to claim 1, wherein said tracking control means includes calculating means for calculating a value j3:

$$j3 = \alpha \times j1 + (1-\alpha) \times j2 \,(0 \leq \alpha \leq 1),$$

where j1 is an average of the errors detected by said error detecting means at a plurality of points, and j2 is an average of maximum and minimum values of said errors.

8. A magnetic recording and playback device in which duplication areas for recording fast playback signals are disposed on a magnetic on which tracking pilot signals are appended to oblique tracks at k locations (k being a positive integer not smaller than 2) from which reproduction is possible during one head trace at a predetermined fast playback speed, comprising:

error detection means for detecting a tracking error by extracting pilot signal components sequentially recorded at ri (ri being a positive integer, and i=1, 2, . . . , s, $\Sigma$ ri=k×n) points, from n (kj=n, being a positive integer not smaller than 2) points for each of the duplication areas traced by the head; and tracking control means for performing tracking control based on (k x n) error signals detected at all points for each of s scans.

9. The magnetic recording and playback device according to claim 8, wherein said tracking control means includes calculating means for calculating an average value of the errors detected by said error detecting means at a plurality of points.

10. The magnetic recording and playback device according to claim 8, wherein said tracking control means includes calculating means for calculating an average value of maximum and minimum values of the errors detected by said error detecting means at a plurality of points.

11. The magnetic recording and playback device according to claim 8, wherein said tracking control means includes calculating means for calculating a value j3:

$$j3=\alpha \times j1+(1-\alpha) \times j2 (0 \leq \alpha \leq 1),$$

where j1 is an average of the errors detected by said error detecting means at a plurality of points, and j2 is an average of maximum and minimum values of said errors.

12. A magnetic recording and playback device in which duplication areas in which a fast playback signal is recorded at t (t being a positive integer not smaller than 2) track intervals are disposed, on a magnetic tape having oblique tracks with tracking pilot signals appended thereto, at k (k being positive integer not smaller than 2) locations from which reproduction is possible by a head by one trace at a predetermined fast playback speed, said device comprising:

error detecting means extracting, from kj (kj being a positive integer) points for each of the duplication areas traced by said head, the pilot signal appended thereto, to detect the tracking error;

track pattern detecting means for extracting a pilot signal component in a vicinity of an intersection of a center of at least one track adjacent to a track on which the fast playback signal is recorded, with a center of the head, to thereby detect a repetition pattern of the pilot signal; and tracking control means performing tracking control based on the error detected by said error detecting means at (k×kj) points on t tracks, and the repetition pattern of the pilot signals detected by said track pattern detecting means.

13. The magnetic recording and playback device according to claim 12, wherein said tracking control means includes calculating means for calculating an average value of the errors detected by said error detecting means at a plurality of points.

14. The magnetic recording and playback device according to claim 12, wherein said tracking control means includes calculating means for calculating an average value of maximum and minimum values of the errors detected by said error detecting means at a plurality of points.

15. The magnetic recording and playback device according to claim 12, wherein said tracking control means includes calculating means for calculating a value j3:

$$j3=\alpha \times j1+(1-\alpha) \times j2 (0 \leq \alpha \leq 1),$$

where j1 is an average of the errors detected by said error detecting means at a plurality of points, and j2 is an average of maximum and minimum values of said errors.

16. A magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace at a predetermined fast playback speed, said device comprising:

signal extracting means for extracting pilot signal components of the same frequency recorded on a track, at two points positioned on the track, opposite each other with reference to an intersection of a center of the track with a center of the head, in the duplication area, and at a distance z shorter than a playback burst length by the head, from the intersection, error detecting means for comparing levels of the pilot signal components extracted by said extracting means to detect a tracking error; and tracking control means for performing tracking control based on the tracking error detected by said error detecting means.

17. The magnetic recording and playback device according to claim 16, wherein the two points of said signal extracting means for points at both ends of the duplication area.

18. A magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace at a predetermined fast playback speed, said device comprising:

signal extracting means for extracting first and second pilot signal components by cross-talk from tracks adjacent to a track, at two points positioned on the track, opposite to each other with reference to an intersection of a center of the track with a center of the head, in the duplication area, and at a distance z shorter than a playback burst length by the head, from the intersection, error detecting means for comparing a level of a first pilot signal reproduced mainly at one of the two points, and a level of a second pilot signal reproduced mainly at the other of the two points to detect a tracking error; and tracking control means for performing tracking control based on the tracking error detected by said error detecting means.

19. The magnetic recording and playback device according to claim 18, wherein the two points at said signal extracting means are points at both ends of the duplication area.

20. A magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

signal extracting means for extracting pilot signal components recorded on tracks of a first azimuth adjacent to a track of a second azimuth on which recording was made by a head of the second azimuth, at an intersection of a center of a head of said first azimuth of the same azimuth as the track in which the duplication area is disposed, with a center of the track recorded by the head of said second azimuth, said first and second azimuths being different from each other;

error detecting means for comparing levels of the pilot signals extracted by said extracting means to detect a tracking error; and tracking control means for performing tracking control based on the tracking error detected by said error detecting means.

21. The magnetic recording and playback device according to claim 20, wherein the center of said head of the first azimuth intersect, during one trace of the head, the center of the track recorded by said head of said second azimuth at a plurality of points, and the pilot signal components are extracted, taking each of said points of intersection as a reference, and tracking control is performed based on the errors at the plurality of intersections.

22. A magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

position detecting means for detecting that the head is scanning a predetermined position of the duplication area and outputting a position;

flag generating means for generating a flag signal indicating a point at which a center of a head of a first azimuth and a center of the track recorded by a head of a second azimuth different from said first azimuth intersect, taking the position detected by said position detecting means as a reference;

signal extracting means for extracting pilot signal components recorded on adjacent tracks at a point where the flag signal is generated;

error detecting means for comparing levels of the pilot signals extracted by said extracting means to detect a tracking error; and tracking control means for performing tracking control based on the tracking error detected by said error detecting means.

23. A magnetic recording and playback device capable of reproducing fast playback signals, in which duplication areas for recording fast playback signals are disposed, on a magnetic tape with oblique tracks to which tracking pilot signals are appended, at locations from which reproduction is possible by one trace by a rotary drum on which heads of two different azimuths are mounted, said device comprising:

signal extracting means for extracting pilot signal components recorded on a track from the playback signal from a tracing head;

delay compensation means for compensating for a delay time at said signal extracting means;

flag generating means for generating a flag signal indicating a point where a center of a head of a first azimuth and a center of the track recorded by a head of a second azimuth different from said first azimuth intersect, and correcting the flag signal based on the delay time compensated for by said delay compensating means;

error detecting means for comparing levels of the pilot signal components corrected by said correcting means, at a point obtained by correcting an intersection of the center of the head with the center of the track, and detecting tracking error; and tracking control means for performing tracking control based on the tracking error detected by said error detecting means.

* * * * *

UNITED STATES PATENT AND TRADEMARK OFFICE
CERTIFICATE OF CORRECTION

PATENT NO. : 6,021,017
DATED : February 1, 2000
INVENTOR(S): Masako ASAMURA et al.

It is certified that error appears in the above-identified patent and that said Letters Patent are hereby corrected as shown below:

On the title page, under Foreign Application Priority Data, change "Aug. 22, 1995" to --Aug. 22, 1994--.

Signed and Sealed this

Eighth Day of May, 2001

Attest:

NICHOLAS P. GODICI

Attesting Officer

Acting Director of the United States Patent and Trademark Office